(12) United States Patent
Okihara et al.

(10) Patent No.: US 9,186,647 B2
(45) Date of Patent: *Nov. 17, 2015

(54) OZONE GAS GENERATION UNIT AND OZONE GAS SUPPLY SYSTEM

(71) Applicant: TOSHIBA MITSUBISHI-ELECTRIC INDUSTRIAL SYSTEMS CORPORATION, Minato-ku (JP)

(72) Inventors: Yujiro Okihara, Minato-ku (JP); Yoichiro Tabata, Minato-ku (JP); Noriyuki Nakamura, Minato-ku (JP); Tetsuya Saitsu, Minato-ku (JP); Hatsuo Yotsumoto, Minato-ku (JP); Nobuyuki Itoh, Minato-ku (JP)

(73) Assignee: TOSHIBA MITSUBISHI-ELECTRIC INDUSTRIAL SYSTEMS CORPORATION, Minato-ku (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/448,123

(22) Filed: Jul. 31, 2014

(65) Prior Publication Data

US 2014/0341782 A1    Nov. 20, 2014

Related U.S. Application Data

(63) Continuation of application No. 13/508,233, filed as application No. PCT/JP2010/065210 on Sep. 6, 2010.

(30) Foreign Application Priority Data

Nov. 26, 2009  (WO) ............... PCT/JP2009/069952

(51) Int. Cl.
*B01J 19/08*  (2006.01)
*C01B 13/11*  (2006.01)

(52) U.S. Cl.
CPC ............... *B01J 19/088* (2013.01); *C01B 13/11* (2013.01); *B01J 2219/0805* (2013.01); *C01B 2201/64* (2013.01); *C01B 2201/76* (2013.01); *C01B 2201/90* (2013.01)

(58) Field of Classification Search
CPC  C01B 13/11; C01B 2201/70; C01B 2201/64; C01B 2201/90; C01B 13/10; B01J 19/088; B01J 2219/0805; B01J 19/0006; B01J 2208/00548; B01J 8/1809; A61L 2/24
See application file for complete search history.

(56) References Cited

U.S. PATENT DOCUMENTS 5,855,856 A    1/1999  Karlson
2001/0007645 A1  7/2001  Honma
(Continued)

FOREIGN PATENT DOCUMENTS

EP    1 795 500 A1    6/2007
JP    54-115689      9/1979
(Continued)

OTHER PUBLICATIONS

International Preliminary Report on Patentability issued Jun. 7, 2012, in PCT/JP2010/065210, filed Sep. 6, 2010.
(Continued)

*Primary Examiner* — Xiuyu Tai
(74) *Attorney, Agent, or Firm* — Oblon, McClelland, Maier & Neustadt, L.L.P.

(57) ABSTRACT

In the present invention, a gas pipe integrated block has a plurality of internal pipe paths. The plurality of internal pipe paths are connected to an ozone generator, control means, a raw gas supply port, an ozone gas output port, and cooling water inlet/outlet ports, to thereby form a unit in which a raw gas input pipe path and an ozone gas output pipe path are integrated. The raw gas input pipe path extends from the raw gas supply port through an automatic pressure controller to the ozone generator. The ozone gas output pipe path extends from the ozone generator through a gas filter, an ozone concentration meter, and a flow rate controller, to the ozone gas output port.

14 Claims, 26 Drawing Sheets

(56) References Cited

U.S. PATENT DOCUMENTS

| | | |
|---|---|---|
| 2003/0133854 A1 | 7/2003 | Tabata et al. |
| 2007/0020160 A1 | 1/2007 | Berkman et al. |

FOREIGN PATENT DOCUMENTS

| | | |
|---|---|---|
| JP | 55-126505 A | 9/1980 |
| JP | 11-171505 | 6/1999 |
| JP | 2003-89508 | 3/2003 |
| JP | 2003-212517 | 7/2003 |
| JP | 2009-500855 | 1/2009 |

OTHER PUBLICATIONS

Written Opinion of the International Searching Authority issued Nov. 30, 2010, in PCT/JP2010/065210, filed Sep. 6, 2010 (with English-language translation).

International Search Report issued Nov. 30, 2010, in PCT/JP2010/065210.

Extended European Search Report issued on Jul. 15, 2013 in Application No. 10832935.0.

European Search Report mailed on Jul. 22, 2014, in European Patent Application No. 14 16 6615 (1 page).

Japanese Office Action dated Sep. 29, 2015, in Japanese Patent Application No. 2014-029148 (with English Translation).

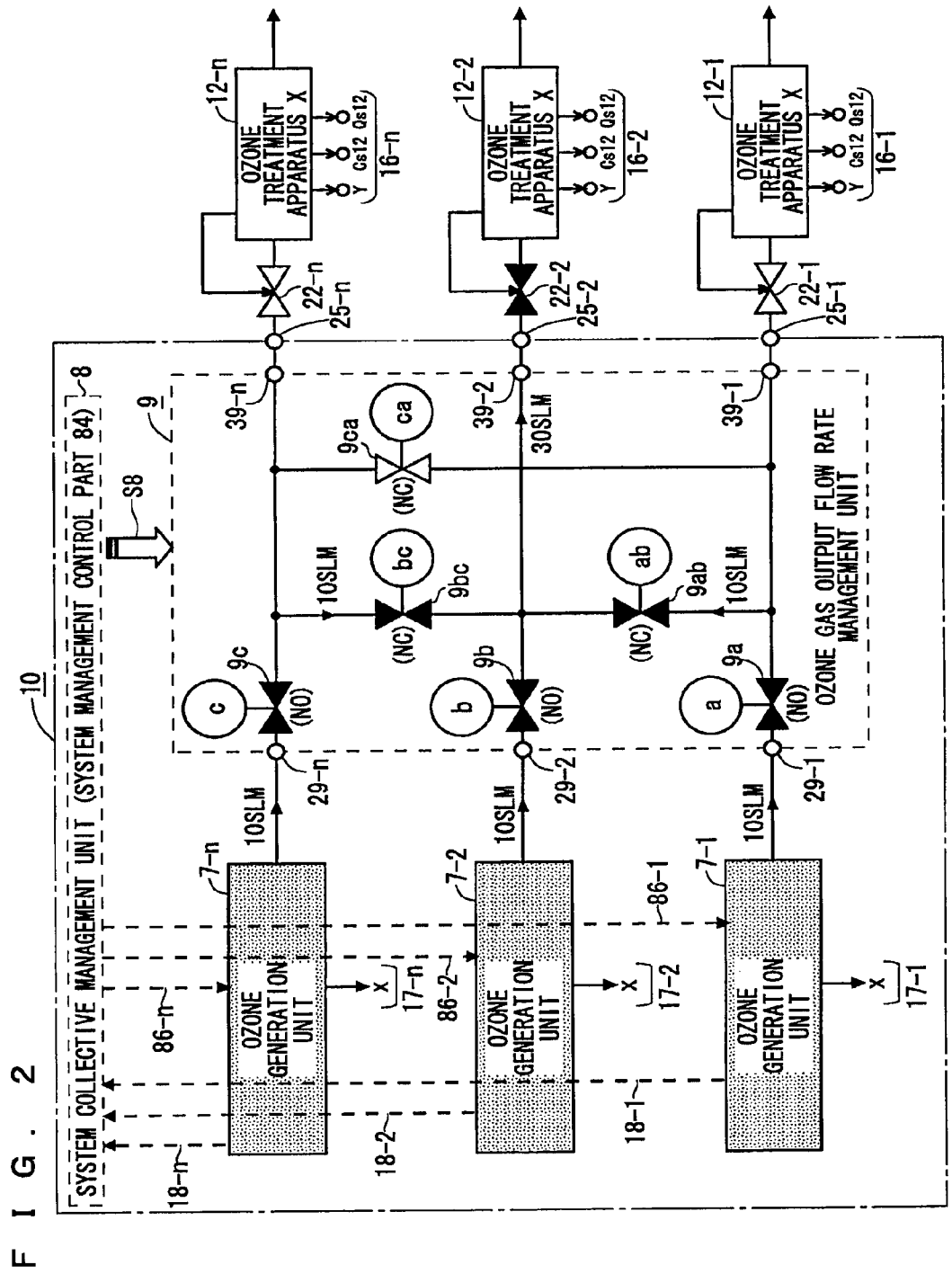

FIG. 3

| UNIT INFORMATION 18 \ (OPERATION INFORMATION Y) USER INFORMATION 17 | OZONE TREATMENT APPARATUS 12-n | | | OZONE TREATMENT APPARATUS 12-2 | | | OZONE TREATMENT APPARATUS 12-1 | | |
|---|---|---|---|---|---|---|---|---|---|
| | 9c (NO) | OPEN | CLOSE | 9bc (NC) | OPEN | CLOSE | 9ca (NC) | OPEN | CLOSE |
| OZONE GENERATION UNIT 7-n | | | | | | | | | |
| | 9bc (NC) | OPEN | CLOSE | 9b (NO) | OPEN | CLOSE | 9bc (NC) | OPEN | CLOSE |
| OZONE GENERATION UNIT 7-2 | | | | | | | | | |
| | 9ca (NC) | OPEN | CLOSE | 9ab (NC) | OPEN | CLOSE | 9c (NO) | OPEN | CLOSE |
| OZONE GENERATION UNIT 7-1 | | | | | | | | | |
| REQUEST OZONE FLOW RATE Qs12 (SLM) | — | | | 30 | | | — | | |
| REQUEST OZONE CONCENTRATION Cs12 (g/m³) | — | | | 280 | | | — | | |

85

F I G . 6
(a)
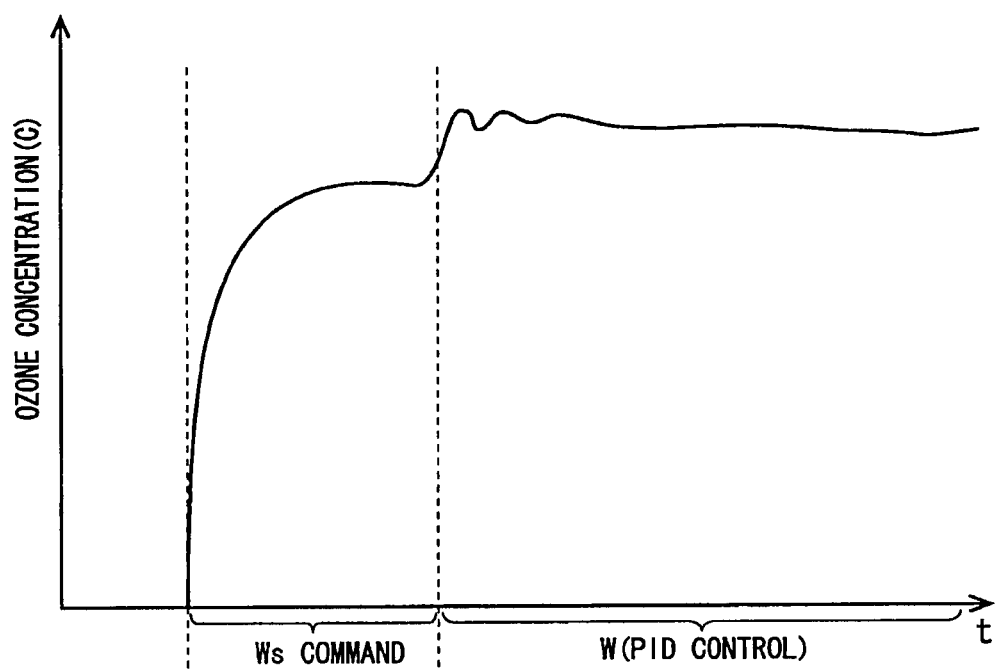
(b)
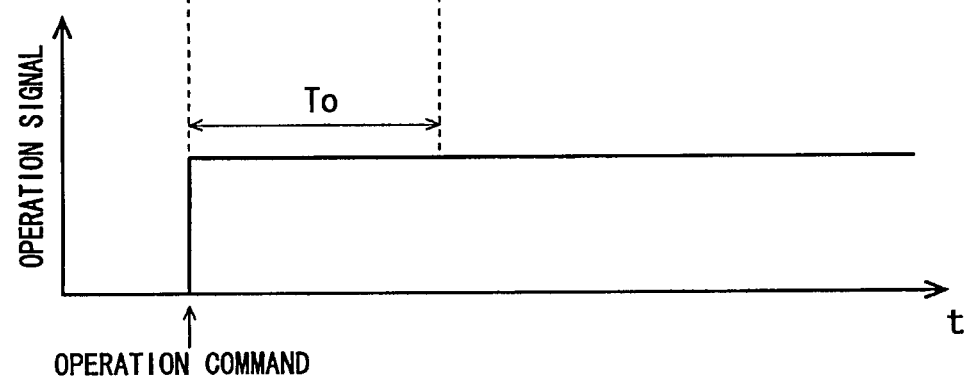

F I G . 1 3
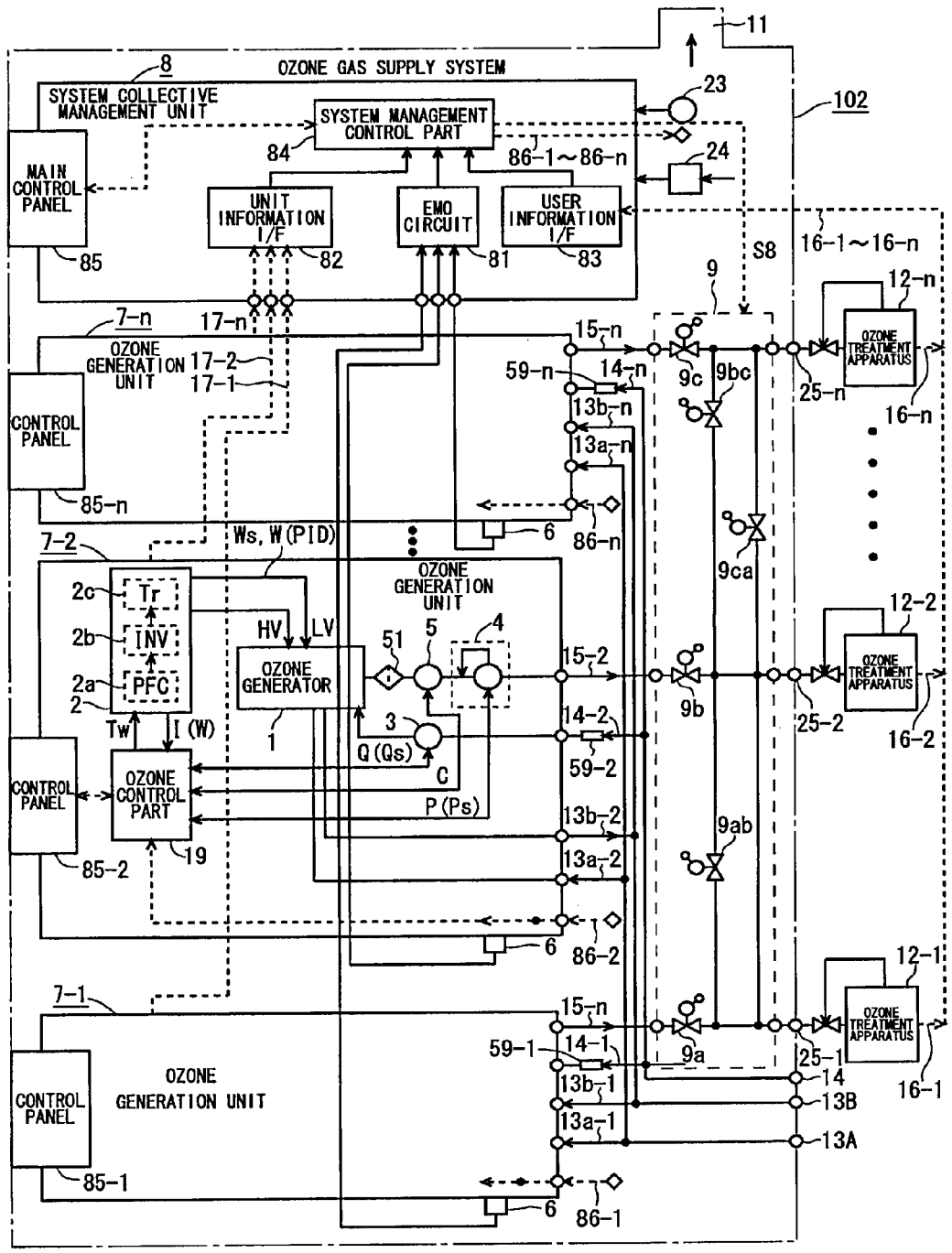

F I G . 1 5
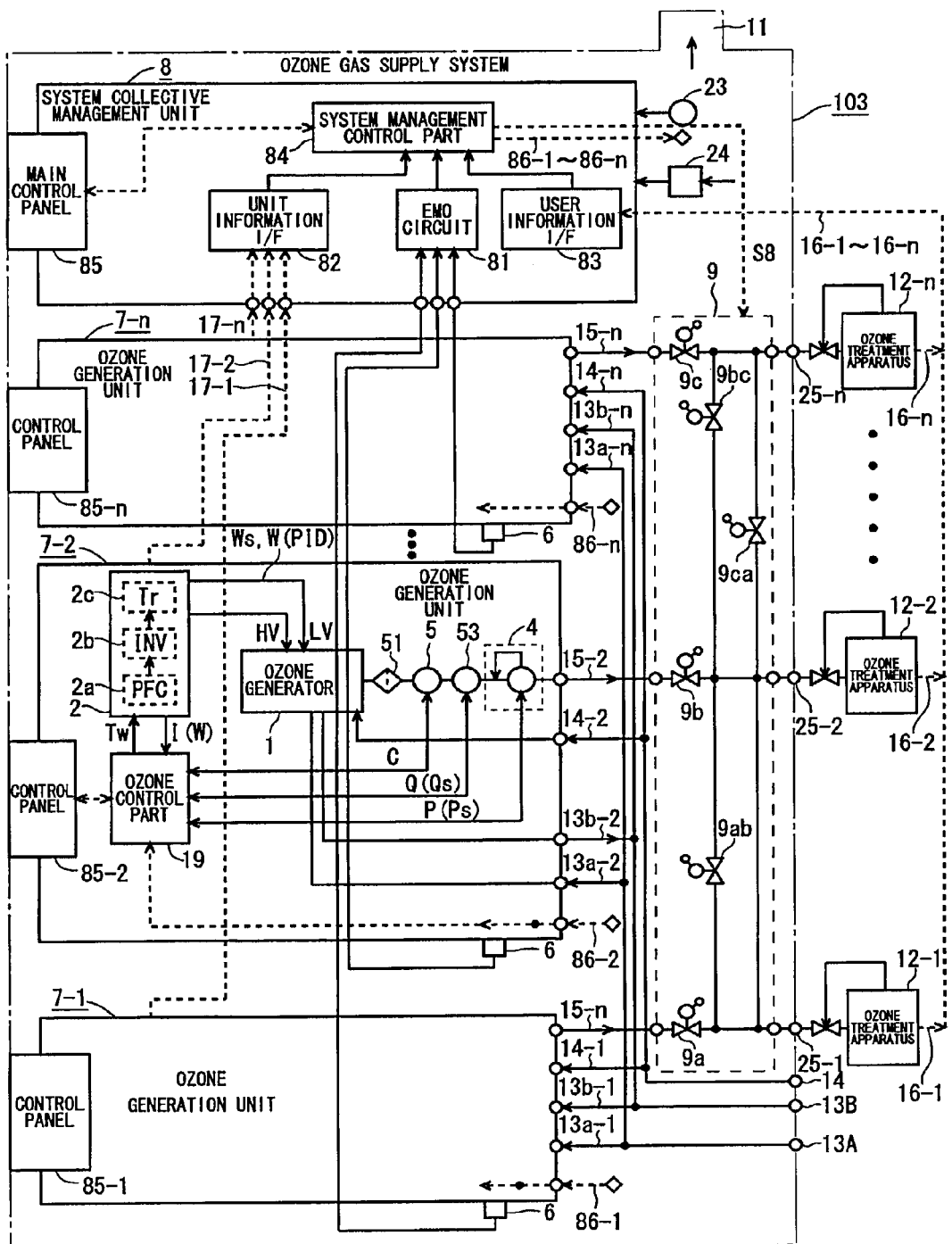

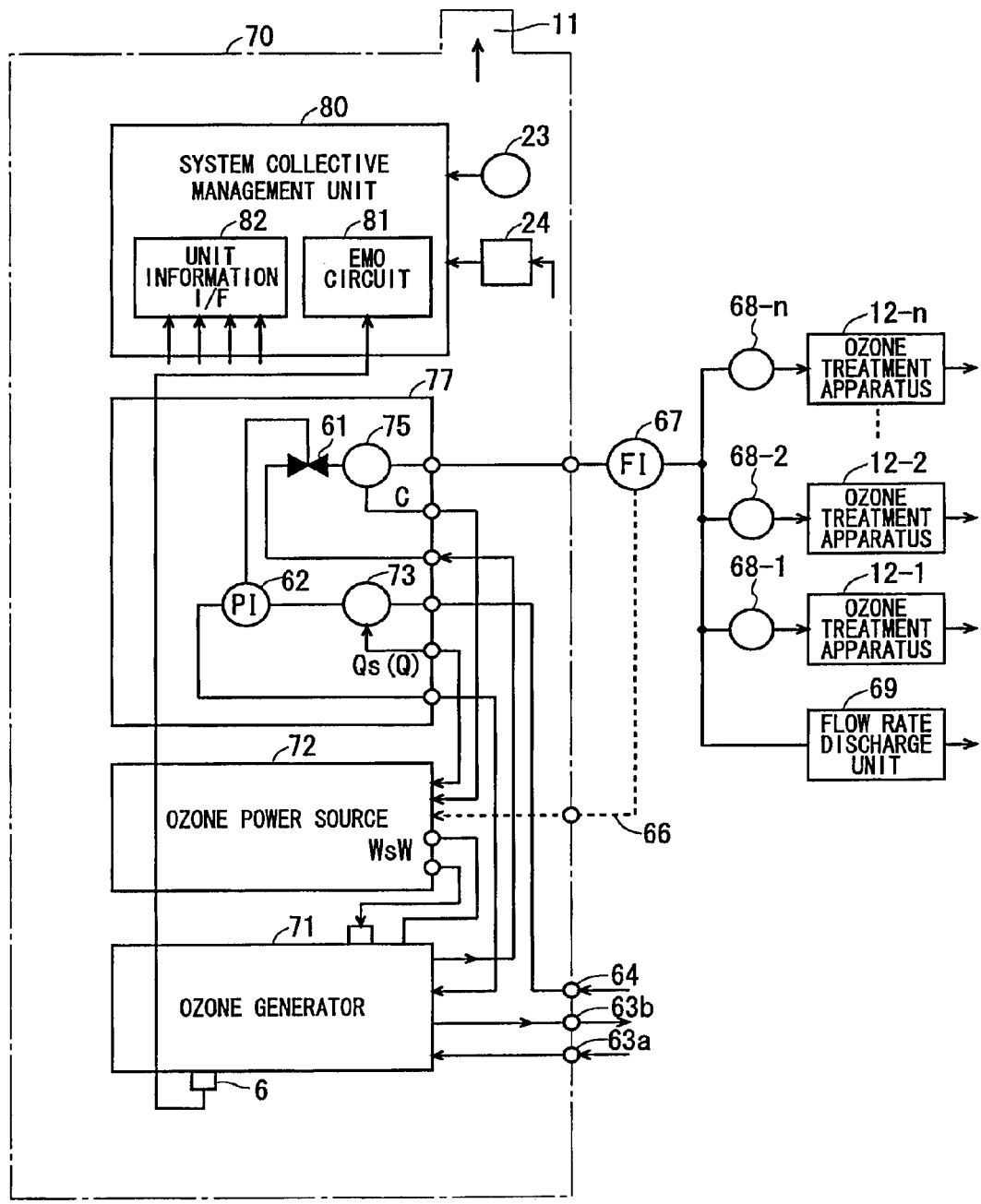
F I G . 2 4

F I G . 2 5
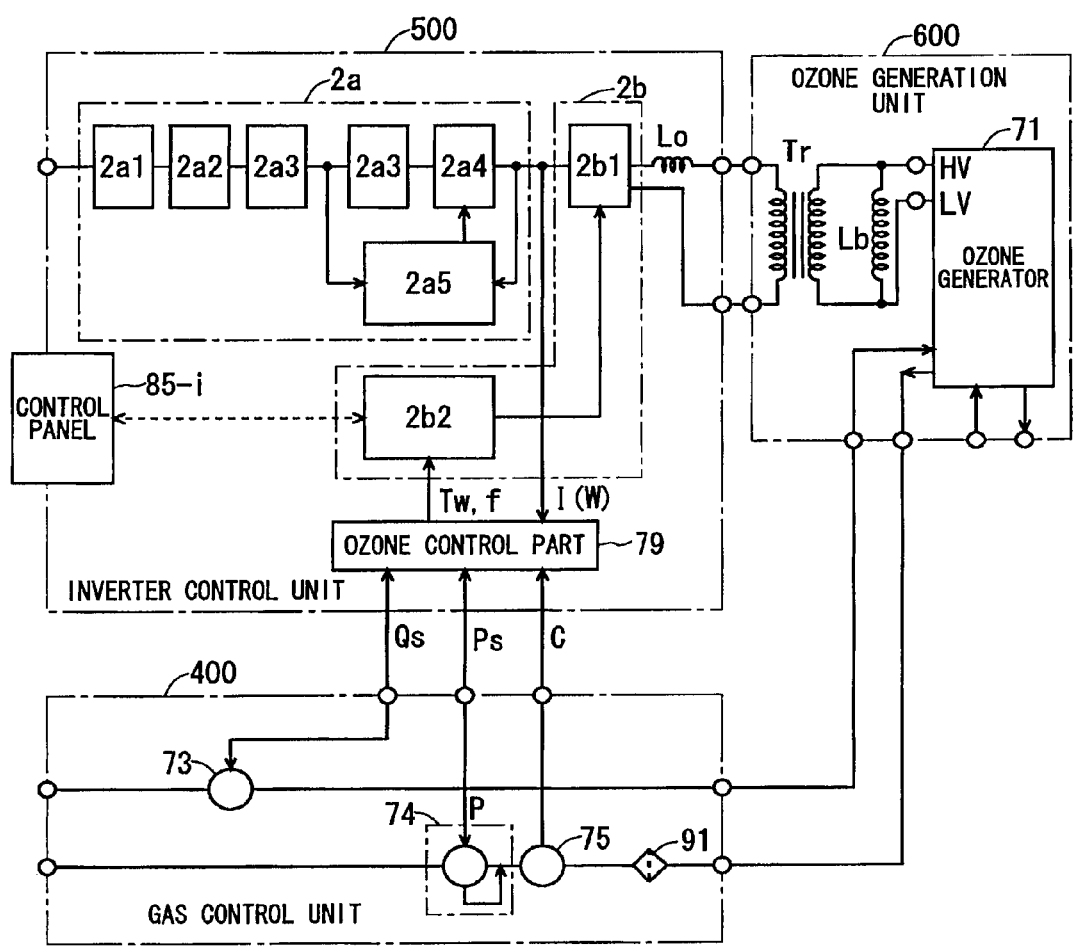

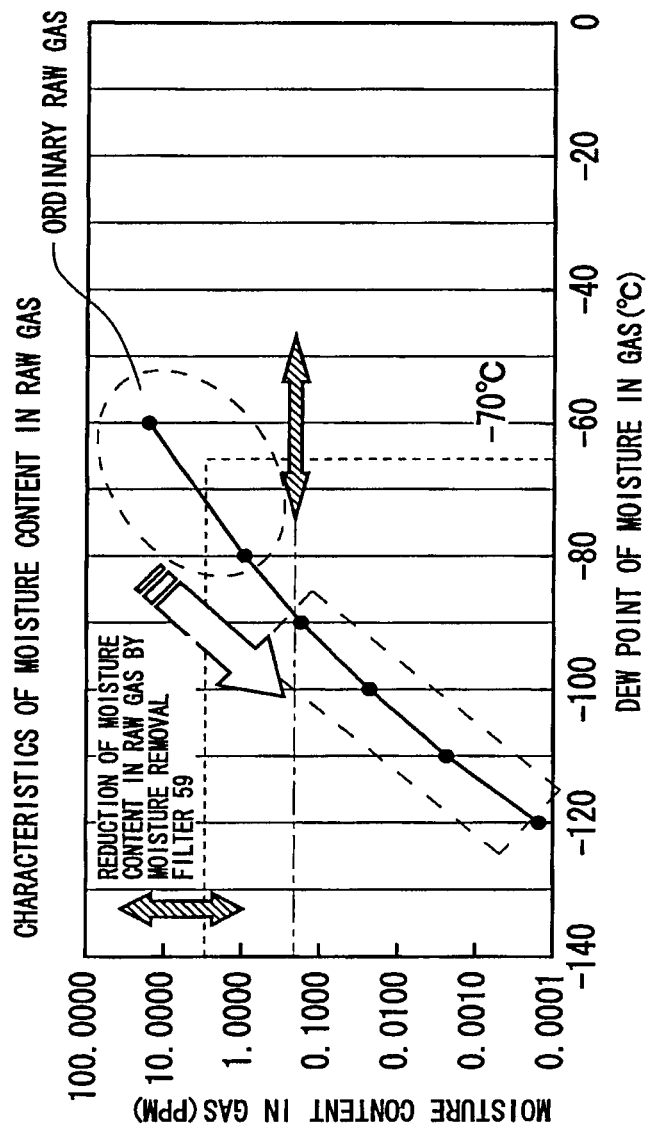

OZONE GAS GENERATION UNIT AND OZONE GAS SUPPLY SYSTEM

CROSS-REFERENCES TO RELATED APPLICATIONS

This application is a continuation of U.S. patent application Ser. No. 13/508,233, which is the National Stage of the International Patent Application No. PCT/JP2010/065210, filed Sep. 6, 2010, the disclosures of which are incorporated herein by reference in their entireties. This application claims priority to International Application No. PCT/JP2009/069952, filed Nov. 26, 2009, the disclosure of which is incorporated herein by reference in its entirety.

TECHNICAL FIELD

The present invention relates to an ozone gas supply system capable of increasing the quality of a raw gas supplied thereto, increasing the quality of an ozone gas outputted therefrom, and supplying a stable ozone gas to a plurality of ozone treatment apparatuses by controlling the flow rate and the concentration of the gas.

BACKGROUND ART

In a case of supplying an ozone gas to a multiple ozone treatment apparatus including a plurality of ozone treatment apparatuses, it is generally conceivable to build an ozone gas supply system in which a plurality of ozone generation mechanisms (means) each including an ozone power source, a flow rate controller (MFC), and the like, are provided corresponding to the plurality of ozone treatment apparatuses, respectively, so that the ozone generation mechanisms independently supply an ozone gas to the corresponding ozone treatment apparatuses. A raw gas such as a high-purity oxygen gas having a purity of 99.99% and a dew point of −70° C. or lower is supplied to an ozone generator of each ozone generation mechanism.

More specifically, in the ozone gas supply system, an ozone power source, a raw gas pipe system line, an output gas pipe system line, and the like, are provided, and the number of each of them is equal to the number of system lines included in the multiple ozone treatment apparatus. The raw gas pipe system line supplies a raw gas such as a high-purity oxygen gas having a purity of 99.99% and a dew point of −70° C. or lower to the ozone generator via flow rate adjusting means such as an MFC for controlling a flow rate of the ozone gas or the raw gas. The output gas pipe system line includes pressure adjusting means such as an automatic pressure controller (APC) for controlling gas atmosphere pressure in the ozone generator, an ozone concentration detector for detecting a concentration of the ozone gas outputted from the ozone generator, and an ozone flow meter.

In a case of supplying an ozone gas to a multiple ozone treatment apparatus including a plurality of ozone treatment apparatuses, it is generally conceivable to build an ozone gas supply system in which a plurality of ozone generation mechanisms each including an ozone power source, a flow rate controller (MFC), and the like, are provided corresponding to the plurality of ozone treatment apparatuses, respectively, so that the ozone generation mechanisms independently supply an ozone gas to the corresponding ozone treatment apparatuses.

More specifically, in the ozone gas supply system, an ozone generator, an ozone power source, a raw gas pipe system line, an output gas pipe system line, and the like, are provided, and the number of each of them is equal to the number of system lines included in the multiple ozone treatment apparatus. The raw gas pipe system line supplies a raw gas to the ozone generator via an MFC or the like for controlling a flow rate of the raw gas. The output gas pipe system line includes an ozone concentration detector for detecting a concentration of the ozone gas outputted from the ozone generator, and an ozone flow meter.

A very large space is required for building an ozone generation system compatible with such a multiple ozone treatment apparatus, and moreover, a still larger system configuration is required for building a system that supplies an ozone gas while coordinately controlling the multiple ozone treatment apparatus. Thus, there are problems of costs, an installation space, and the like, to cause many disadvantages in a practical use.

Therefore, in a conventional method for ozone supply to a multiple ozone treatment apparatus, an ozone gas supply system is adopted in which the capacity of a single-type ozone generator is increased and a pipe system line for outputting an ozone gas is divided into a plurality of pipes, so that an ozone gas having a predetermined flow rate and a predetermined concentration is stepwise outputted to a multiple ozone treatment apparatus, as disclosed in Patent Document 1, for example.

FIG. 24 is a block diagram showing an internal configuration of a conventional ozone gas supply system 70, which can be simulated based on the disclosure of the Patent Document 1.

FIG. 24 shows an ozone generator 71, an ozone power source 72, a raw gas pipe system line, and an output gas pipe system line. The raw gas pipe system line supplies a raw gas to the ozone generator 71 via a flow rate controller (MFC) 73 for controlling a flow rate of the raw gas and a pressure meter 62 for monitoring pressure in the generator. A part of the output gas pipe system line subsequent to an output pipe having a valve switch 61, an ozone concentration meter 75, and an ozone flow meter 67, is divided into a plurality of pipes. The valve switch 61 adjusts opening/closing of a valve depending on a pressure fluctuation in the ozone generator 71. Additionally, in the ozone gas supply system 70, individual ozone-gas flow rate controllers (MFC) 68-1 to 68-n are provided to the divided parts of the output gas pipe system line, respectively, so that the ozone gas can be independently supplied to a plurality of ozone treatment apparatuses 12-1 to 12-n that are provided corresponding to the individual MFCs 68-1 to 68-n, respectively. An amount of ozone gas exceeding the amount to be supplied by the individual MFCs 68-1 to 68-n is discharged by a flow rate discharge unit 69.

PRIOR-ART DOCUMENTS

Patent Documents

Patent Document 1: National Publication of Translation No. 2009-500855 (FIG. 2, FIG. 3, FIG. 5)

The conventional ozone gas supply system for the ozone supply to a multiple ozone treatment apparatus is configured as described above. In the configuration, the raw gas is supplied to the ozone generator, and an ozone gas is outputted from a single ozone generator 71, and an outputting pipe system line is divided into distribution pipes. Therefore, it is necessary that the ozone gas is supplied to the multiple ozone treatment apparatus (ozone treatment apparatuses 12-1 to 12-n) while the flow rate and the ozone concentration of the ozone gas are kept constant. Accordingly, an ozone supply condition is only one condition that is common to the respective ozone treatment apparatuses. Thus, there is a problem that it is impossible to variably control the flow rate and the concentration of the ozone gas independently for each of the plurality of ozone treatment apparatuses.

Additionally, the ozone gas is supplied from the single ozone generator to the multiple ozone treatment apparatus. Accordingly, if the ozone generator breaks down, the ozone gas supply to all the ozone treatment apparatuses is stopped. Thus, there is a problem that the reliability of the ozone gas supply is low.

Moreover, as shown in FIG. 24, the ozone generator 71, the ozone power source 72, and the gas pipe system are separate. Therefore, an ozone generation part including the ozone generator 71, the ozone power source 72, and the gas pipe system occupies a large space. This arises a problem that it is, in practical use, very difficult to build an ozone gas supply system having a plurality of such ozone generation parts, and also a problem that the maintainability of the ozone generation part is poor.

SUMMARY OF THE INVENTION

Problems to be Solved by the Invention

The present invention has been made to solve the above-described problems, and an object of the present invention is to provide a downsized ozone generation unit and an ozone gas supply system including a plurality of such ozone generation units, the ozone generation unit including various functions concerning a raw gas supply and an ozone generation, such as an ozone generator, an ozone power source, and a gas pipe system, and a function for outputting a generated ozone gas Means for Solving the Problems An ozone generation unit according to the present invention is an ozone generation unit for supplying, to an ozone treatment apparatus, an ozone gas having been set to a predetermined supply flow rate and a predetermined concentration. The ozone generation unit includes: an ozone generator for generating an ozone gas; an ozone power source for controlling power to be supplied to the ozone generator; and control means associated with the ozone generator. The control means includes at least two means among: flow-rate-detection/flow-rate-adjustment means including a mass flow controller for controlling a flow rate of a raw gas that is inputted to the ozone generator; gas filter means for processing the ozone gas outputted from the ozone generator so as to remove an impurity and a foreign substance therefrom; pressure-detection/pressure-adjustment means including an automatic pressure controller for automatically controlling internal pressure that is pressure in the ozone generator; and ozone concentration detection means including an ozone concentration meter for detecting an ozone concentration value of the ozone gas outputted from the ozone generator. The ozone generation unit further includes: a raw gas supply port for supplying the raw gas from the outside to the ozone generator; an ozone gas output port for outputting, to the outside, the ozone gas obtained from the ozone generator through at least part of the control means; and cooling water inlet/outlet ports for supplying and discharging a cooling water obtained from the outside to the ozone generator. The ozone generation unit is formed as an integrated structure in which the ozone generator, the ozone power source, the control means, the raw gas supply port, the ozone gas output port, and the cooling water inlet/outlet ports are assembled together.

Effects of the Invention

In the ozone generation unit of the present invention, the ozone generator, the ozone power source, the control means (at least two means among the flow-rate-detection/flow-rate-adjustment means, the gas filter means, the pressure-detection/pressure-adjustment means, and the ozone concentration detection means), the raw gas supply port, the ozone gas output port, and the cooling water inlet/outlet ports are assembled together into an integrated structure. This can achieve considerable downsizing as compared with a conventional, similar configuration.

These and other objects, features, aspects and advantages of the present invention will become more apparent from the following detailed description of the present invention when taken in conjunction with the accompanying drawings.

BRIEF DESCRIPTION OF THE DRAWINGS

FIG. 2 An explanatory diagram showing an internal configuration of an ozone gas output flow rate management unit of the ozone gas supply system shown in FIG. 1.

FIG. 3 An explanatory diagram schematically showing a display state of a main control panel of the ozone gas supply system according to the embodiment 1.

FIG. 6 A graph showing an output concentration control waveform for performing an output concentration control on the ozone generation unit shown in FIG. 1.

FIG. 13 A block diagram showing a configuration of an ozone gas supply system according to an embodiment 5 of the present invention.

FIG. 15 A block diagram showing a configuration of an ozone gas supply system according to an embodiment 6 of the present invention.

FIG. 24 A block diagram showing an internal configuration of a conventional ozone gas supply system 70.

FIG. 25 An explanatory diagram schematically showing a conventional configuration corresponding to the ozone generation unit of the embodiment 2.

FIG. 26 An explanatory diagram showing the relationship between a dew point of a raw gas and a moisture content in the raw gas.

EMBODIMENT FOR CARRYING OUT THE INVENTION

Embodiment 1

Figure 1:
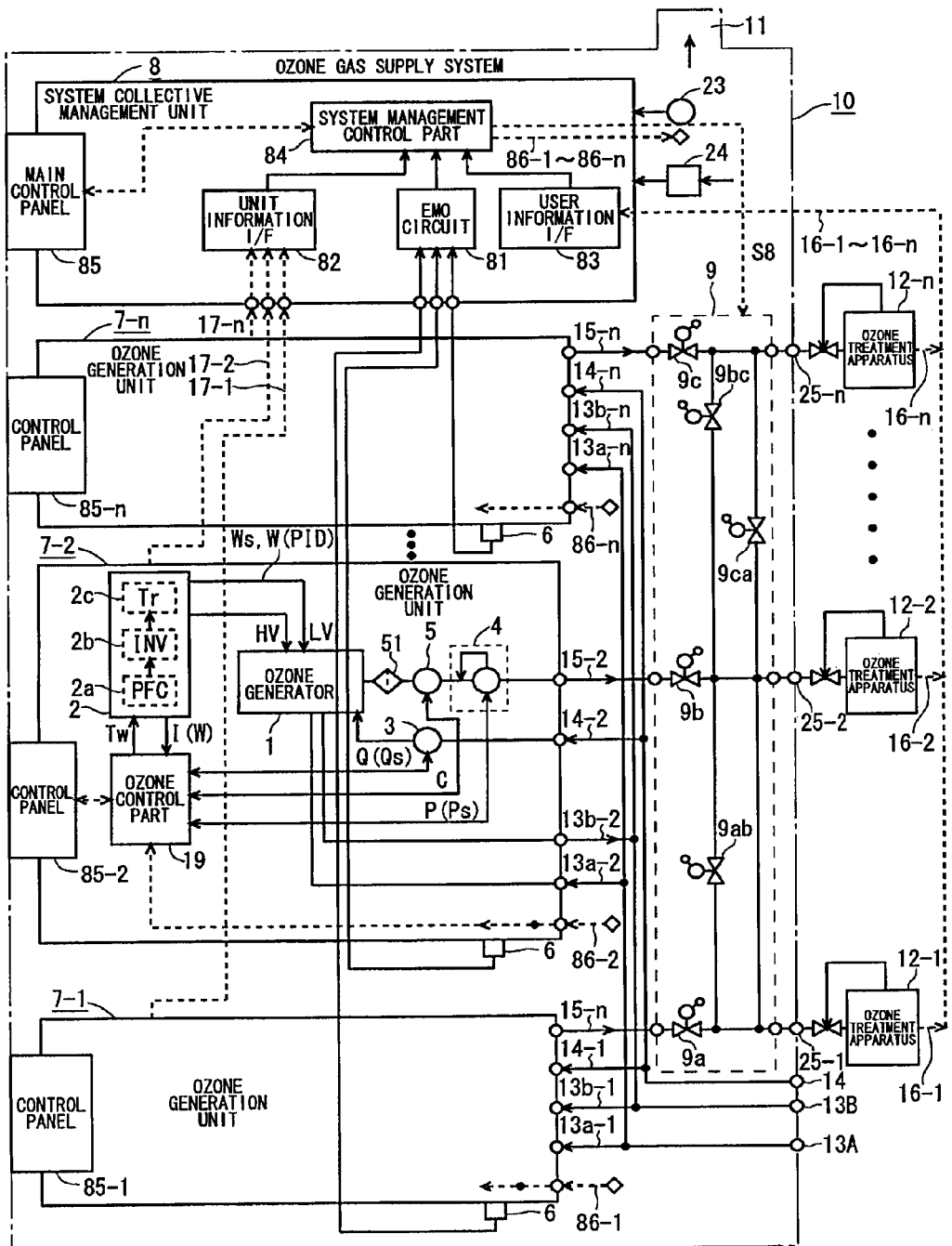
FIG. 1 A block diagram showing a configuration of an ozone gas supply system according to an embodiment 1 of the present invention.
Figure 4:
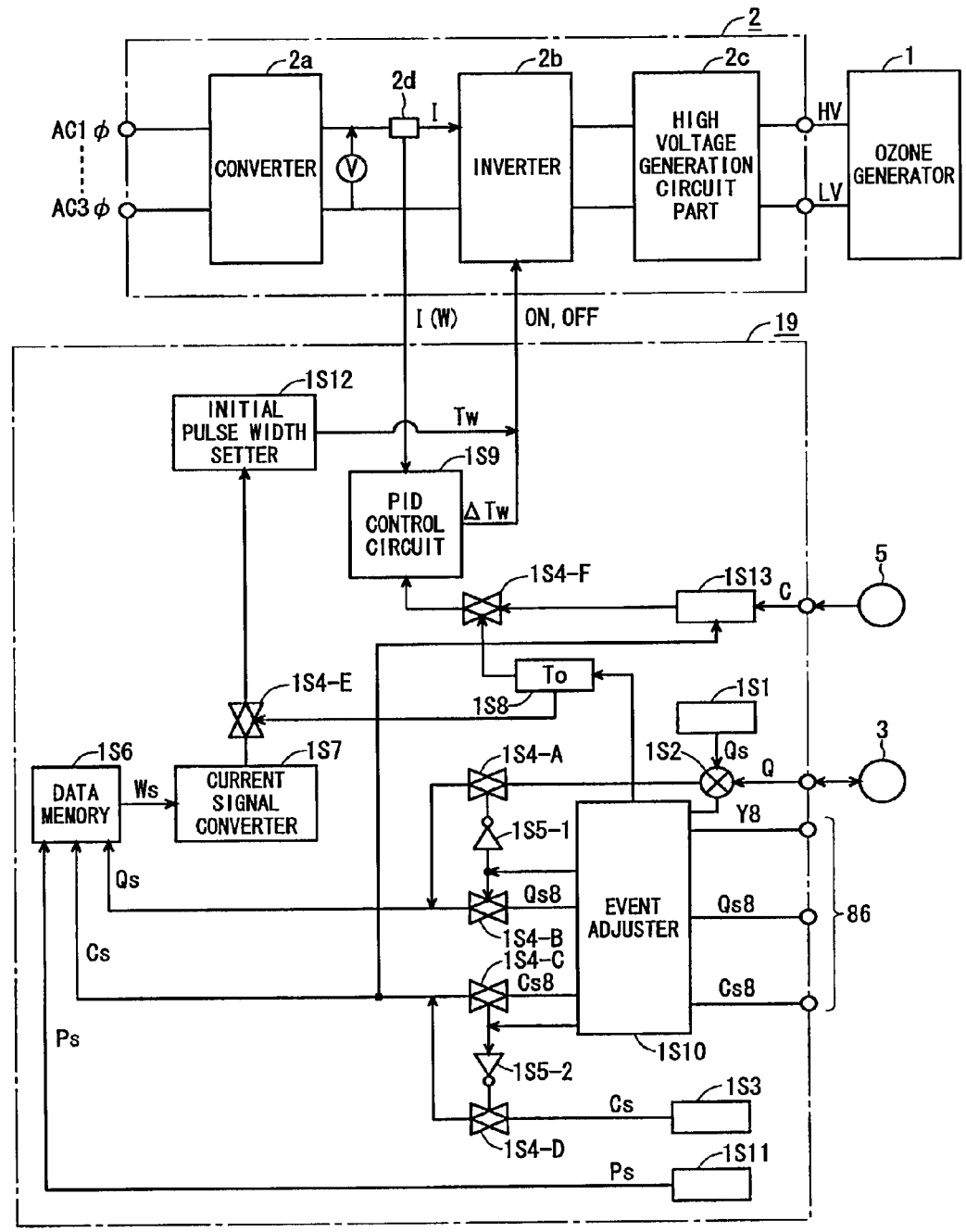
FIG. 4 A block diagram showing a configuration of an ozone control part included in an ozone generation unit shown in FIG. 1.
Figure 5:
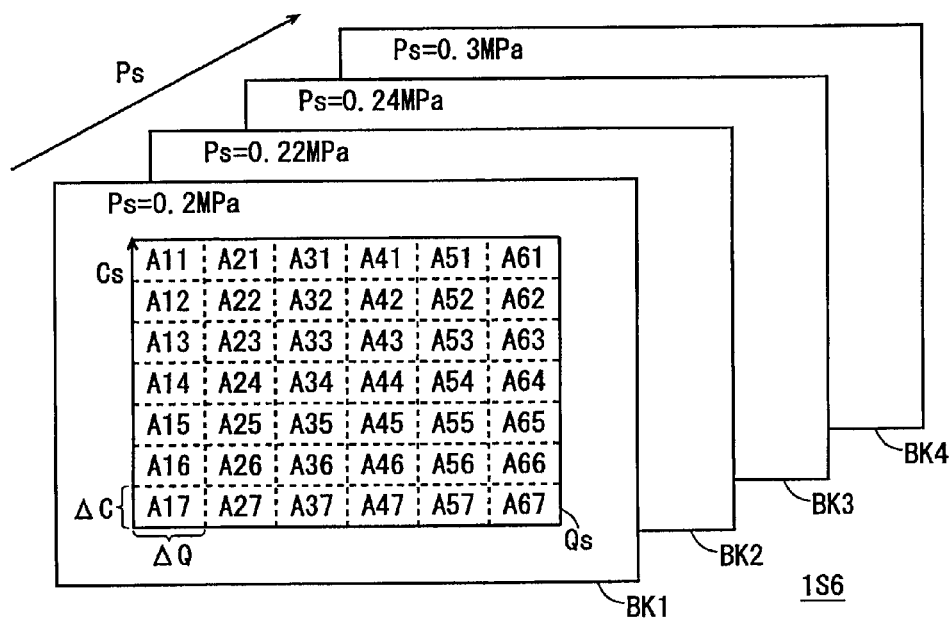
FIG. 5 An explanatory diagram schematically showing memory contents of a data memory included in the ozone generation unit shown in FIG. 1.

Hereinafter, an embodiment 1 of the present invention will be described with reference to FIGS. 1 to 6. FIGS. 1 to 6 will be briefly described as follows. FIG. 1 is a block diagram showing a configuration of an ozone gas supply system according to the embodiment 1 of the present invention. FIG. 2 is an explanatory diagram showing an internal configuration of an ozone gas output flow rate management unit of the ozone gas supply system shown in FIG. 1. FIG. 3 is an explanatory diagram schematically showing a display state of a main control panel of the ozone gas supply system according to the embodiment 1. FIG. 4 is a block diagram showing a configuration of an ozone control part included in an ozone generation unit shown in FIG. 1. FIG. 5 is an explanatory diagram schematically showing memory contents (such as initial conditions of the ozone generation unit for controlling the concentration and the flow rate) of a data memory included in the ozone generation unit shown in FIG. 1. FIG. 6 is a graph showing an output concentration control waveform for performing an output concentration control on the ozone generation unit 7 shown in FIG. 1.

(Overall Configuration)

As shown in FIG. 1, an ozone gas supply system 10 has n ($\geq 2$) ozone generation units 7-1 to 7-n included therein. In the following, among the ozone generation units 7-1 to 7-n, the ozone generation unit 7-2 will be taken as a representative, and an internal configuration thereof will be described with reference mainly to FIG. 1.

The interior of an ozone generator 1 is filled with a gas containing an oxygen gas. An ozone power source 2 included in the ozone gas supply system 10 applies high frequency high voltages HV and LV across electrodes in the ozone generator 1, thus causing dielectric-barrier discharge (silent discharge) between these electrodes. Thereby, a gas existing in a discharge space generates an ozone gas due to the discharging. The ozone power source 2 includes a converter 2a, an inverter 2b, and a high voltage circuit part 2c, which will be described in detail later.

In this embodiment, as a structure of the ozone generator 1, an ozone generator structured to employ the silent discharge is described as a representative. Here, for an ozone generation function, there may be adopted an ozone generator structured to employ creeping discharge or glow discharge, an ozone generator structured to employ super-high frequency or microwave discharge, or an ozone generator employing electrolytic medium. These ozone generators may be adopted.

A raw gas having a predetermined raw gas flow rate Q is obtained through a raw gas supply port 14 of the ozone gas supply system 10 and a raw gas supply port 14-2 of the ozone generation unit 7-2, and supplied to the ozone generator 1 with a constant flow rate through a gas flow rate controller (MFC) 3.

An ozone generator system is equipped with, as means for keeping the pressure in the ozone generator 1 constant, means for detecting a gas pressure in the generator and a function for finely adjusting the amount of ozone gas outputted by the generator thus detected and thereby keeping the pressure in the ozone generator 1 constant. One of methods therefor is implemented by an automatic pressure adjuster (APC) 4 for automatically adjusting the pressure in the generator to a predetermined pressure. The automatic pressure adjuster (APC) 4 is provided in an ozone gas output pipe gas line of the ozone generator.

A specific configuration of the ozone gas output pipe gas line is as follows. An ozone gas generated in the ozone generator 1 passes through a gas filter 51 for removing impurities and foreign substances therefrom, and then through an ozone concentration meter 5 and the automatic pressure adjuster (APC) 4 for automatically adjusting the pressure in the generator to a predetermined pressure. Thereby, the ozone (ozonized oxygen) gas having a predetermined ozone concentration C is continuously outputted from the ozone gas output port 15-2 to the outside of the ozone generation unit 7-2.

Sometimes, an ozone-gas flow rate controller (MFC) for keeping the flow rate of the output ozone gas constant is provided in the ozone gas output pipe gas line. In this embodiment, no ozone-gas flow rate controller (MFC) is provided.

Accordingly, a flow rate Qx of the output ozone gas is the sum of an ozone flow rate Qc and an flow rate Qn. The ozone flow rate Qc is for the ozone obtained as a result of conversion from the raw gas having the flow rate Q. The flow rate Qn is for a raw material oxygen that has not been converted from the raw gas having the flow rate Q. That is, the flow rate Qx of the ozone (ozonized oxygen) gas is determined by the formula (A): $\{Qx=F(Q,C) \ldots (A)\}$ which is based on the flow rate Q and the ozone concentration C of a raw material (oxygen) gas.

By the gas flow rate controller (MFC) 3, the flow rate of the raw gas supplied to the ozone generator is controlled to a constant value.

The APC 4 controls the pressure of the ozone gas flowing in an output pipe path for the ozone gas of the ozone generator 1, and thereby automatically controls the gas pressure of the ozone generator 1 to a constant value.

The ozone generation unit 7-2 is configured as a package unit as one unit in which a plurality of function means are assembled together, such as the ozone generator 1 having means for generating the ozone gas, the ozone power source 2 having means for supplying predetermined power to the ozone gas, the MFC 3 having means for controlling the flow rate of the supplied raw gas to a constant value, the APC 4 having means for controlling a pressure value of the pressure in the ozone generator 1 to a constant value, the gas filter 51 having means for trapping the impurity gas of the output ozone gas, and the ozone concentration meter 5 having means for detecting an output ozone concentration value. All the ozone generation units 7-1 to 7-n have identical configurations (only the configuration of 7-2 is shown), and have the internal configuration described for the ozone generation unit 7-2 as a representative.

Each of the ozone generation units 7 (ozone generation units 7-1 to 7-n) has a water leakage sensor 6 provided on a bottom surface thereof, to monitor presence or absence of water leakage of each ozone generation unit 7. More specifically, information obtained from the water leakage sensor 6 is supplied to an EMO circuit (emergency stop circuit) 81 in a system collective management unit 8, so that the monitoring can be made under control of a system management control part 84.

The system collective management unit 8 provided in the ozone gas supply system 10 receives detection information from each of an exhaust gas sensor 23 and an ozone leak sensor 24. The exhaust gas sensor 23 monitors and keeps a negative pressure state of the interior of the apparatus by vacuuming the interior through an exhaust duct 11. When the system collective management unit 8 receives an abnormal exhaust or an abnormal leakage from the exhaust gas sensor 23 or the ozone leak sensor 24, the system collective management unit 8 causes the system management control part 84 to supply ozone generation unit control signals 86-1 to 86-n that are stop instructions to all the ozone generation units 7-1 to 7-n, to thereby stop operations of the ozone generation units 7-1 to 7-n.

Also, the system management control part 84 provided in the system collective management unit 8 receives process ozone gas event signals 16-1 to 16-n from ozone treatment apparatuses 12-1 to 12-n through a user information I/F 83. The process ozone gas event signals 16-1 to 16-n include a request ozone flow rate Qs12 and a request ozone concentration Cs12.

Based on instructions indicated by the process ozone gas event signals 16-1 to 16-n, the system management control part 84 outputs the ozone generation unit control signals 86-1 to 86-n to the ozone generation units 7-1 to 7-n, and also outputs a control signal S8 to an ozone gas output flow rate management unit 9.

As a result, the flow rate and the concentration of an ozone gas outputted from each of the ozone generation units 7-1 to 7-n are controlled, and additionally the opening/closing of an ozone gas control valve 9a and the like provided in the ozone gas output flow rate management unit 9 is controlled. Thereby, an ozone gas having a gas flow rate and a gas concentration in accordance with the instructions of the process ozone gas event signals 16-1 to 16-n can be supplied to the ozone treatment apparatuses 12-1 to 12-n. In the following, the system collective management unit 8 will be described in more detail.

The system collective management unit 8 includes the EMO circuit 81 for stopping the apparatus in emergency, an unit information I/F 82, the user information I/F 83, the system management control part 84, and a main control panel 85.

As described above, the EMO circuit 81 is a circuit for monitoring a system error signal obtained from the water leakage sensor 6 of each ozone generation unit 7. To be more specific, when the EMO circuit 81 receives detection information indicating detection of abnormal water leakage from the water leakage sensor 6, the EMO circuit 81 transmits this information to the system management control part 84. Then, the system management control part 84 supplies the ozone generation unit control signal 86 (any one of the ozone generation unit control signals 86-1 to 86-n) to the ozone generation unit 7 corresponding to the water leakage sensor 6 that has detected the abnormal water leakage. Thus, the ozone generation unit 7 is stopped.

The unit information I/F 82 receives unit information signals 17-1 to 17-n from the ozone generation units 7-1 to 7-n.

As described above, the user information I/F 83 receives the process ozone gas event signals 16-1 to 16-n (indicating the request ozone flow rate Qs12, the request ozone concentration Cs12, operation information Y, an apparatus No., and the like), which are command signals, from the ozone treatment apparatuses 12-1 to 12-n.

The system management control part 84 outputs the control signal S8 which is a command for controlling the opening/closing of the ozone gas control valves (9a, 9b, 9c, 9ab, 9bc, 9ca) provided in the ozone gas output flow rate management unit 9, and thereby collectively controls the parts within the ozone gas output flow rate management unit 9. The system management control part 84 also receives information from the main control panel 85.

As shown in FIG. 1, the ozone gas supply system 10 includes a cooling water inlet port 13A and a cooling water outlet port 13B. Cooling water is introduced from an external cooling system (not shown) through the cooling water inlet port 13A and cooling water inlet ports 13a-1 to 13a-n into the ozone generation units 7-1 to 7-n. The water having served for the cooling is outputted from the ozone generation units 7-1 to 7-n through cooling water outlet ports 13b-1 to 13b-n and the cooling water outlet port 13B to the outside.

The ozone gas supply system 10 has the raw gas supply port 14. The raw gas is introduced from the outside into the ozone generation units 7-1 to 7-n through the raw gas supply port 14 and the raw gas supply ports 14-1 to 14-n.

The ozone gas output ports 15-1 to 15-n of the ozone generation units 7-1 to 7-n are connected to the ozone gas output flow rate management unit 9 in the ozone gas supply system 10, and the ozone gas is outputted from the ozone gas output flow rate management unit 9 through ozone gas output ports 25-1 to 25-n to the outside of the ozone gas supply system 10.

The process ozone gas event signals 16-1 to 16-n outputted from the n ozone treatment apparatuses 12-1 to 12-n are inputted to the system management control part 84 via the user information I/F 83. The process ozone gas event signal 16 (16-1 to 16-n) indicates the request ozone flow rate Qs12, the request ozone concentration Cs12, the operation information Y, and the like. The system management control part 84 outputs the ozone generation unit control signals 86-1 to 86-n for controlling the ozone generation units 7-1 to 7-n based on the process ozone gas event signals 16-1 to 16-n.

The ozone generation units 7-1 to 7-n include ozone generation unit control panels 85-1 to 85-n. The unit information signals 17-1 to 17-n are transmitted from the ozone generation units 7-1 to 7-n to the system management control part 84 via the unit information I/F 82 of the system collective management unit 8. The unit information signal 17 (17-1 to 17-n)

is an information signal indicating the breakdown and an operating/stopping state of the ozone generator 1 included in each ozone generation unit 7.

The operation information Y included in the process ozone gas event signal 16 corresponds to a user information signal indicating the breakdown and an operating/stopping state of each ozone treatment apparatus 12 (12-1 to 12-*n*), and, as described above, outputted to the user information I/F 83 of the system collective management unit 8.

Each of the ozone generation units 7-1 to 7-*n* includes an ozone control part 19. The ozone control part 19 is a control part, as will be detailed later, that receives a set flow rate Qs and a detected flow rate Q for the flow rate of the raw gas, a set pressure Ps and a detected pressure P for the pressure of the ozone generator 1, and the ozone concentration C of the ozone outputted from each ozone generation unit 7, and that controls the ozone power source 2 to thereby control the ozone concentration, the gas flow rate, and the like, of the ozone gas generated in the ozone generator 1. The ozone control part 19 communicates signals with the ozone concentration meter 5, the MFC 3, the APC 4, and the ozone power source 2.

(Control of Ozone Gas Output Flow Rate Management Unit)

As shown in FIG. 2, the ozone gas output flow rate management unit 9 has ozone gas input ports 29-1 to 29-*n* corresponding to output parts of the ozone generation units 7-1 to 7-*n*, respectively, and ozone gas output ports 39-1 to 39-*n* corresponding to input parts of the ozone treatment apparatuses 12-1 to 12-*n*, respectively. Ozone gas on/off valves 22-1 to 22-*n* are interposed between the ozone gas output ports 39-1 to 39-*n* (ozone gas output ports 25-1 to 25-*n*) and the ozone treatment apparatuses 12-1 to 12-*n*. The ozone treatment apparatuses 12-1 to 12-*n* open the ozone gas on/off valves 22-1 to 22-*n* at a time of the ozone gas supply. This ozone gas supply system 10 is configured as a system including n ozone gas output ports, that is, the ozone gas output ports 39-1 to 39-*n*. However, if the number of ozone treatment apparatuses at the user side is less than n, a pipe fitting of the ozone gas output port 39 not serving to output may be capped to plug an output of gas.

The ozone gas output flow rate management unit 9 is provided therein with the ozone gas control valves 9*a*, 9*b*, 9*c*, 9*bc*, 9*ab*, and 9*ca*. The ozone gas control valves 9*a*, 9*b*, and 9*c* are normally open (NO), and the ozone gas control valves 9*bc*, 9*ab*, and 9*ca* are normally close (NC). For convenience of the description, FIG. 2 shows a specific case where n=3. As the ozone gas control valves 9*a*, 9*b*, 9*c*, 9*bc*, 9*ab*, and 9*ca*, electrically-operated valves or pneumatic valves which are openable and closable by means of electricity or air pressure are conceivable.

The ozone gas control valves 9*a* to 9*c* are interposed between the ozone gas input ports 29-1 to 29-*n* for the input of the ozone gas from the ozone generation units 7-1 to 7-*n*, and the ozone gas output ports 39-1 to 39-*n*. The ozone gas control valve 9*ab* is provided between the outputs of the ozone gas control valves 9*a* and 9*b*. The ozone gas control valve 9*bc* is provided between the outputs of the ozone gas control valves 9*b* and 9*c*. The ozone gas control valve 9*ca* is provided between the outputs of the ozone gas control valves 9*c* and 9*a*.

An open state and a closed state of each of the ozone gas control valves 9*a*, 9*b*, 9*c*, 9*bc*, 9*ab*, and 9*ca* are controlled based on the control signal S8 supplied from the system management control part 84 of the system collective management unit 8.

In FIG. 2, among the ozone treatment apparatuses 12-1 to 12-*n*, only one ozone treatment apparatus 12-2 is operated, and the ozone gas on/off valve 22-2 thereof is in the open state (blacked out). FIG. 2 shows a state of the ozone gas output flow rate management unit 9 in a case where the flow rate of the ozone gas supplied to the ozone treatment apparatus 12-2 is 30 SLM (L/min). In other words, the ozone treatment apparatus 12-2 instructs that the ozone flow rate be 30 SLM based on the request ozone flow rate Qs12 included in the process ozone gas event signal 16-2.

The system management control part 84 provided in the system collective management unit 8 controls, by the ozone generation unit control signals 86-1 to 86-*n*, the ozone generation units 7-1 to 7-*n* such that the ozone gas can be supplied by 10 SLM from each of the ozone generation units 7-1 to 7-*n*.

Further, the system management control part 84 controls, by the control signal S8, the open and closed states of each of the ozone gas control valves 9*a*, 9*b*, 9*c*, 9*bc*, 9*ab*, and 9*ca* in the ozone gas output flow rate management unit 9. More specifically, the system management control part 84 outputs, to the ozone gas output flow rate management unit 9, the control signal S8 for bringing the ozone gas control valves 9*a*, 9*b*, 9*c*, 9*bc*, and 9*ab* into the open state (blacked out) while bringing the ozone gas control valve 9*ca* into the closed state (shown in white).

As mentioned above, among the ozone gas on/off valves 22-1 to 22-*n*, only the ozone gas on/off valve 22-2 is in the open state, and the ozone gas on/off valves 22-1 and 22-*n* are in the closed state. In the description given herein, the ozone treatment apparatus 12 not to be used is brought into the closed state by means of the ozone gas on/off valves 22-1 to 22-*n*. Alternatively, it may be acceptable that the ozone treatment apparatus not to be used is forcibly capped by a pipe fitting at the portion 25-1 to 25-*n* in order to block the ozone gas supply.

In this manner, the system management control part 84 causes each of the ozone generation units 7-1 to 7-*n* to supply the ozone gas with a flow rate of 10 SLM by the ozone generation unit control signals 86-1 to 86-*n*, and also controls the ozone gas output flow rate management unit 9 based on the control signal S8. Thereby, the system management control part 84 can supply the ozone gas to the ozone treatment apparatus 12-2 with a gas flow rate of 30 SLM (10 SLM×3).

(Main Control Panel)

As shown in FIG. 3, the main control panel 85 of the ozone gas supply system 10, on a display surface thereof, the open and closed states of the ozone gas control valves 9*a*, 9*b*, 9*c*, 9*bc*, 9*ab*, and 9*ca* in association with the ozone generation units 7-1 to 7-*n* and the ozone treatment apparatuses 12-1 to 12-*n*. The request ozone flow rate Qs12 (SLM) and the request ozone concentration Cs12 (g/m$^3$) of the ozone treatment apparatuses 12-1 to 12-*n* are also displayed.

In an example shown in FIG. 3, only the ozone treatment apparatus 12-2 requests the request ozone flow rate Qs12=30 SLM and the request ozone concentration Cs12=280 (g/m$^3$).

Thereby, each of the ozone generation units 7-1 to 7-*n* is caused to output the ozone gas with an ozone flow rate of 10 (SLM) and an ozone concentration of 280 (g/m$^3$), and the ozone gas control valves 9*a*, 9*b*, 9*c*, 9*bc*, and 9*ab* are brought into the open state while the ozone gas control valve 9*ca* is brought into the closed state. Thus, the ozone gas can be supplied to the ozone treatment apparatus 12-2 with an ozone flow rate of 30 (SLM) and an ozone concentration of 280 (g/m$^3$).

(Ozone Control Part)

As shown in FIG. 4, the ozone control part 19 provided in each ozone generation unit 7 controls the ozone power source 2 to thereby control an ozone generation (the gas flow rate and the ozone gas concentration) of the ozone generator 1.

The ozone power source 2 includes a converter 2a, an inverter 2b, a high voltage circuit part 2c, and a current sensor 2d. The converter 2a rectifies commercial AC voltages AC1φ to AC3φ. The inverter 2b converts a DC voltage into an optimum frequency for the ozone generator 1, and controls an output voltage to supply predetermined power to the ozone generator 1. The high voltage circuit part 2c raises the voltage outputted from the inverter 2b into a high voltage capable of generating the discharge that causes the ozone generation in the ozone generator 1. The converter 2a, the inverter 2b, and the high voltage circuit part 2c are connected in series in the mentioned order. The current sensor 2d is interposed between the converter 2a and the inverter 2b.

In order to control the ozone gas generation (the gas flow rate Q and the ozone concentration C) in the ozone generator 1, the ozone control part 19 applies the high frequency high voltages HV and LV, which are outputted by the high voltage circuit part 2c, to the ozone generator 1, and causes a discharge phenomenon to thereby generate an ozone gas containing a predetermined amount of ozone from an oxygen gas which is the raw gas.

The ozone control part 19 includes a raw gas flow rate setter 1S1, a selector 1S2, an ozone concentration setter 1S3, analog switches 1S4-A to 1S4-F for controlling ON/OFF of the respective control signals, and inverter devices 1S5-1, 1S5-2 for inverting the respective control signals.

The ozone control part 19 further includes a data memory 1S6 and a current signal converter 1S7. The data memory 1S6 stores a set power Ws necessary for generating an optimum amount of ozone in response to the raw gas set flow rate Qs, the set concentration Cs, and a signal including a set pressure Ps of the ozone generator 1. The current signal converter 1S7 converts the set power Ws into a current signal for applying a necessary current to the ozone power source.

Additionally, the ozone control part 19 includes a timer 1S8 and a PID control circuit 1S9. The timer 1S8 drives the inverter 2b based on an initial current command, and switches into a PID control in response to the flow rate Q of the actually flowing raw gas and the generated ozone concentration C obtained by the MFC 3 and the ozone concentration meter 5. The PID control circuit 1S9 performs the PID control based on a result of comparison between the ozone concentration C and the gas set concentration Cs.

Moreover, the ozone control part 19 includes an event adjuster 1S10 for receiving the ozone generation unit control signal 86 from the system management control part 84 and adjusting the signal including the set flow rate Qs and the set ozone concentration Cs based on the request ozone flow rate Qs8, the request ozone concentration Cs8, and the operation information Y8 indicated by the ozone generation unit control signal 86.

Furthermore, the ozone control part 19 includes a pressure setter 1S11, an initial pulse width setter 1S12, and a current converter 1S13. The initial pulse width setter 1S12 sets, based on the output current of the current signal converter 1S7, an initial pulse width in which the inverter 2b is turned ON, for controlling the applied power. The current converter 1S13 receives the ozone concentration C detected by the ozone concentration meter 5 and the set ozone concentration Cs, and, based on a result of comparison between the ozone concentration C and the raw gas set concentration Cs, outputs a current signal for controlling the power applied to the inverter 2b.

(Data Memory 1S6)

As shown in FIG. 5, the data memory 1S6, which stores initial conditions for controlling the ozone concentration and the ozone flow rate in the ozone generation unit 7, includes a plurality of memory banks BK1 to BK4 (four memory banks are shown in FIG. 5 for convenience of the description), with the set pressure Ps of the ozone generator 1 serving as a parameter. If the set pressure Ps of the ozone generator 1 is determined, accordingly the memory bank BKx (any one of the memory banks 1 to 4) corresponding to the set pressure Ps is selected.

As shown in FIG. 5, the one memory bank BK selected is divided into a plurality of areas each corresponding to ΔQ along a horizontal axis (X-axis) that represents an address of the set flow rate Qs for the ozone-gas flow rate, while the one memory bank BK selected is divided into a plurality of areas each corresponding to AC along a vertical axis (Y-axis) that represents an address of the set concentration Cs for the ozone concentration.

The data memory 1S6 receives the signal including the set flow rate Qs and the set concentration Cs functioning as the address in the horizontal axis (X-axis) and the vertical axis (Y-axis). In the data memory 1S6, a set power amount W (A11 to A17, . . . , A61 to A67) required for generating a predetermined amount of ozone is written into a memory address which is determined by the address in the X-axis and the Y-axis. The data memory 1S6 outputs the set power amount Ws to the current signal converter 1S7 provided in the ozone control part 19. As a result, the current signal converter 1S7 converts the set power amount Ws into the current signal. The current signal is supplied through the analog switch 1S4-E to the initial pulse width setter 1S12. The initial pulse width setter 1S12 outputs a pulse signal Tw to the inverter 2b. The pulse signal Tw has a predetermined frequency and a predetermined pulse width, and is for achieving the set power amount Ws.

As shown in FIG. 6, the output concentration control waveform for performing the output concentration control on the ozone generation unit 7 corresponds to an operation command signal (included in the operation information Y8) supplied to the ozone generation unit 7, and, in an initial state defined by a set time period To, sets the power applied to the inverter 2b based on the set power amount Ws supplied from the data memory 1S6.

After the elapse of the set time period To, the timer 1S8 performs a time control so that the control is switched to the PID control by the PID control circuit 1S9. The PID control circuit 1S9 slightly varies a pulse width ΔTw of the pulse signal Tw based on the current signal (the signal determined based on the result of comparison between the ozone gas concentration C (detected by the ozone concentration meter 5) and the gas set concentration Cs) supplied from the current converter 1S13. Thereby, the PID control circuit 1S9 performs the PID control of the power applied to the inverter 2b. As a result, the ozone concentration (C) of the ozone generated in the ozone generator 1 exhibits the control responsiveness waveform shown in part (a) of FIG. 6.

Hereinafter, a concentration control shown in FIG. 6 will be described in detail. Firstly, a description will be given to an operation of only the ozone generation unit 7, which is not based on the ozone generation unit control signal 86.

Triggered by an input of an operation command (not shown), the event adjuster 1S10 activates the timer 1S8. At this time, the event adjuster 1S10 controls the selector 1S2 so as to select the raw gas set flow rate Qs of the raw gas flow rate setter 1S1, and brings the analog switches 1S4-A and 1S4-D into the ON state while bringing the analog switches 1S4-B and 1S4-C into the OFF state. On the other hand, the timer 1S8, immediately after being activated, brings the analog switch 1S4-E into the ON state while bringing the analog switch 1S4-F into the OFF state.

Thus, the data memory 1S6 obtains the set pressure Ps from the pressure setter 1S11, the raw gas set flow rate Qs from the raw gas flow rate setter 1S1, and the raw gas set concentration Cs from the ozone concentration setter 1S3. Consequently, as described above, the data memory 1S6 outputs the set power amount Ws to the current signal converter 1S7. As a result, the initial pulse width setter 1S12 generates the pulse signal Tw having the initial pulse width. The ON/OFF of the inverter 2b is controlled in accordance with "H" or "L" of the pulse signal Tw.

In this manner, within the set time period To for which the timer 1S8 is in an operation state, an initial control is performed based on the set power amount Ws supplied from the data memory 1S6.

Then, if the set time period To has elapsed after the timer 1S8 is activated, the initial state ends, and the analog switch 1S4-E is switched to the OFF state while the analog switch 1S4-F is switched to the ON state.

Thus, the PID control circuit 1S9 performs the PID control on the ozone power source 2. The PID control is mainly for, based on the current signal supplied from the current converter 1S13, causing a slight displacement (ΔTw) of the pulse width of the pulse signal Tw so as to reflect the result of comparison between the ozone concentration C obtained by the ozone concentration meter 5 and the gas set concentration Cs. Here, also based on a current I detected by the current sensor 2d, the PID control circuit 1S9 causes the slight displacement ΔTw. In this manner, the control is switched to the PID control (W) if the set time period To has elapsed after the operation command.

Next, a description will be given to an operation of only the ozone generation unit 7, which is based on the ozone generation unit control signal 86.

Triggered by an input of the ozone generation unit control signal 86 indicating the request ozone flow rate Qs8, the request ozone concentration Cs8, and the operation information Y8, the event adjuster 1S10 activates the timer 1S8. At this time, the analog switches 1S4-A and 1S4-D are brought into the OFF state, and the analog switches 1S4-B and 1S4-C are brought into the ON state. On the other hand, the timer 1S8, immediately after being activated, brings the analog switch 1S4-E into the ON state while bringing the analog switch 1S4-F into the OFF state.

The request ozone flow rate Qs8 and the request ozone concentration Cs8 are determined by the system management control part 84 based on the request ozone flow rate Qs12 and the request ozone concentration Cs12 that are indicated by the process ozone gas event signals 16-1 to 16-n supplied from the ozone treatment apparatuses 12-1 to 12-n.

Thus, the data memory 1S6 obtains the set pressure Ps from the pressure setter 1S11, and the request ozone flow rate Qs8 and the request ozone concentration Cs8 indicated by the ozone generation unit control signal 86 which serve as the set flow rate Qs and the set concentration Cs. Consequently, as described above, the data memory 1S6 outputs the set power amount Ws to the current signal converter 1S7. As a result, the initial pulse width setter 1S12 generates the pulse signal Tw having the initial pulse width.

In this manner, also by the input of the ozone generation unit control signal 86, the initial control is performed based on the set power amount Ws supplied from the data memory 1S6 within the set time period To for which the timer 1S8 is in the operation state.

Then, if the set time period To has elapsed after the timer 1S8 is activated, the initial state ends, and the analog switch 1S4-E is switched to the OFF state while the analog switch 1S4-F is switched to the ON state.

Thus, the PID control circuit 1S9 performs the PID control on the ozone power source 2. The PID control is mainly for, based on the current signal supplied from the current converter 1S13, causing a slight displacement (ΔTw) of the pulse width of the pulse signal Tw.

Figure 7:
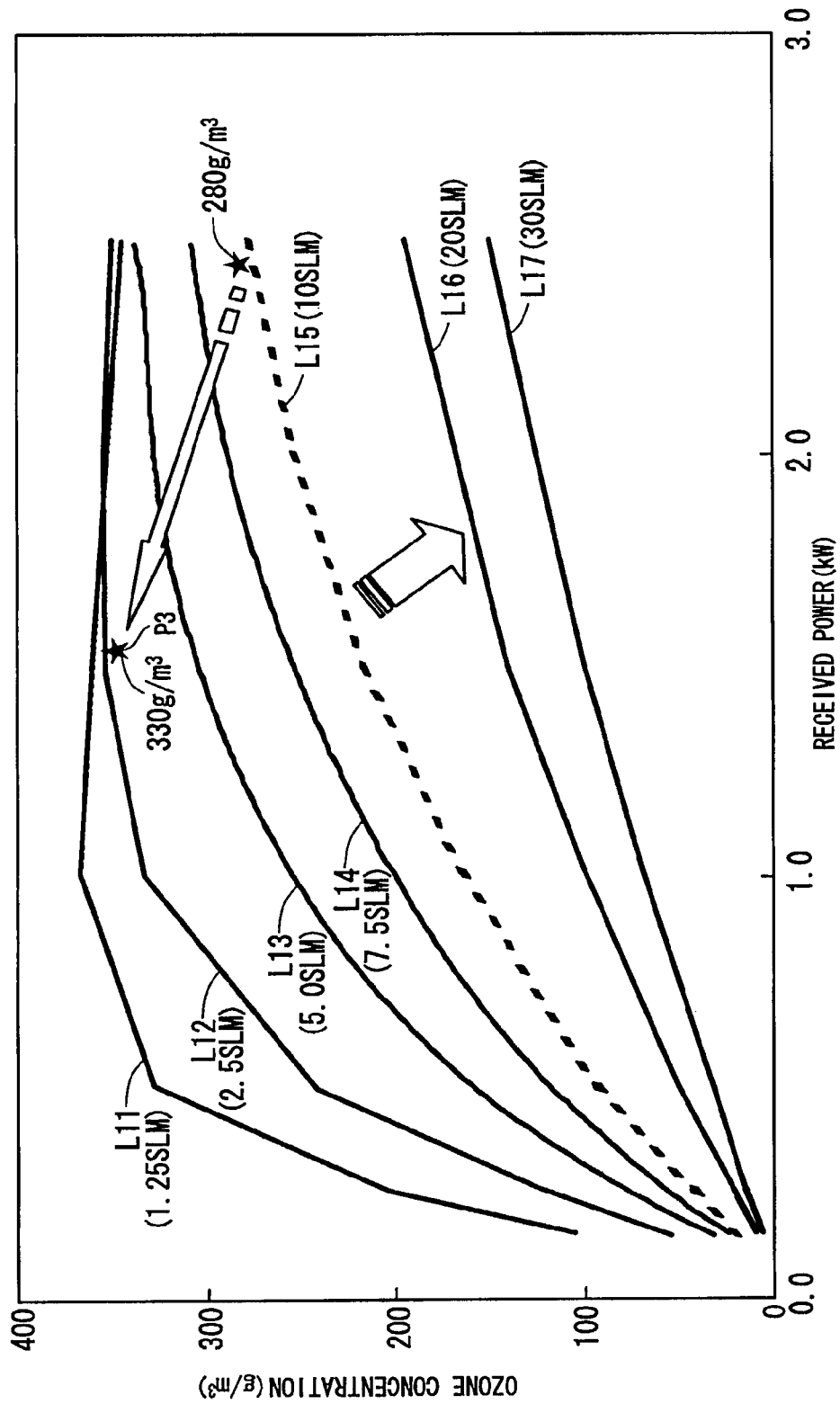
FIG. 7 A graph showing received power of an ozone power source included in a single ozone generation unit, and ozone concentration characteristics of ozone occurring in an ozone generator.

As thus far described, the ozone control part 19 performs the initial control and the PID control on the ozone power source 2. FIG. 7 is a graph showing received power of the ozone power source 2 of 2.5 KW provided in one ozone generation unit 7, and ozone concentration characteristics of ozone occurring in the ozone generator 1.

In FIG. 7, ozone concentration characteristics L11 represent the ozone concentration characteristics obtained when the flow rate Q of the ozone gas supply is 1.25 L/min (=1.25 SLM). In this case, by making the received power variable in a range of 100 W to 1.0 kW, the occurring ozone concentration can be variably set in a range of about 0 $g/m^3$ to 360 $g/m^3$.

In the same manner, ozone concentration characteristics L12 represent the ozone concentration characteristics obtained when the flow rate Q of the ozone gas supply is 2.5 SLM. In this case, by making the received power variable in a range of 100 W to 2.0 kW, the ozone concentration can be variably set in a range of about 0 $g/m^3$ to 360 $g/m^3$.

Ozone concentration characteristics L13 represent the ozone concentration characteristics obtained with the flow rate Q of the ozone gas supply is 5.0 SLM. Ozone concentration characteristics L14 represent the ozone concentration characteristics obtained when the flow rate Q of the ozone gas supply is 7.5 SLM. Ozone concentration characteristics L15 represent the ozone concentration characteristics obtained with the flow rate Q of the ozone gas supply is 10 SLM. Ozone concentration characteristics L16 represent the ozone concentration characteristics obtained when the flow rate Q of the ozone gas supply is 20 SLM. Ozone concentration characteristics L17 represent the ozone concentration characteristics obtained when the flow rate Q of the ozone gas supply is 30 SLM.

In a case where the ozone gas is supplied from one ozone generation unit 7 with a flow rate Q of 5 SLM, the maximum ozone concentration generated by the received power 2.5 kW is 350 $g/m^3$ (see the ozone concentration characteristics L13). In a case where the ozone gas is supplied with a flow rate Q of 7.5 SLM, the maximum ozone concentration generated by the received power 2.5 kW is 300 $g/m^3$ (see the ozone concentration characteristics L14).

In a case where the ozone gas is supplied with a flow rate Q of 10 SLM, the maximum ozone concentration generated by the received power 2.5 kW is only 280 $g/m^3$ (see the ozone concentration characteristics L15). In a case where the ozone gas is supplied with a flow rate Q of 20 SLM, the maximum ozone concentration generated by the received power 2.5 kW is only 180 $g/m^3$ (see the ozone concentration characteristics L16). In a case where the ozone gas is supplied with a flow rate Q of 30 SLM, the maximum ozone concentration generated by the received power 2.5 kW is only 140 $g/m^3$ (see the ozone concentration characteristics L17).

In order to maintain an ozone concentration of 280 $g/m^3$ in the ozone generation unit 7 including the ozone power source 2 with a received power of 2.5 kW, the highest possible flow rate of the supply by one ozone generator 1 is 10 SLM. In other words, in order to satisfy an ozone concentration of 280 $g/m^3$ by using one ozone generator 1, the ozone gas cannot be supplied with a flow rate equal to or higher than 10 SLM.

On the other hand, the ozone gas supply system 10 of this embodiment adopts an output ozone gas output control method in which the ozone gas output flow rate management unit 9 can selectively output one or more of n ozone gas outputs supplied from the n ozone generation units 7-1 to 7-*n* to any ozone treatment apparatus 12 among the ozone treatment apparatuses 12-1 to 12-*n*.

Therefore, in the ozone gas supply system 10 of the embodiment 1, by controlling the opening/closing of the ozone gas control valves 9*ab*, 9*bc*, and 9*ca* provided between the units within the ozone gas output flow rate management unit 9 in the manner as shown in FIGS. 2 and 3, all the ozone gas generated by the n ozone generation units 7-1 to 7-*n* can be supplied to only one ozone treatment apparatus 12-2. Accordingly, by causing each of the ozone generation units 7-1 to 7-*n* to output the ozone gas with a flow rate of 10 SLM and an ozone gas concentration of 280 g/m$^3$, the ozone gas can be supplied to the ozone treatment apparatus 12-2 with a gas flow rate of 30 SLM, and at that time, the ozone concentration can be made as high as 280 g/m$^3$. This provides an effect that the treatment capacity of the ozone treatment apparatus such as a processing speed and a capability can be considerably improved while using the existing ozone generator.

Additionally, if the flow rate of the raw gas is 10 SLM in the ozone generation unit 7, the maximum outputtable ozone concentration is 280 g/m$^3$. However, the ozone concentration can be increased by using the control of opening/closing of the ozone gas control valves 9*ab*, 9*bc*, and 9*ca* provided between the units in the ozone gas output flow rate management unit 9.

For example, if the opening/closing of the ozone gas control valves 9*a*, 9*b*, 9*c*, 9*bc*, 9*ab*, and 9*ca* is controlled as shown in FIGS. 2 and 3 such that each of the three ozone generation units 7 can supply the gas with a flow rate of 3.3 SLM, the output concentration can be increased to the maximum value of the ozone concentration corresponding to 3.3 SLM. Thus, as indicated by an imaginary point P3, the ozone gas can be supplied with a total flow rate of 10 SLM with an ozone concentration of about 330 g/m$^3$. This provides an effect that an ozone treatment capacity of the ozone treatment apparatus 12-2 that receives the ozone gas supply can be increased.

In the ozone gas supply system 10 of this embodiment that adopts the output ozone gas output control method in which the n ozone generation units 7 are mounted and the ozone gas output flow rate management unit 9 is formed, breakdown of any of the ozone generation units 7-1 to 7-*n* does not make the corresponding ozone treatment apparatus 12 unusable. The ozone gas outputted from the ozone generation unit 7 not broken down can be supplied by opening/closing the ozone gas control valves 9*ab*, 9*bc*, and 9*ca*. This can provide an ozone gas supply system with a higher reliability of ozone gas supply.

For example, in a case where the ozone generation unit 7-2 corresponding to the ozone treatment apparatus 12-2 is broken down, the ozone gas supplied from the ozone generation unit 7-1 can be supplied to the ozone treatment apparatus 12-2 by bringing the ozone gas control valves 9*a*, 9*ab* and the ozone gas on/off valve 22-2 into the open state.

Furthermore, even though any of the n ozone treatment apparatuses 12-1 to 12-*n* is broken down or stops its operation, the operation information Y of the process ozone gas event signal 16 is introduced and thereby the operation of the ozone generation unit 7 that is supplying the ozone gas to the broken-down ozone treatment apparatus 12 can be promptly stopped by the ozone generation unit control signal 86.

(Effects, etc.)

In the embodiment 1 described above, one ozone gas supply system 10 includes the plurality of ozone generation units 7-1 to 7-*n*, and each ozone generation unit 7 includes the ozone generator 1, the ozone power source 2 for controlling power to be supplied for ozone generation, the MFC 3 for controlling the flow rate Q of the ozone gas, the APC 4 for automatically controlling the pressure P in the ozone generator 1, and the ozone concentration meter 5 for detecting the output ozone concentration value C.

In the ozone gas supply system 10, the ozone gas output flow rate management unit 9 is provided in which the on/off valve (ozone gas control valves 9*a* to 9*c*) is arranged corresponding to the output ozone gas pipe of each ozone generator 1, and additionally the on/off valve (9*bc*, 9*ab*, 9*ca*) is arranged between the output ozone gas pipes of the respective ozone generators 1.

The ozone gas supply system 10 of the embodiment 1 includes the system collective management unit 8 (ozone gas output flow rate management unit) that can control the ozone gas output flow rate so that one or a combination of two or more of the plurality of ozone gas outputs from the ozone generation units 7-1 to 7-*n* can be selectively outputted to any of the ozone treatment apparatuses 12-1 by the opening/closing operation of the ozone gas control valves 9*a*, 9*b*, 9*c*, 9*bc*, 9*ab*, and 9*ca* provided in the ozone gas output flow rate management unit 9.

Accordingly, by bringing the ozone gas control valves 9*a*, 9*b*, and 9*c* into the open state, bringing the ozone gas control valves 9*ab*, 9*bc*, and 9*ca* into the closed state, and bringing the ozone gas on/off valves 22-1 to 22-*n* into the open state so that the ozone gas can be supplied from the ozone generation units 7-1 to 7-*n* to the ozone treatment apparatuses 12-1 to 12-*n* that are in one-to-one correspondence with each other, the flow rate and the ozone gas concentration of the ozone gas supply can be independently controlled in each of the ozone treatment apparatuses 12-1 to 12-*n*.

Additionally, as shown in FIGS. 2 and 3, by supplying a combination of two or more ozone gas outputs to one ozone treatment apparatus (ozone treatment apparatus 12-2), the ozone gas can be supplied with various gas flow rates and concentrations.

Moreover, even if trouble occurs in a part of the ozone generation units 7-1 to 7-*n*, the other ozone generation units 7 that are normally operating can supply the ozone gas to any of the ozone treatment apparatuses 12-1 to 12-*n*. Therefore, an ozone gas supply with a high reliability can be achieved.

In this manner, the ozone gas supply system 10 controls the ozone gas output flow rate management unit 9 based on the control signal S8 supplied from the system management control part 84, to perform a combination/selection process for combining and selecting ozone gas outputs from the ozone generation units 7-1 to 7-*n*, so that the ozone gas can be outputted to the ozone treatment apparatus 12 with a desired gas flow rate and a desired ozone gas concentration.

In the ozone gas supply system 10 of the embodiment 1, the ozone gas control valves 9*a*, 9*b*, 9*c*, 9*bc*, 9*ab*, and 9*ca* provided in the ozone gas output flow rate management unit 9 can be electrically-operated valves or pneumatic valves that are openable and closable by means of electricity or air pressure, so that the gas flow rate and the ozone gas concentration of the ozone gas outputted from the ozone generator 1 of each ozone generation unit 7 to the outside can be centrally managed under control of the control signal S8.

The system collective management unit 8 includes the water leakage sensor 6, the EMO circuit 81, the unit information I/F 82, the system management control part 84, and the like. Thereby, in a case where an emergency stop or water leakage is detected in any of the ozone generation units 7-1 to 7-*n*, the corresponding said ozone generation unit can be stopped.

Furthermore, the exhaust gas sensor 23, the ozone leak sensor 24, the system management control part 84, and the like, are provided. Thereby, in a case where an abnormal exhaust or ozone abnormal leakage is detected in the system as a whole, all the ozone generation units 7-1 to 7-$n$ can be stopped.

In this manner, the ozone gas supply system 10 of the embodiment 1 has a safety shutdown function in case of trouble of each ozone generation unit 7, trouble of the entire ozone gas supply system 10, and the like. Thus, a system with a high security can be achieved.

Embodiment 2

An embodiment 2 is characterized by focusing on the ozone generation unit 7 as one unit corresponding to each of the ozone generation units 7-1 to 7-$n$ in the ozone gas supply system 10, and achieving downsizing of the ozone generation unit 7.

Figure 8:
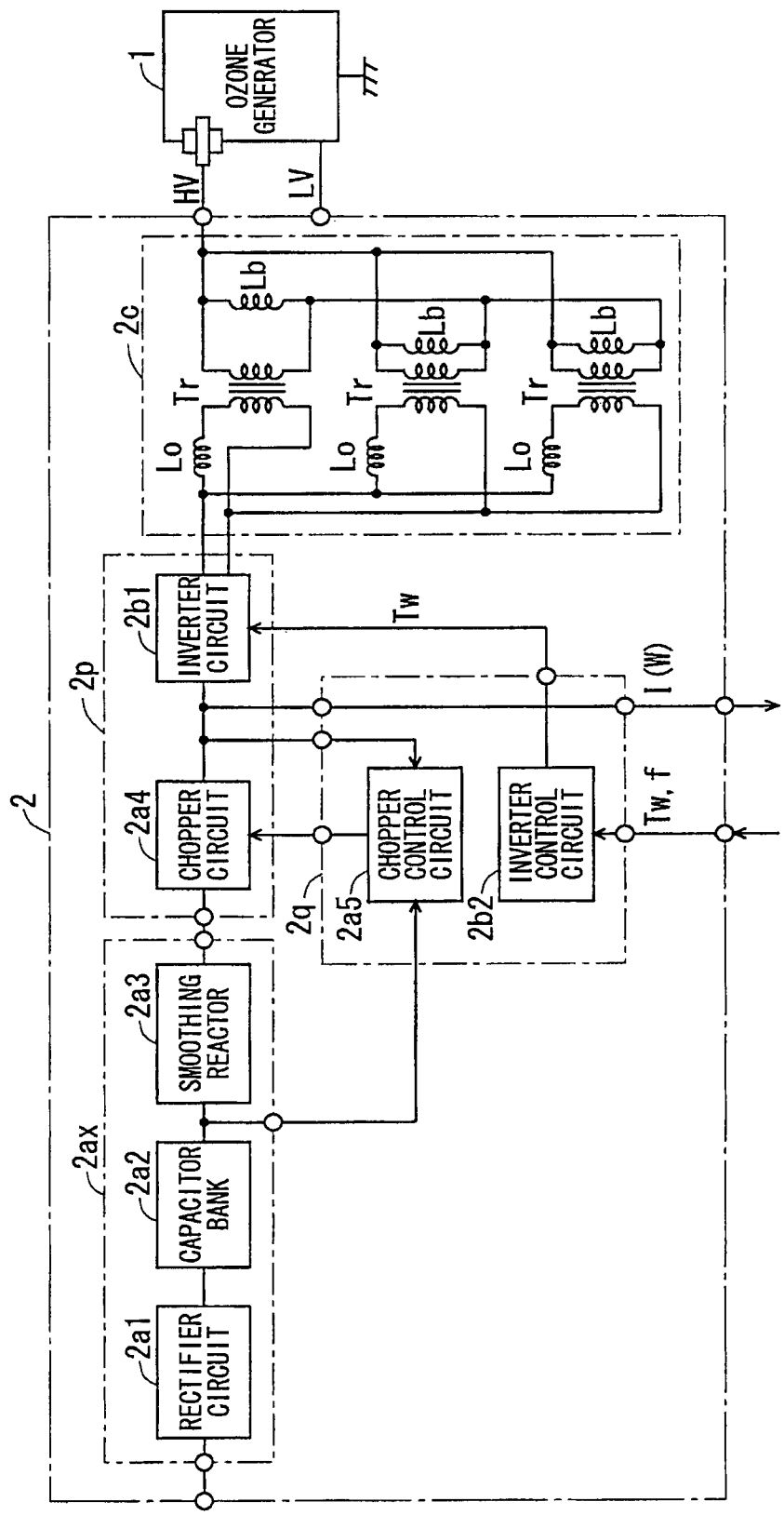
FIG. 8 A circuit diagram showing details of an internal configuration of an ozone power source provided in an ozone generation unit according to an embodiment 2.
Figure 9:
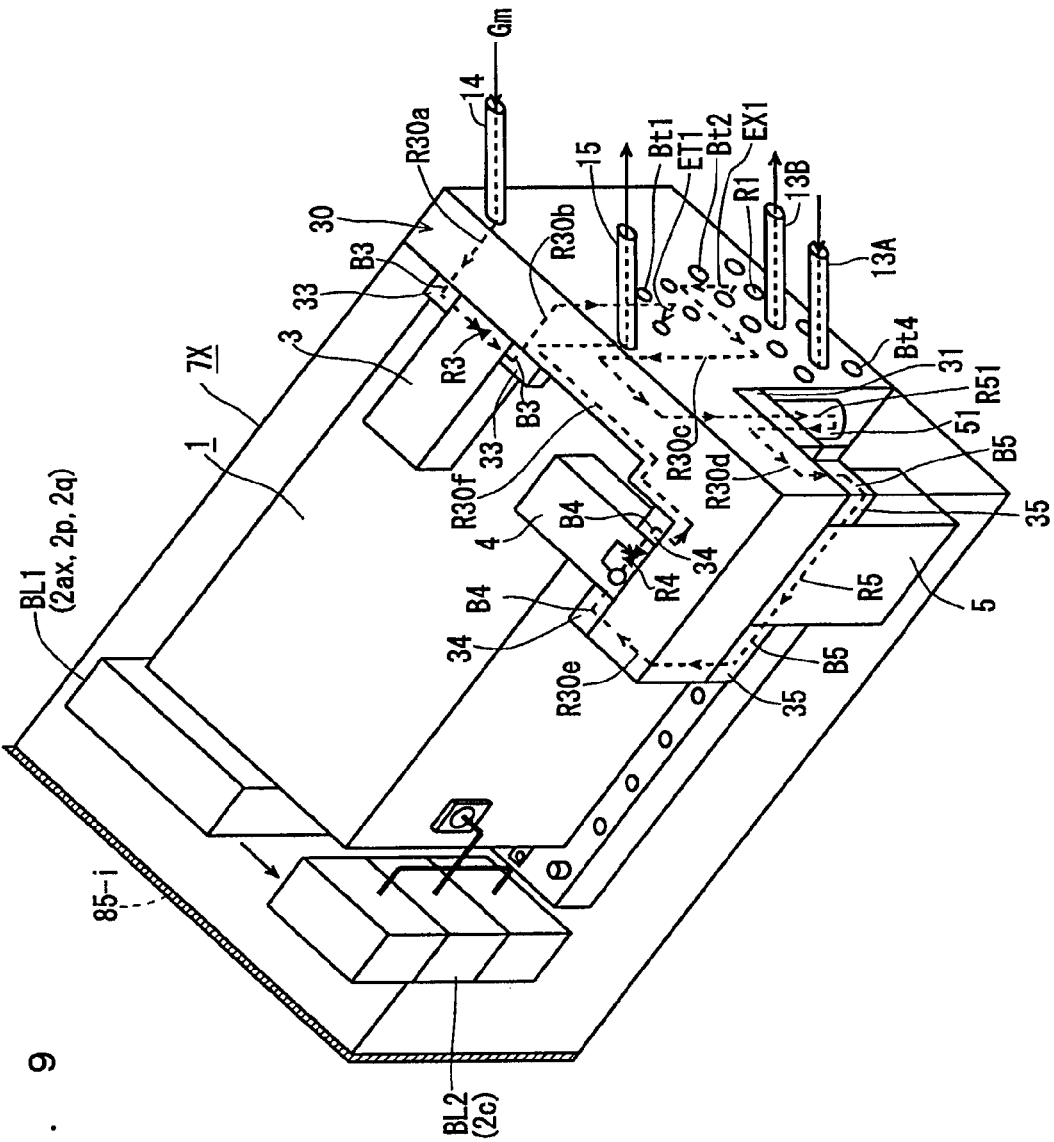
FIG. 9 A perspective view schematically showing a combined structure of the ozone generation unit according to the embodiment 2.

FIG. 8 is a circuit diagram showing details of an internal configuration of the ozone power source 2. FIG. 9 is a perspective view schematically showing a combined structure of an ozone generation unit 7X according to the embodiment 2.

Hereinafter, downsizing of the ozone generation unit 7X will be described with reference to FIGS. 8 and 9. The ozone generation unit 7X means an ozone generation unit as one unit that is configured as each of the ozone generation units 7-1 to 7-$n$ according to the embodiment 1.

In the ozone generation unit 7X shown in FIG. 9, each of the ozone power source 2 and the ozone generator 1 is downsized. Not only the compactified ozone power source 2 and the compactified ozone generator 1, but also the MFC 3 for controlling the flow rate of the raw gas, the ozone gas filter 51, the ozone concentration meter 5, and the APC 4, are assembled together and packaged, thereby achieving the ozone generation unit 7X serving as one unit in a structural sense, too.

Additionally, a raw gas pipe (raw gas supply port 14) and an output gas pipe system (ozone gas output port 15) are integrated into a gas pipe integrated block 30 as a gas pipe integrated block structure. Thereby, the ozone generator 1, the ozone power source 2, and the gas pipe system can be packaged, and thus the ozone generation unit 7X can be further downsized.

Therefore, even if, as in the ozone gas supply system 10 of the embodiment 1, a plurality of ozone generation units 7X are mounted as the ozone generation units 7-1 to 7-$n$, an ozone gas supply system having improved functionality and reliability can be achieved without increasing the size of the apparatus as a whole.

(Compactification of Ozone Power Source 2)

FIG. 8 shows a circuit configuration compactified by integrating main components of the ozone generator 1 and the ozone power source 2 with each other.

In order to obtains a desired amount of ozone generation, the ozone generator 1 requires a necessary area as a discharge area for generation of ozone. Therefore, to reduce an occupied area of the generator, a thin electrode cell is formed and moreover a cross-sectional area of one electrode cell is reduced. Thereby, the ozone generator 1 of multi-layered electrode cell type is formed. This can achieve the ozone generator 1 with a very small occupied area.

The ozone power source 2 includes the converter 2$a$ for rectifying the commercial AC voltage, the inverter 2$b$ for converting the DC voltage into a high frequency optimum for the ozone generator and controlling the output voltage to supply predetermined power to the ozone generator, and the high voltage circuit part 2$c$ for raising the voltage outputted from the inverter 2$b$ into a high voltage capable of generating the discharge that causes the ozone generation in the ozone generator 1. The ozone control part 19 controls injected power of the ozone power source.

The converter 2$a$ is made up of a rectifier circuit 2$a$1, a capacitor bank 2$a$2, a smoothing reactor 2$a$3, a chopper circuit part 2$a$4, and a chopper control circuit part 2$a$5 that are connected in series. The inverter 2$b$ is made up of an inverter circuit 2$b$1 and an inverter control circuit 2$b$2. Each component of the converter 2$a$ and the inverter 2$b$ of the ozone power source 2 is sorted and formed into a module, thus downsizing the circuit configuration.

To be specific, the rectifier circuit 2$a$1, the capacitor bank 2$a$2, and the smoothing reactor 2$a$3 are integrated into a DC/smoothing circuit part 2$ax$ as a module. Thus, the circuit configuration is downsized, and the quality of the component is increased.

The chopper circuit part 2$a$4 forming the converter 2$a$ and the inverter circuit 2$b$1 forming the inverter 2$b$ are made of power semiconductors such as an FET device or an IGBT device, and need to be cooled by a cooling fin. Therefore, by forming the chopper circuit part 2$a$4 and the inverter circuit 2$b$1 into a single semiconductor module, an effectively downsized power device part 2$p$ is achieved. By forming the chopper control circuit 2$a$5 of the converter 2$a$ and the inverter control circuit 2$b$2 of the inverter 2$b$ on a single substrate or as an integrated circuit IC, an extremely downsized power supply control substrate 2$q$ is achieved.

The high voltage circuit part 2$c$ is made up of a series reactor L0 for limiting an inverter output current, a high voltage transformer Tr for raising the voltage, and a parallel reactor Lb for improving power factor. Each of the components is large and heavy in weight. However, a special transformer is formed by which the series reactor L0 and the parallel reactor Lb can be integrated and functions thereof can be incorporated into the high voltage transformer Tr. That is, a transformer is designed such that the series reactor L0 can be integrated by using a primary leakage inductance of the high voltage transformer. The parallel reactor Lb is designed such that a large excitation inductance of the transformer can be obtained. Thus, the function of the parallel reactor Lb can be incorporated into the transformer.

Furthermore, the high voltage transformer Tr is adapted to a high frequency of several tens of kHz. Thereby, the transformer can be formed using a ferrite core having a light weight and good high frequency characteristics. To reduce an installation area of the transformer Tr and to ensure a predetermined capacity of the transformer, a plurality of small transformers are connected in parallel. The plurality of (in the drawing, three) transformers are vertically installed, thus achieving the very small high voltage circuit part 2$c$. However, the series reactor L0 for limiting the output current of the inverter may not be integrated into the transformer, but may be independently formed as a small reactor L0.

(Combined Structure of Ozone Generation Unit)

FIG. 9 shows the ozone generation unit 7X as one unit in which the ozone generator 1, the ozone power source 2, the MFC 3, the gas filter 51, the ozone concentration meter 5, the APC 4, and the gas pipe integrated block 30 are assembled together.

In FIG. 9, an control panel 85-$i$ ($i$=any of 1 to n) is provided on a front surface (at the left side in FIG. 9), and the integrated ozone control part 19 (not shown) is provided at the rear side thereof. The ozone control part 19 is connected via electrical signals to the ozone generator 1, the ozone power source 2 (blocks BL1 and BL2), the MFC 3, the ozone concentration meter 5, and the APC 4 that are assembled together. Hereinafter, a description will be given while a side where the control panel 85-*i* exists is defined as the front surface of the ozone generation unit 7X.

As shown in FIG. 8, in the ozone generator 1 and the ozone power source 2, each of the components is formed into a module, for example, so that the number of components is reduced, thus compactifying each component and reducing the installation area thereof. As shown in FIG. 9, in one ozone generation unit 7X, the DC/smoothing circuit part 1A*x*, the ozone generator 1 is provided at the center, and the power device part 2*p*, and the power supply control substrate of the ozone power source 2 are formed into the single block BL1 and arranged at the front surface while a plurality of small transformers laminated in the vertical direction are formed into the high voltage circuit part 2*c* as the block BL2. By such a distributed arrangement, the integration is made.

The gas supply pipe system including the MFC 3 for supplying the raw gas, the ozone gas output pipe system for outputting the ozone gas to the outside via the gas filter 51, the ozone concentration meter 5, and the APC 4, and a cooling pipe system (the cooling water inlet port 13A, the cooling water outlet port 13B) for cooling the electrodes of the ozone generator 1 are necessary for the ozone generator 1. These pipe systems have to be arranged three-dimensionally. Therefore, if the components are connected by existing gas pipes, cooling pipes, and the like, the number of connection joints for connecting the pipes and the components is increased. It is necessary to ensure a connection space for connecting the joints. Thus, in order to connecting these pipe systems, a very large space is required.

Conventionally, a pipe unit separate from the ozone generation unit (ozone generator) is provided, for example, at the rear side, and the generator unit and the pipes are connected at the rear side. Therefore, it has been difficult to integrate the ozone generation unit with the gas supply pipe system, the ozone gas output pipe system, and the cooling pipe system 13A, 13B.

In the embodiment 2, these pipe systems are assembled together into the single gas pipe integrated block 30, and pipe paths for the gas supply pipe, the ozone gas output pipe, and the cooling pipe are incorporated in the gas pipe integrated block 30. This gas pipe integrated block 30 has a three-dimensional structure, and at respective surfaces thereof, the ozone generator 1, the MFC 3, the gas filter 51, the ozone concentration meter 5, and the APC 4 (hereinafter, these may be collectively referred to as "ozone generator 1 and the like") are adjacently arranged. A connecting portion between the ozone generator 1 and the like and the gas pipe integrated block 30 is, for example, screwed via an O-ring, thereby keeping air-tightness to ensure highly accurate pipe paths. As a result, the ozone generator 1 and the like can be arranged integrally with the gas pipe integrated block 30. Additionally, the components of the ozone generator 1 and the like can be mounted and dismounted easily, thus improving maintainability.

In this manner, in the ozone generation unit 7X of the embodiment 2, the ozone generator 1 and the like are mounted in close contact with the gas pipe integrated block 30. In the following, a description will be given to the pipe paths in the ozone generation unit 7X which utilizes the gas pipe integrated block 30 shown in FIG. 9. In the gas pipe integrated block 30, pipe paths R30*a* to R30*f* are provided. The cooling water inlet port 13A, the cooling water outlet port 13B, the raw gas supply port 14, and the ozone gas output port 15 are mounted to the side surfaces of the gas pipe integrated block 30. The ozone generator 1 is mounted to the gas pipe integrated block 30 using ozone generator mounting bolts Bt1 to Bt4.

The MFC 3 is interposed between MFC mounting blocks 33, 33 and thereby mounted to the gas pipe integrated block 30. The APC 4 is interposed between APC mounting blocks 34, 34 and thereby mounted to the gas pipe integrated block 30. The ozone concentration meter 5 is interposed between ozone concentration meter mounting blocks 35, 35 and thereby mounted. In these mounting blocks 33 to 35, in-block passages B3 to B5 for ensuring the pipe paths are formed. The gas filter 51 is mounted to the gas pipe integrated block 30 by using a gas filter mounting block 31.

A raw gas input pipe path for a raw gas Gm to be supplied from the raw gas supply port 14 through the MFC 3 to an ozone generator input part ET1 of the ozone generator 1 is a path formed by the raw gas supply port 14, the pipe path R30*a*, the in-block passage B3, the MFC 3, the in-block passage B3, the pipe path R30*b*, and the ozone generator input part ET1 arranged in the mentioned order. At this time, a region of the ozone generator 1 around the ozone generator input part ET1 is mounted to the gas pipe integrated block 30 by the ozone generator mounting bolt Bt1. In this manner, the input pipe path for the raw gas Gm is formed using the gas pipe integrated block 30.

An ozone gas output pipe for an ozone gas outputted from the ozone generator 1 and received by the ozone generator output part EX1 to be outputted from the ozone gas output port 15 through the gas filter 51, the ozone concentration meter 5, and the APC 4 is a path formed by the ozone generator output part EX1, the pipe path R30*c*, the inside of the gas filter mounting block 31, the gas filter 51, the inside of the gas filter mounting block 31, the pipe path R30*d*, the in-block passage B5, the ozone concentration meter 5, the in-block passage B5, the pipe path R30*e*, the in-block passage B4, the APC 4, the in-block passage B4, the pipe path R30*f*, and the ozone gas output port 15 arranged in the mentioned order. At this time, a region of the ozone generator 1 around the ozone generator output part EX1 is mounted to the gas pipe integrated block 30 by the ozone generator mounting bolt Bt2. In this manner, the output pipe path for the ozone gas is formed using the gas pipe integrated block 30.

FIG. 25 is an explanatory diagram schematically showing a conventional configuration corresponding to the ozone generation unit 7X. As shown in FIG. 25, conventionally, the configuration corresponding to the ozone generation unit 7X generally has a gas control unit 400, an inverter control unit 500, and an ozone generation unit 600 that are divided from one another.

The gas control unit 400 is provided therein with an MFC 73, an APC 74, an ozone concentration meter 75, and a gas filter 91. The inverter control unit 500 is provided therein with a converter 2*a*, an inverter 2*b*, an ozone control part 79, an control panel 85-*i*, a series reactor L0, and the like. The ozone generation unit 600 is includes an ozone generator 71, and a high voltage transformer Tr and a parallel reactor Lb.

The inside of the converter 2*a* includes a rectifier circuit 2*a*1, a capacitor bank 2*a*2, a smoothing reactor 2*a*3, a chopper circuit part 2*a*4, and a chopper control circuit part 2*a*5. The inverter 2*b* includes an inverter circuit 2*b*1 and an inverter control circuit 2*b*2. Here, descriptions of the connection relationship and operation contents are omitted.

In a conventional ozone gas supply system or a conventional ozone generation apparatus, as shown in FIG. 25, merely an electrical connection or a gas pipe connection is allowed between three divided blocks of the gas control unit 400, the inverter control unit 500 corresponding to the ozone power source, and the ozone generation unit 600. Thus, the structure shown in FIG. 9 cannot be achieved.

As shown in FIG. 9, in the ozone generation unit 7X, these three units (400, 500, 600) are assembled together, to achieve considerable downsizing as compared with the configuration shown in FIG. 25.

In this manner, each of the ozone generation units 7-1 to 7-$n$ is structured as the ozone generation unit 7X of the embodiment 2 in which the ozone generator 1, the ozone power source 2, the MFC 3, the APC 4, the ozone concentration meter 5, and the gas filter 51 are assembled together and packaged into one unit.

As a result, as in the embodiment 1, a plurality of the ozone generation units 7X can be installed within the ozone gas supply system 10, and by connecting the output pipes of the ozone generation units 7X by the gas control valve 9, the supply of the ozone gas can be distributed among the respective ozone treatment apparatuses 12 including the ozone treatment apparatuses 12-1 to 12-$n$ or a large amount of ozone gas or an ozone gas having a high concentration can be selectively supplied to one ozone treatment apparatus 12, as described in the embodiment 1.

Thus, the ozone generation unit 7X of the embodiment 2 is formed as an integrated structure in which the ozone generator 1, the ozone power source 2, the MFC 3, the gas filter 51, the APC 4, the ozone concentration meter 5, the raw gas supply port 14, the ozone gas output port 15, the cooling water inlet port 13A, and the cooling water outlet port 13B are assembled together. This can achieve considerable downsizing as compared with the similar, conventional configuration.

Additionally, the gas pipe integrated block 30 of the ozone generation unit 7X has the pipe paths R30$a$ to R30$f$ that are a plurality of internal pipe paths. Therefore, by connecting the pipe paths R30$a$ to R30$f$ to the ozone generator 1, the MFC 3, the gas filter 51, the APC 4, the ozone concentration meter 5, the raw gas supply port 14, the ozone gas output port 15, and each of the cooling water inlet/outlet ports 13A and 13B, the input pipe path for the raw gas Gm described above and the output pipe path for the ozone gas described above are formed. Accordingly, downsizing of the part including these pipe paths can be effectively achieved.

In this manner, by downsizing each of the ozone generation units 7-1 to 7-$n$ as the ozone generation unit 7X of the embodiment 2, the ozone gas supply system 10 shown in the embodiment 1 can be achieved at a practical use level.

As a result, as in the embodiment 1, a plurality of the ozone generation units 7X can be installed within the ozone gas supply system 10, and by connecting the output pipes of the ozone generation units 7X by the gas control valve 9, the supply of the ozone gas can be distributed among the respective ozone treatment apparatuses 12 including the ozone treatment apparatuses 12-1 to 12-$n$ or a large amount of ozone gas or an ozone gas having a high concentration can be selectively supplied to one ozone treatment apparatus 12, as described in the embodiment 1.

Embodiment 3

Similarly to the embodiment 2, an embodiment 3 is characterized by focusing on the ozone generation unit 7 as one unit, and achieving downsizing of the ozone generation unit 7 in combination with the ozone gas output flow rate management unit 9.

(Control Ozone Gas Output Flow Rate Management Unit)

Figure 10:
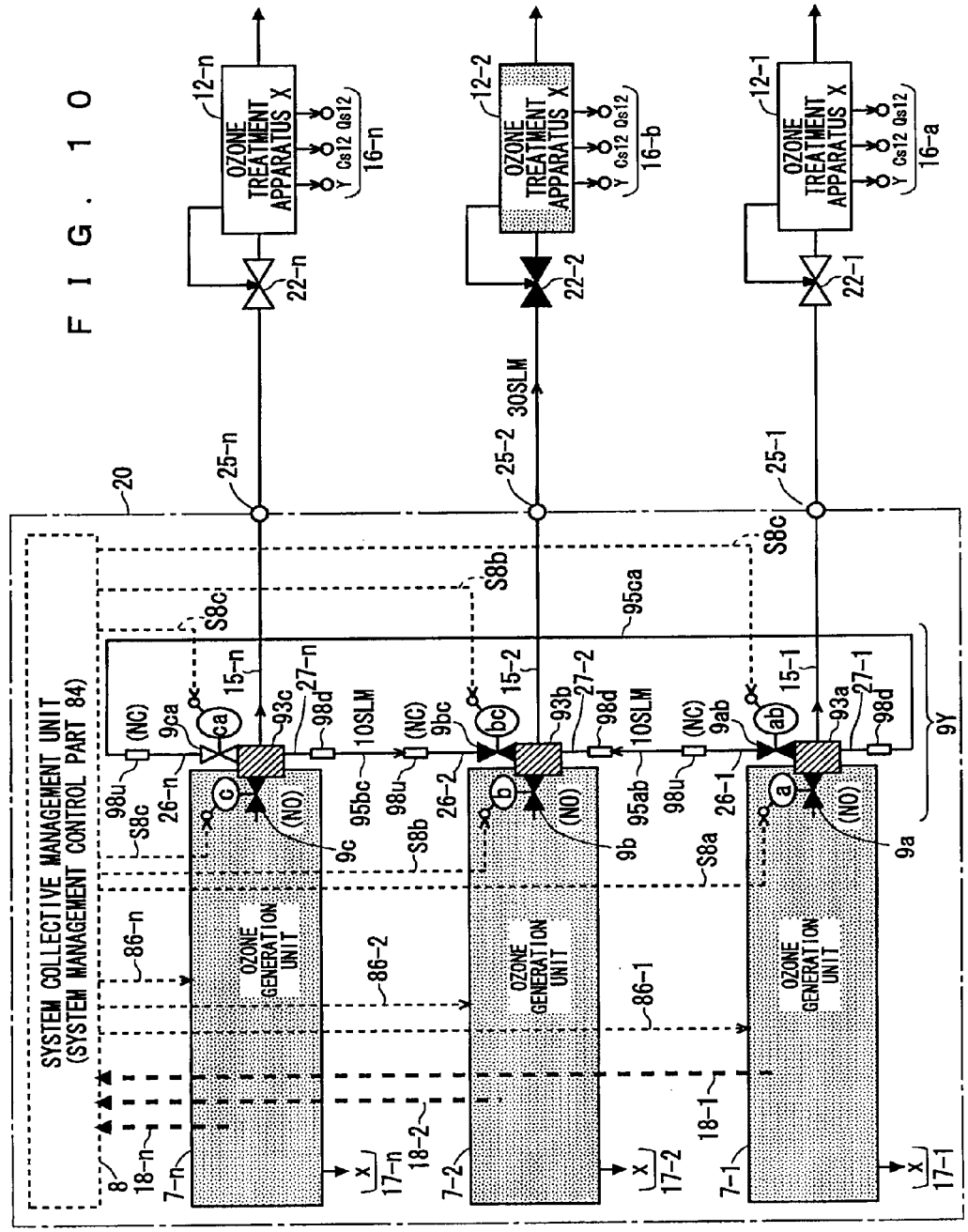
FIG. 10 An explanatory diagram showing an internal configuration of an ozone gas output flow rate management unit according to an embodiment 3, which is included in the ozone gas supply system shown in FIG. 1.

FIG. 10 is an explanatory diagram showing an internal configuration of an ozone gas output flow rate management unit based on an ozone gas supply system 20 of the embodiment 3 that corresponds to the ozone gas supply system 10 shown in FIG. 1.

As shown in FIG. 10, in an ozone gas output flow rate management unit 9Y of the embodiment 3 corresponding to the ozone gas output flow rate management unit 9 of the embodiment 1, portions corresponding to the respective ozone generation units 7-1 to 7-$n$ are formed integral with one another. In the following, for convenience of the description, a case of n=3 will be described with reference to FIG. 10.

The ozone gas control valves 9$a$ to 9$c$ are integrally provided corresponding to the ozone generation units 7-1 to 7-$n$. Mounting blocks 93$a$ to 93$c$ are provided in close contact with the ozone gas control valves 9$a$ to 9$c$. The ozone gas control valve 9$ab$, the ozone gas control valve 9$bc$, and the ozone gas control valve 9$ca$ are provided at one path side (at the upper side in FIG. 10) of the mounting blocks 93$a$, 93$b$, and 93$c$.

The ozone gas control valve 9$ab$ provided at the one path side of the mounting block 93$a$ is connected to the other path side (the lower side in FIG. 10) of the mounting block 93$ab$ via a pipe fitting 98$u$, an inter-unit ozone gas pipe 95$ab$, and a pipe fitting 98$d$. In the same manner, the ozone gas control valve 9$ab$ provided at the one path side of the mounting block 93$ab$ is connected to the other path side of the mounting block 93$ac$ via a pipe fitting 98$u$, an inter-unit ozone gas pipe 95$bc$, and a pipe fitting 98$d$. The ozone gas control valve 9$ca$ provided at the one path side of the mounting block 93$ac$ is connected to the other path side of the mounting block 93$a$ via a pipe fitting 98$u$, an inter-unit ozone gas pipe 95$ca$, and a pipe fitting 98$d$.

Furthermore, the output is made from output parts (at the right side in FIG. 10) of the mounting blocks 93$a$ to 93$c$ through the ozone gas output ports 25-1 to 25-$n$ to the outside of the ozone gas supply system 20 of the embodiment 3.

Accordingly, the ozone gas output flow rate management unit 9Y has the ozone gas control valves 9$a$, 9$b$, 9$c$, 9$bc$, 9$ab$, and 9$ca$ with a circuit configuration similar with the ozone gas output flow rate management unit 9.

The ozone gas on/off valves 22-1 to 22-$n$ are interposed between the ozone gas output ports 25-1 to 25-$n$ and the ozone treatment apparatuses 12-1 to 12-$n$.

In the ozone gas control valves 9$a$, 9$b$, 9$c$, 9$bc$, 9$ab$, and 9$ca$ that form the ozone gas output flow rate management unit 9Y, the ozone gas control valves 9$a$, 9$b$, and 9$c$ are of the normally open type (NO), and the ozone gas control valves 9$bc$, 9$ab$, and 9$ca$ are of the normally close type (NC).

A control signal S8$a$ supplied from the system management control part 84 of the system collective management unit 8 is given to the ozone gas control valve 9$a$ and the ozone gas control valve 9$ab$, and a control signal S8$b$ is given to the ozone gas control valve 9$b$ and the ozone gas control valve 9$bc$, and a control signal S8$c$ is given to the ozone gas control valve 9$c$ and the ozone gas control valve 9$ca$.

In this manner, the open state and the closed state of the ozone gas control valves 9$a$, 9$b$, 9$c$, 9$bc$, 9$ab$, and 9$ca$ of the ozone gas output flow rate management unit 9Y are controlled based on the control signal S8 (S8$a$ to S8$c$) supplied from the system management control part 84 of the system collective management unit 8.

In FIG. 10, among the ozone treatment apparatuses 12-1 to 12-$n$, only one ozone treatment apparatus 12-2 is operated (the ozone gas on/off valve 22-2 is in the open state). FIG. 10 shows a state of the ozone gas output flow rate management unit 9Y in a case where the flow rate of the ozone gas supplied to the ozone treatment apparatus 12-2 is 30 SLM.

In other words, based on the ozone generation unit control signals 86-1 to 86-n supplied from the system management control part 84, the ozone gas with a flow rate of 10 SLM is outputted from each of the ozone generation units 7-1 to 7-n, and the ozone gas control valves 9a, 9b, 9c, 9bc, and 9ab are brought into the open state (blacked out) while the ozone gas control valve 9ca is brought into the closed state (shown in white).

On the other hand, among the ozone gas on/off valves 22-1 to 22-n, only the ozone gas on/off valve 22-2 is in the open state, while the ozone gas on/off valves 22-1 and 22-n are in the closed state, as described above. In a case where only the ozone treatment apparatus 12-2 is used and the other ozone treatment apparatuses 12 are not used, the ozone gas on/off valve 22 is closed. Here, in a case where there is no other ozone treatment apparatus, pipe portions of the ozone gas outlet ports 25-1 and 25-n may be forcibly capped with pipe cap fittings. Moreover, needless to say, in a case where any of the connection pipes 95ab, 95bc, and 95ca connecting the ozone generation units is not provided in the ozone gas supply system 10, any of the pipe fittings 98u and 98d is formed as a pipe cap fitting and capped so that the output ozone gas is blocked.

In this manner, the ozone generation units 7-1 to 7-n and the ozone gas output flow rate management unit 9Y are controlled so that each of the ozone generation units 7-1 to 7-n can supply the ozone gas with a flow rate of 10 SLM. Thereby, the ozone gas can be supplied through the ozone gas output flow rate management unit 9 to the ozone treatment apparatus 12-2 with a gas flow rate of 30 SLM.

(Combined Structure of Ozone Generation Unit)

Figure 11:
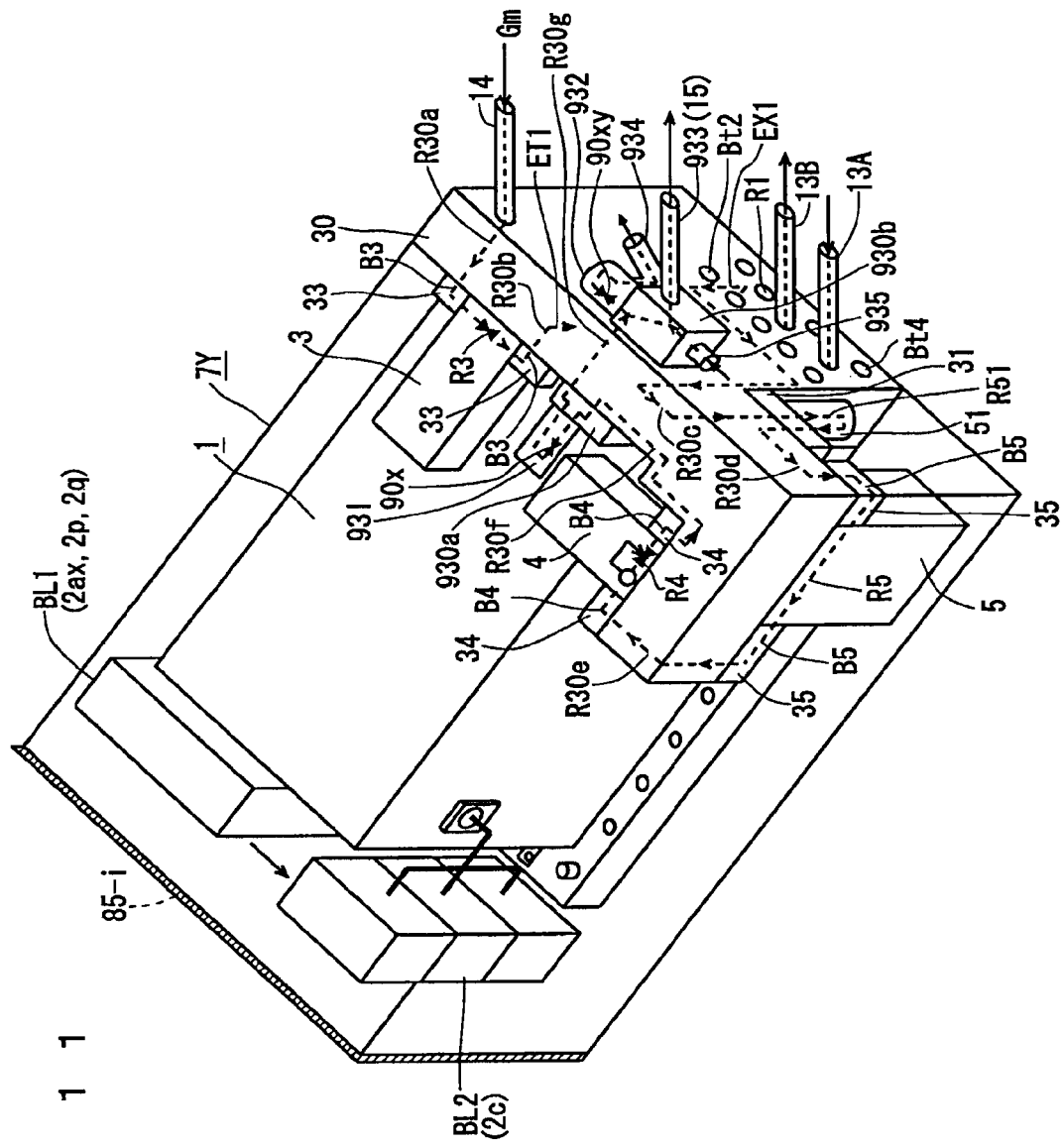
FIG. 11 A perspective view schematically showing a combined structure of an ozone generation unit according to the embodiment 3.

FIG. 11 is a perspective view schematically showing a combined structure of one unit of the ozone generation unit according to the embodiment 2. As shown in FIG. 11, in an ozone generation unit 7Y of the embodiment 2, not only the ozone generator 1, the ozone power source 2, the MFC 3, the ozone concentration meter 5, the gas filter 51, the ozone concentration meter 5, the APC 4, and the gas pipe integrated block 30, but also component parts of the ozone gas output flow rate management unit 9 are assembled together.

As shown in FIG. 11, in order to mount the component parts of the ozone gas output flow rate management unit 9 to the gas pipe integrated block 30, ozone gas control valve accommodation parts 931 and 932, an ozone gas output part 933, and ozone gas branching parts 934 and 935 are provided around block main bodies 930a and 930b (corresponding to any of the mounting blocks 93a to 93c shown in FIG. 10).

In the ozone gas control valve accommodation part 931, an ozone gas control valve 90x (corresponding to any of the ozone gas control valves 9a to 9c) is accommodated. In the ozone gas control valve accommodation part 932, an ozone gas control valve 90xy (corresponding to any of the ozone gas control valves 9ab, 9bc, and 9ca) is accommodated. The ozone gas output part 933 corresponds to the ozone gas output port 15 of the ozone generation unit 7X of the embodiment 2 shown in FIG. 9, and is connected to the ozone gas output port 25 shown in FIG. 10. The ozone gas branching part 934 functions as a branching part (inter-unit ozone gas pneumatic valve pipe connection port) at the one path side connected to the pipe fitting 98u shown in FIG. 10. The ozone gas branching part 935 functions as a branching part (inter-unit ozone gas pneumatic valve pipe connection port) at the other path side connected to the pipe fitting 98d shown in FIG. 10.

In the embodiment 3, similarly to the embodiment 2, all of the gas supply pipe system, the ozone gas output pipe system, and the cooling pipe systems 13A and 13B are assembled together into the single gas pipe integrated block 30. The component parts of the ozone gas output flow rate management unit 9Y are combined so that pipe paths for a gas supply pipe, an ozone gas output pipe, and a cooling pipe are incorporated in the gas pipe integrated block 30.

Substantially in the same manner as in the ozone generation unit 7X of the embodiment 2, a raw gas input pipe path for a raw gas Gm to be supplied from the raw gas supply port 14 through the MFC 3 to an ozone generator input part ET1 of the ozone generator 1 is a path formed by the raw gas supply port 14, the pipe path R30a, the in-block passage B3, the MFC 3, the in-block passage B3, the pipe path R30b, and the ozone generator input part ET1 arranged in the mentioned order.

The ozone gas output pipe extending from the ozone generator output part EX1 of the ozone generator 1 through the gas filter 51, the ozone concentration meter 5, and the APC 4 to the block main body 930b is a path formed by the ozone generator output part EX1, the pipe path R30c, the inside of the gas filter mounting block 31, the gas filter 51, the inside of the gas filter mounting block 31, the pipe path R30d, the in-block passage B5, the ozone concentration meter 5, the in-block passage B5, the pipe path R30e, the in-block passage B4, the APC 4, the in-block passage B4, the pipe path R30f, the block main body 930a (inner portion), the ozone gas control valve 90x, the pipe path R30g, and the block main body 930b (outer portion) arranged in the mentioned order. Here, the block main bodies 930a and 930b may be formed integral with each other and formed through the gas pipe integrated block 30.

In the block main body 930b, there are formed one branch path connected to the ozone gas branching part 934 through the ozone gas control valve 90xy, an other branch path connected to the ozone gas branching part 935, and a joint path in which the one and the other branch paths and the above-mentioned ozone gas output pipe are joined to form an output from the ozone gas output part 933.

The other parts, pipe paths, and the like, of the configuration are identical to those of the ozone generation unit 7X shown in FIG. 9, a description thereof is omitted.

In the ozone gas supply system 20 of the embodiment 3, the plurality of ozone gas control valve accommodation parts 931 and 932 accommodating the ozone gas control valves 90x and 90xy therein are mounted in tight contact to the gas pipe integrated block 30 in the corresponding ozone generation unit 7Y, and interposed on the output pipe path for the ozone gas described above.

This exerts an effect that, in the ozone gas supply system 20, the combined structure of the ozone gas output flow rate management unit 9Y and the ozone generation units 7-1 to 7-n can be downsized.

In this manner, in the ozone generation unit 7Y of the embodiment 3 has, in addition to the features of the ozone generation unit 7X of the embodiment 2, most part of the component parts of the ozone gas output flow rate management unit 9 and the gas pipe integrated block 30 are integrated to thereby achieve further downsizing as compared with a case where the ozone generation unit 7X and the ozone gas output flow rate management unit 9 of the embodiment 2 are separately provided.

Embodiment 4

Basic Configuration: First Aspect

Figure 12:
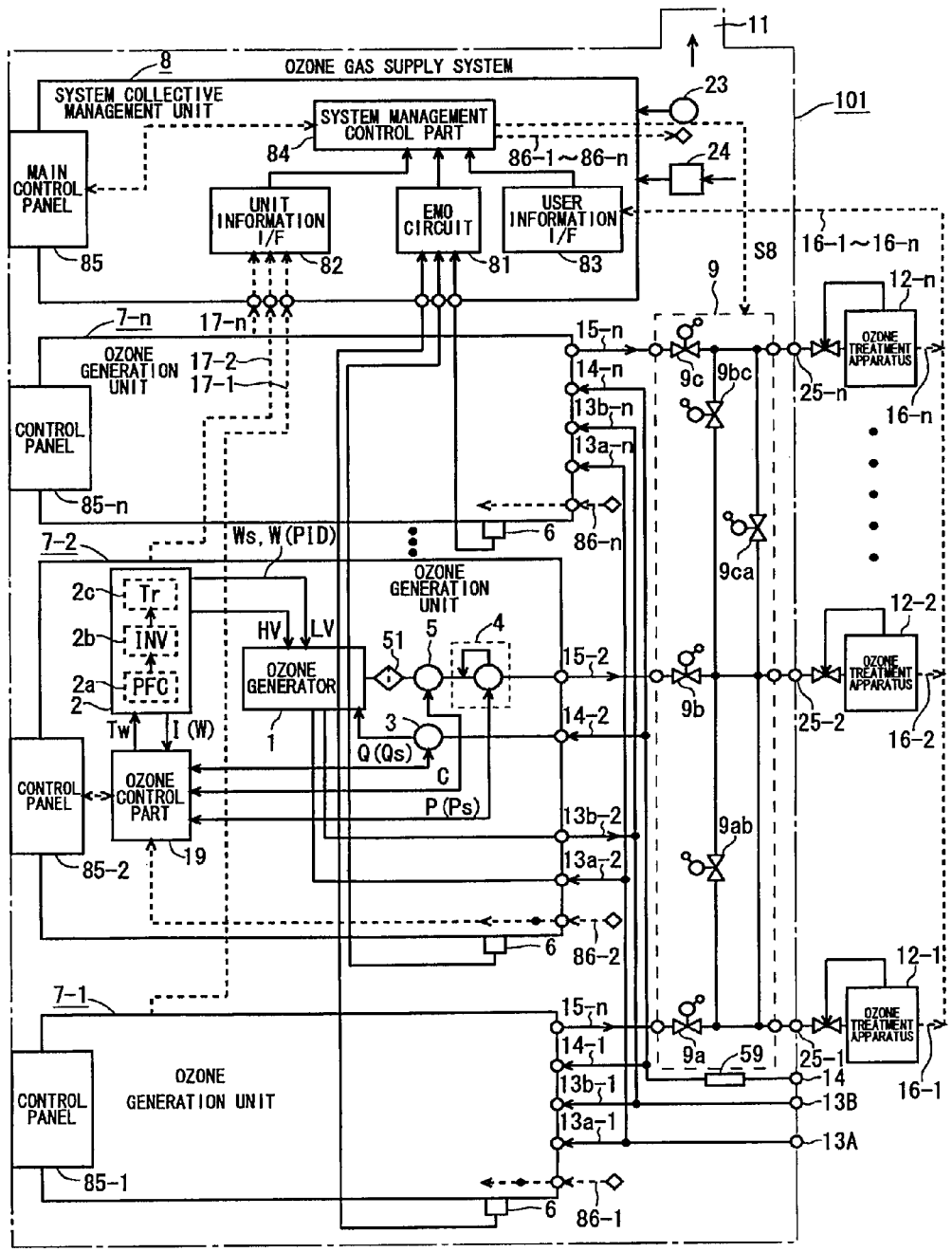
FIG. 12 A block diagram showing a configuration of an ozone gas supply system according to an embodiment 4 of the present invention.

FIG. 12 is a block diagram showing a configuration of an ozone gas supply system according to an embodiment 4 (basic configuration: first aspect) of the present invention.

(Overall Configuration)

As shown in FIG. 12, an ozone gas supply system 101 has n (≥2) ozone generation units 7-1 to 7-n included therein, and has one moisture removal filter 59 shared by the ozone generation units 7-1 to 7-n. The moisture removal filter 59 has a function of trapping (removing) a small amount of water contained in the raw gas that is supplied from the raw gas supply port 14. Thus, in the ozone gas supply system 101 of the embodiment 4, the raw gas supplied from the raw gas supply port 14 passes through the moisture removal filter 59, and then supplied to the raw gas supply ports 14-1 to 14-n of the ozone generation units 7-1 to 7-n.

In the following, among the ozone generation units 7-1 to 7-n, the ozone generation unit 7-2 will be taken as a representative, and an internal configuration thereof will be described with reference mainly to FIG. 12.

The raw gas is supplied from the raw gas supply port 14 of the ozone gas supply system 101 through the moisture removal filter 59, the raw gas supply port 14-2, and the MFC 3, to the ozone generator 1 in the ozone generation unit 7-2. The interior of the ozone generator 1 is filled with a high-purity gas (raw material gas) containing an oxygen gas. The ozone power source 2 included in the ozone gas supply system 101 applies high frequency high voltages HV and LV across electrodes in the ozone generator 1, thus causing dielectric-barrier discharge (silent discharge) between these electrodes. Thereby, due to the discharging, the oxygen gas is dissociated from a gas existing in a discharge space to cause an oxygen atom. A chemical bond between this oxygen atom and the oxygen gas (oxygen molecule) causes an ozone gas as shown in the following formulas (1) and (2). The ozone power source 2 includes a converter 2a, an inverter 2b, and a high voltage circuit part 2c, which will be described in detail later. In the formula (2), M represents a third body in a triple collision.

[Chemical Formula 1]

(1)

[Chemical Formula 2]

(2)

(triple-body collision)

The oxygen gas ($O_2$) of the raw gas and the silent discharge causes a chemical reaction as shown in the above-mentioned formulas (1) and (2), to generate an ozone gas ($O_3$). The raw gas contains not only the oxygen gas but also about 1 to 2 PPM ($10^{14}/cm^3$) impurities such as a nitrogen gas ($N_2$). A moisture content in the raw gas is about 1 PPM ($10^{14}/cm^3$) to 10 PPM ($10^{15}/cm^3$) as shown in FIG. 26, because the dew point of the gas is normally managed to be about −70° C. FIG. 26 is an explanatory diagram showing the relationship between the dew point of the raw gas and the moisture content in the raw gas. Also in the nitrogen gas and moisture, a molecule gas is dissociated due to the silent discharge, so that gases such as a nitrogen oxide, a hydroxide, and a hydrazine ($N_2H_4$) compound that is a compound of nitrogen and hydrogen are generated in the ozone gas generator, and outputted together with the ozone gas.

From these compound gases, an active gas is generated through particularly a process as shown in the following formulas (3) to (7). The active gas is very active so that a corrosion chemical reaction on a metal surface occurs in portions, in contact with the ozone gas, of the pipe path for extracting the ozone gas, the APC 4, the MFC 3, the gas opening/closing valve (valve), and the like. Thus, heat generation and metal corrosion occurs in the components, which causes breakdown of the above-mentioned components and the like. Moreover, the outputted ozone gas itself becomes a gas containing a large amount of metal contamination caused as a result of the metal corrosion. Thus, the quality of the ozone gas is deteriorated.

[Chemical Formula 3]

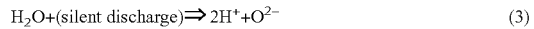

(3)

[Chemical Formula 4]

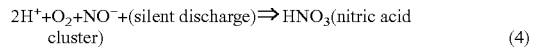

(4)

[Chemical Formula 5]

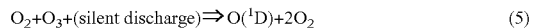

(5)

[Chemical Formula 6]

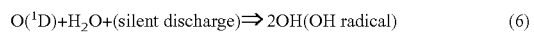

(6)

[Chemical Formula 7]

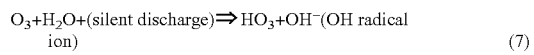

(7)

As described above, through the chemical reaction shown in the formulas (3) and (4), a nitric acid cluster gas ($HNO_3$) is generated by a water-splitting reaction, and through the chemical reaction shown in the formulas (5) to (7), an OH radical gas is generated.

Due to the moisture contained in the raw gas, the nitric acid cluster gas, the OH radical, the OH radical ion, and the like, that are shown in the chemical formulas (3) to (7) mentioned above are very active, a relatively long-lived gas is generated in the ozone generator 1, and outputted together with the generated ozone gas. It has become apparent from an experiment and the like, that this causes a corrosion chemical reaction on a metal surface to occur at portions, in contact with the ozone gas, of the pipe path, the APC 4, the MFC 3, the gas opening/closing valve, and the like, to consequently cause heat generation and metal corrosion of the components so that breakdown of the above-mentioned components and the like occurs. Therefore, it has become apparent that reducing the moisture content in the raw gas supplied to the ozone gas is important in order to reduce the amount of these active gases generated.

The impurities such as the nitrogen gas contained in the raw gas and the moisture content therein are, in a normal state, determined by the amount of ingredients in the gas. However, in an apparatus actually running, a nitrogen gas and a moisture is adhering also to a pipe of a gas supply part or the like at a time of starting the operation of the apparatus or at a transition time for a maintenance or the like. If these adhering nitrogen gas and moisture discharged together with the raw gas, an amount of impurities and moisture content exceeding 1 to 2 PPM enters the ozone generator 1. As a result, the gases having the adverse effects described above are contained in the ozone gas and outputted.

In view of the above-described points, it has been found that it is very effective to provide the moisture removal filter 59 for removing, by adsorption or the like, a moisture in the raw gas supply near the raw gas supply port 14 in the ozone gas supply system 101, in order to remove the moisture contained in the raw gas that is supplied to the ozone generator 1. The moisture removal filter 59 is achieved by using a silica gel or heating of a heater for the adsorption.

As the capability of the moisture removal filter 59, the moisture removal filter 59 capable of reducing the moisture content in the raw gas to less than 300 PPB produced a preferable result.

In this embodiment, as a structure of the ozone generator 1, an ozone generator structured to employ the silent discharge is described as a representative. Here, for an ozone generation function, there may be adopted an ozone generator structured to employ creeping discharge or glow discharge, an ozone generator structured to employ super-high frequency or microwave discharge, or an ozone generator employing electrolytic medium. These ozone generators may be adopted.

In order to obtain a stable output of the ozone, it is important to limit gas types of the raw gas supplied to the ozone generator 1, and particularly to suppress a moisture content in the raw gas, and also it is important to provide a function for constantly adjusting environmental conditions such as a flow rate value, the gas pressure in the ozone generator, the temperature of water for cooling the electrodes, the amount of water, and the like.

To be specific, the moisture removal filter 59 is used to suppress the moisture content in the raw gas. The MFC 3 is used to adjust the flow rate value. The APC 3 is used to adjust the gas pressure in the ozone generator 1. The cooling function exerted by the cooling water supplied from the cooling water inlet ports 13*a*-1 to 13*a*-*n* is used to make constant the environmental conditions such as the temperature of water for cooling the electrodes, the amount of water, and the like. Control means (the MFC 3, the APC 4, the ozone concentration meter 5, and the gas filter 51) having such a function will be described below.

The raw gas having a predetermined raw gas flow rate Q is obtained from the raw gas supply port 14 of the ozone gas supply system 101, the moisture removal filter 59, and the raw gas supply port 14-2 of the ozone generation unit 7-2, and supplied to the ozone generator 1 with a constant flow rate through the gas flow rate controller (MFC) 3.

An ozone generator system is equipped with, as means for keeping the pressure in the ozone generator 1 constant, means for detecting a gas pressure in the generator and a function for finely adjusting the amount of ozone gas to be outputted to the generator thus detected and thereby keeping the pressure in the ozone generator 1 constant. One of methods therefor is implemented by an automatic pressure adjuster (APC) 4 for automatically adjusting the pressure in the generator to a predetermined pressure. The automatic pressure adjuster (APC) 4 is provided in an ozone gas output pipe gas line of the ozone generator.

A specific configuration of the ozone gas output pipe gas line is as follows. An ozone gas generated in the ozone generator 1 passes through a gas filter 51 for removing impurities and foreign substances therefrom, and then through an ozone concentration meter 5 and the automatic pressure adjuster (APC) 4 for automatically adjusting the pressure in the generator to a predetermined pressure. Thereby, the ozone (ozonized oxygen) gas having a predetermined ozone concentration C is continuously outputted from the ozone gas output port 15-2 to the outside of the ozone generation unit 7-2.

Sometimes, an ozone-gas flow rate controller (MFC) for keeping the flow rate of the output ozone gas constant is provided in the ozone gas output pipe gas line. In this embodiment, no ozone-gas flow rate controller (MFC) is provided.

Accordingly, a flow rate Qx of the output ozone gas is the sum of an ozone flow rate Qc and an flow rate Qn. The ozone flow rate Qc is for the ozone obtained as a result of conversion from the raw gas の flow rate Q. The flow rate Qn is for a raw material oxygen that has not been converted from the raw gas の flow rate Q. That is, the flow rate Qx of the ozone (ozonized oxygen) gas is determined by the formula (A): $\{Qx=F(Q,C)\ldots(A)\}$ which is based on the flow rate Q and the ozone concentration C of a raw material (oxygen) gas.

By the gas flow rate controller (MFC) 3, the flow rate of the raw gas supplied to the ozone generator is controlled to a constant value.

The APC 4 controls the pressure of the ozone gas flowing in an output pipe path for the ozone gas of the ozone generator 1, and thereby automatically controls the gas pressure of the ozone generator 1 to a constant value.

The ozone generation unit 7-2 is configured as a package unit as one unit in which a plurality of function means are assembled together, such as the ozone generator 1 having means for generating the ozone gas, the ozone power source 2 having means for supplying predetermined power to the ozone gas, the MFC 3 having means for controlling the flow rate of the supplied raw gas to a constant value, the APC 4 having means for controlling a pressure value of the pressure in the ozone generator 1 to a constant value, the gas filter 51 having means for trapping the impurity gas of the output ozone gas, and the ozone concentration meter 5 having means for detecting an output ozone concentration value. All the ozone generation units 7-1 to 7-*n* have identical configurations (only the configuration of 7-2 is shown), and have the internal configuration described for the ozone generation unit 7-2 as a representative.

The MFC 3, the APC 4, the ozone concentration meter 5, and the gas filter 51 constitute the control means associated with the ozone generator 1. In terms of supplying a stable ozone gas, it is desirable the control means includes at least two means among the MFC 3, the APC 4, the ozone concentration meter 5, and the gas filter 51.

Each of the ozone generation units 7 (ozone generation units 7-1 to 7-*n*) has a water leakage sensor 6 provided on a bottom surface thereof, to monitor presence or absence of water leakage of each ozone generation unit 7. More specifically, information obtained from the water leakage sensor 6 is supplied to an EMO circuit (emergency stop circuit) 81 in a system collective management unit 8, so that the monitoring can be made under control of a system management control part 84.

The system collective management unit 8 provided in the ozone gas supply system 101 receives detection information from each of an exhaust gas sensor 23 and an ozone leak sensor 24. The exhaust gas sensor 23 monitors and keeps a negative pressure state of the interior of the apparatus by vacuuming the interior through an exhaust duct 11. When the system collective management unit 8 receives an abnormal exhaust or an abnormal leakage from the exhaust gas sensor 23 or the ozone leak sensor 24, respectively, the system collective management unit 8 causes the system management control part 84 to supply ozone generation unit control signals 86-1 to 86-*n* that are stop instructions to all the ozone generation units 7-1 to 7-*n*, to thereby stop operations of the ozone generation units 7-1 to 7-*n*.

Also, the system management control part 84 provided in the system collective management unit 8 receives process ozone gas event signals 16-1 to 16-*n* from ozone treatment apparatuses 12-1 to 12-*n* through a user information I/F 83. The process ozone gas event signals 16-1 to 16-*n* include a request ozone flow rate Qs12 and a request ozone concentration Cs12.

Based on instructions indicated by the process ozone gas event signals 16-1 to 16-*n*, the system management control part 84 outputs the ozone generation unit control signals 86-1 to 86-*n* to the ozone generation units 7-1 to 7-*n*, and also outputs a control signal S8 to an ozone gas output flow rate management unit 9.

As a result, the flow rate and the concentration of an ozone gas outputted from each of the ozone generation units 7-1 to 7-*n* are controlled, and additionally the opening/closing of an ozone gas control valve 9*a* and the like provided in the ozone gas output flow rate management unit 9 is controlled. Thereby, an ozone gas having a gas flow rate and a gas concentration in accordance with the instructions of the process ozone gas event signals 16-1 to 16-*n* can be supplied to the ozone treatment apparatuses 12-1 to 12-*n*. In the following, the system collective management unit 8 will be described in more detail.

The system collective management unit 8 includes the EMO circuit 81 for stopping the apparatus in emergency, an unit information I/F 82, the user information I/F 83, the system management control part 84, and a main control panel 85.

As described above, the EMO circuit 81 is a circuit for monitoring a system error signal obtained from the water leakage sensor 6 of each ozone generation unit 7. To be more specific, when the EMO circuit 81 receives detection information indicating detection of abnormal water leakage from the water leakage sensor 6, the EMO circuit 81 transmits this information to the system management control part 84. Then, the system management control part 84 supplies the ozone generation unit control signal 86 (any one of the ozone generation unit control signals 86-1 to 86-*n*) to the ozone generation unit 7 corresponding to the water leakage sensor 6 that has detected the abnormal water leakage. Thus, the ozone generation unit 7 is stopped.

The unit information I/F 82 has a function for receiving unit information signals 17-1 to 17-*n* from the ozone generation units 7-1 to 7-*n*.

As described above, the user information I/F 83 has a function for receiving the process ozone gas event signals 16-1 to 16-*n* (indicating the request ozone flow rate Qs12, the request ozone concentration Cs12, operation information Y, an apparatus No., and the like), which are command signals, from the ozone treatment apparatuses 12-1 to 12-*n*.

The system management control part 84 outputs the control signal S8 which is a command for controlling the opening/closing of the ozone gas control valves (9*a*, 9*b*, 9*c*, 9*ab*, 9*bc*, 9*ca*) provided in the ozone gas output flow rate management unit 9, and thereby collectively controls the parts within the ozone gas output flow rate management unit 9. The system management control part 84 also has a function for receiving information from the main control panel 85.

As shown in FIG. 12, the ozone gas supply system 101 includes a cooling water inlet port 13A and a cooling water outlet port 13B. Cooling water is introduced from an external cooling system (not shown) through the cooling water inlet port 13A and cooling water inlet ports 13*a*-1 to 13*a*-*n* into the ozone generation units 7-1 to 7-*n*. The water having served for the cooling is outputted from the ozone generation units 7-1 to 7-*n* through cooling water outlet ports 13*b*-1 to 13*b*-*n* and the cooling water outlet port 13B to the outside.

The amount and the temperature of the cooling water supplied from the external cooling system are controlled to constant values, though details thereof will not be described here.

The ozone gas supply system 101 has the raw gas supply port 14. The raw gas is introduced from the outside into the ozone generation units 7-1 to 7-*n* through the raw gas supply port 14, the moisture removal filter 59, and the raw gas supply ports 14-1 to 14-*n*.

The ozone gas output ports 15-1 to 15-*n* of the ozone generation units 7-1 to 7-*n* are connected to the ozone gas output flow rate management unit 9 within the ozone gas supply system 101, and the ozone gas is outputted from the ozone gas output flow rate management unit 9 through ozone gas output ports 25-1 to 25-*n* to the outside of the ozone gas supply system 101.

The process ozone gas event signals 16-1 to 16-*n* outputted from the n ozone treatment apparatuses 12-1 to 12-*n* are inputted to the system management control part 84 via the user information I/F 83. The process ozone gas event signal 16 (16-1 to 16-*n*) indicates the request ozone flow rate Qs12, the request ozone concentration Cs12, the operation information Y, and the like. The system management control part 84 has a function for outputting the ozone generation unit control signals 86-1 to 86-*n* for controlling the ozone generation units 7-1 to 7-*n* based on the process ozone gas event signals 16-1 to 16-*n*.

The ozone generation units 7-1 to 7-*n* include ozone generation unit control panels 85-1 to 85-*n*. The unit information signals 17-1 to 17-*n* are transmitted from the ozone generation units 7-1 to 7-*n* to the system management control part 84 via the unit information I/F 82 of the system collective management unit 8. The unit information signal 17 (17-1 to 17-*n*) is an information signal indicating the breakdown and an operating/stopping state of the ozone generator 1 included in each ozone generation unit 7.

The operation information Y included in the process ozone gas event signal 16 corresponds to a user information signal indicating the breakdown and an operating/stopping state of each ozone treatment apparatus 12 (12-1 to 12-*n*), and, as described above, outputted to the user information I/F 83 of the system collective management unit 8.

Each of the ozone generation units 7-1 to 7-*n* includes an ozone control part 19. The ozone control part 19 is a control part, as will be detailed later, that receives a set flow rate Qs and a detected flow rate Q for the flow rate of the raw gas, a set pressure Ps and a detected pressure P for the pressure of the ozone generator 1, and the ozone concentration C of the ozone outputted from each ozone generation unit 7, and that controls the ozone power source 2 to thereby control the ozone concentration, the gas flow rate, and the like, of the ozone gas generated in the ozone generator 1. The ozone control part 19 communicates signals with the ozone concentration meter 5, the MFC 3, the APC 4, and the ozone power source 2.

(Control of Ozone Gas Output Flow Rate Management Unit)

The configuration and the operation of the ozone gas output flow rate management unit 9 of the ozone gas supply system 101 are the same as those of the ozone gas output flow rate management unit 9 of the ozone gas supply system 10 according to the embodiment 1 shown in FIG. 2. Therefore, a description thereof is omitted.

(Main Control Panel)

The main control panel 85 of the ozone gas supply system 101 is the same as the main control panel 85 of the ozone gas supply system 10 according to the embodiment 1 shown in FIG. 3. Therefore, a description thereof is omitted (Ozone Control Part (Data Memory 1S6))

The configuration and the operation of the ozone control part 19 of the ozone gas supply system 101, including the data memory 1S6, are the same as those of the ozone control part 19 and the data memory 1S6 of the ozone gas supply system 10 according to the embodiment 1 shown in FIG. 4 to FIG. 7. Therefore, a description thereof is omitted as appropriate.

(Effects, etc.)

In the embodiment 4 described above, the moisture removal filter 59 is mounted to the raw gas supply port 14, and one ozone gas supply system 101 includes the plurality of ozone generation units 7-1 to 7-n, and each ozone generation unit 7 includes the ozone generator 1 having the means for generating the ozone gas, the ozone power source 2 having the means for supplying and controlling power to be supplied for ozone generation, the MFC 3 having the means for controlling the flow rate Q of the raw gas or the ozone gas to be a constant value, the APC 4 for automatic control having the means for controlling the pressure P in the ozone generator 1 to be constant, and the ozone concentration meter 5 having the means for detecting the output ozone concentration value C.

In the ozone gas supply system 101, the ozone gas output flow rate management unit 9 is provided in which the on/off valve (ozone gas control valves 9a to 9c) is arranged corresponding to the output ozone gas pipe of each ozone generator 1, and additionally the on/off valve (9bc, 9ab, 9ca) is arranged between the output ozone gas pipes of the respective ozone generators 1.

The ozone gas supply system 101 of the embodiment 4 includes the system collective management unit 8 (ozone gas output flow rate management unit) that can control the ozone gas output flow rate so that one or a combination of two or more of the plurality of ozone gas outputs from the ozone generation units 7-1 to 7-n can be selectively outputted to any of the ozone treatment apparatuses 12-1 by the opening/closing operation of the ozone gas control valves 9a, 9b, 9c, 9bc, 9ab, and 9ca provided in the ozone gas output flow rate management unit 9.

Accordingly, due to the moisture removal filter 59 provided in the ozone gas supply system 101, the moisture content in the raw gas supplied from the raw gas supply port 14 can be reduced from about 1 to 10 PPM to about 10 to 100 PPB. This can reduce the active gases generated together with the ozone generation due to the moisture, the impurities, and the silent discharge, such as the nitric acid cluster ($HNO_3$) gas, the OH radical gas, the OH radical ion gas, and the $HO_3^+$ ion gas. This can consequently suppress wear or breakdown of the APC 4, the MFC 3, and the ozone concentration meter 5 (ozone monitor) provided at the ozone gas output part of the ozone generator 1, the gas opening/closing valve (valve), and the ozone treatment apparatuses 12-1 to 12-n, which may be otherwise caused by the active gases such as the nitric acid ion cluster ($HNO_3$) gas, the OH radical gas, and the $HO_3^+$ ion gas.

Moreover, a high-quality ozone gas containing a small amount of the nitric acid cluster ($HNO_3$), the OH radical gas, and the metal contamination can be provided as the outputted ozone gas.

In this manner, in the ozone gas supply system 101 of the embodiment 4, the moisture removal filter 59 is provided having the function capable of trapping a small amount of moisture contained in the raw gas that is supplied to the raw gas supply port 14. This exerts an effect that the moisture content in the raw gas supplied to the ozone generator 1 is reduced to less than 300 PPB by the moisture removal filter 59 to thereby achieve a supply of a high-quality ozone gas.

As described above, in the ozone gas supply system 101 of the embodiment 5, the moisture removal filter 59 is mounted. As a result, the ozone gas having a higher dew point is provided, and additionally, the mounted moisture removal filter 59 can remove the moisture content. This exerts an effect that a time for flowing a purge gas prior to the ozone gas generation can be considerably shortened so that a time for the start up of the apparatus can be considerably shortened.

Moreover, by bringing the ozone gas control valves 9a, 9b, and 9c into the open state, bringing the ozone gas control valves 9ab, 9bc, and 9ca into the closed state, and bringing the ozone gas on/off valves 22-1 to 22-n into the open state so that the ozone gas can be supplied from the ozone generation units 7-1 to 7-n to the ozone treatment apparatuses 12-1 to 12-n that are in one-to-one correspondence with each other, the flow rate and the ozone gas concentration of the ozone gas supply can be independently controlled in each of the ozone treatment apparatuses 12-1 to 12-n.

In the ozone gas supply system 101 of the embodiment 4, similarly to the embodiment 1, as shown in FIGS. 2 and 3, by supplying a combination of two or more ozone gas outputs to one ozone treatment apparatus (ozone treatment apparatus 12-2), the ozone gas can be supplied with various gas flow rates and concentrations.

Moreover, even if trouble occurs in a part of the ozone generation units 7-1 to 7-n, the other ozone generation units 7 that are normally operating can supply the ozone gas to any of the ozone treatment apparatuses 12-1 to 12-n. Therefore, an ozone gas supply with a high reliability can be achieved, and additionally a high-quality ozone gas can be provided in which a small amount of the active gas is contained in the output ozone gas.

In this manner, the ozone gas supply system 101 of the embodiment 4, similarly to the ozone gas supply system 10 of the embodiment 1, controls the ozone gas output flow rate management unit 9 based on the control signal S8 supplied from the system management control part 84, to perform a combination/selection process for combining and selecting ozone gas outputs from the ozone generation units 7-1 to 7-n, so that the ozone gas can be outputted to the ozone treatment apparatus 12 with a desired gas flow rate and a desired ozone gas concentration.

In the ozone gas supply system 101 of the embodiment 4, the ozone gas control valves 9a, 9b, 9c, 9bc, 9ab, and 9ca provided in the ozone gas output flow rate management unit 9 can be electrically-operated valves or pneumatic valves that are openable and closable by means of electricity or air pressure, so that the gas flow rate and the ozone gas concentration of the ozone gas outputted from the ozone generator 1 of each ozone generation unit 7 to the outside can be centrally managed under control of the control signal S8.

The system collective management unit 8 includes the water leakage sensor 6, the EMO circuit 81, the unit information I/F 82, the system management control part 84, and the like. Thereby, in a case where an emergency stop or water leakage is detected in any of the ozone generation units 7-1 to 7-n, the corresponding said ozone generation unit can be stopped.

Furthermore, the exhaust gas sensor 23, the ozone leak sensor 24, the system management control part 84, and the like, are provided. Thereby, in a case where an abnormal exhaust or ozone abnormal leakage is detected in the system as a whole, all the ozone generation units 7-1 to 7-n can be stopped.

In this manner, the ozone gas supply system 101 (first aspect) of the embodiment 4 has a safety shutdown function in case of trouble of each ozone generation unit 7, trouble of the entire ozone gas supply system 101, and the like. Thus, a system with a high security can be achieved.

Second Aspect of Embodiment 4

In a second aspect of the embodiment 4, similarly to the embodiment 2 shown in FIGS. 8 and 9, each of the ozone power source 2 and the ozone generator 1 is downsized. Not only the compactified ozone power source 2 having the means for supplying power and controlling the amount of power and the compactified ozone generator 1 having the means for generating the ozone gas, but also the MFC 3 having the means for controlling the flow rate of the raw gas, the ozone gas filter 51 having the means for removing impurities in the ozone gas, the ozone concentration meter 5 having the means for detecting the output ozone gas concentration, and the APC 4 having the means for controlling the gas pressure in the ozone generator to be a constant value, are assembled together and packaged, thereby achieving the ozone generation unit 7X serving as one unit in a structural sense, too.

(Compactification of Ozone Power Source 2)

In the embodiment 4, too, by adopting the circuit configuration of the embodiment 1 shown in FIG. 8, a circuit configuration compactified by integrating main components of the ozone generator 1 and the ozone power source 2 with each other, can be achieved.

(Combined Structure of Ozone Generation Unit)

In the embodiment 4, similarly to the embodiment 1 shown in FIG. 9, the ozone generation unit 7X as one unit can be achieved in which the ozone generator 1, the ozone power source 2, the MFC 3, the gas filter 51, the ozone concentration meter 5, the APC 4, and the gas pipe integrated block 30 are assembled together.

In a conventional ozone gas supply system or a conventional ozone generation apparatus, as shown in FIG. 25 described in the embodiment 1, merely an electrical connection or a gas pipe connection is allowed between three divided blocks of the gas control unit 400, the inverter control unit 500 corresponding to the ozone power source, and the ozone generation unit 600. Thus, the structure shown in FIG. 9 cannot be achieved.

Moreover, since the raw gas included in an installed utility is directly supplied to the ozone gas supply system, there is no means for suppressing the moisture content in the raw gas that is supplied to the ozone generator, which cause a high rate of breakdown of a gas control equipment provided in the ozone gas output part.

In the second aspect of the embodiment 4, similarly to the embodiment 1, as shown in FIG. 9, in the ozone generation unit 7X, these three units (400, 500, 600) are assembled together, to achieve considerable downsizing as compared with the configuration shown in FIG. 25. Additionally, since the moisture removal filter 59 is mounted to the raw gas supply port 14 of the ozone gas supply system 101 shown in FIG. 12, the rate of breakdown of the gas control equipment provided in the ozone gas output part can be lowered, so that a high-quality ozone gas can be provided.

In this manner, similarly to the embodiment 1, each of the ozone generation units 7-1 to 7-n of the embodiment 4 is structured as the ozone generation unit 7X in which the ozone generator 1, the ozone power source 2, the MFC 3, the APC 4, and the ozone concentration meter 5 are assembled together and packaged into one unit.

As a result, as in the embodiment 4, a plurality of the ozone generation units 7X can be installed within the ozone gas supply system 10, and by connecting the output pipes of the ozone generation units 7X by the gas control valve 9, the supply of the ozone gas can be distributed among the respective ozone treatment apparatuses 12 including the ozone treatment apparatuses 12-1 to 12-n or a large amount of ozone gas or an ozone gas having a high concentration can be selectively supplied to one ozone treatment apparatus 12, as described in the embodiment 4.

Third Aspect of Embodiment 4

In a third aspect of the embodiment 4, similarly to the embodiment 3 shown in FIGS. 10 and 11, the ozone generation unit 7 as one unit is focused on, and downsizing of the ozone generation unit 7 in combination with the ozone gas output flow rate management unit 9 can be achieved.

(Control of Ozone Gas Output Flow Rate Management Unit)

The third aspect of the embodiment 4 can be achieved by adopting the ozone gas supply system 20 of the embodiment 3 shown in FIG. 10 as a configuration corresponding to the ozone gas supply system 101 shown in FIG. 12.

(Combined Structure of Ozone Generation Unit)

The third aspect of the embodiment 4 can be achieved by configuring each of the ozone generation units 7-1 to 7-n of the ozone gas supply system 101 as the ozone generation unit 7Y of the embodiment 3 shown in FIG. 11.

Embodiment 5

FIG. 13 is a block diagram showing a configuration of an ozone gas supply system according to an embodiment 5 of the present invention.

In an ozone gas supply system 102 of the embodiment 5, similarly to the ozone gas supply system 101 of the embodiment 4, moisture removal filters 59-1 to 59-n are provided for the purpose of trapping a moisture contained in the raw gas that is supplied through the raw gas supply port 14 into the configuration of the ozone gas supply system 102. However, the moisture removal filters 59-1 to 59-n are provided in one-to-one correspondence with the ozone generation units 7-1 to 7-n, and provided near the inlet portions of the raw gas supply parts of the ozone generation units 7-1 to 7-n, respectively. Each of the moisture removal filters 59-1 to 59-n suppresses a moisture content in the raw gas supplied to each of the ozone generation units 7-1 to 7-n, so that the quality of the ozone gas generated in each of the ozone generation units 7-1 to 7-n is increased. In this manner, in the ozone gas supply system 102 of the embodiment 5, the raw gas supplied from the raw gas supply port 14 passes through the moisture removal filters 59-1 to 59-n, and then is supplied to the raw gas supply ports 14-1 to 14-n of the ozone generation units 7-1 to 7-n.

Particularly, in the ozone generation units 7-1 to 7-n of the embodiment 5, the moisture removal filter 59 (any of the moisture removal filters 59-1 to 59-n) for trapping a moisture contained in the gas is mounted to the raw gas inlet portion of one unit of the ozone generation unit 7, and, similarly to the embodiment 2, downsizing of the ozone generation unit 7 is achieved by the combined structure.

(Raw Gas Purity Management)

Figure 14:
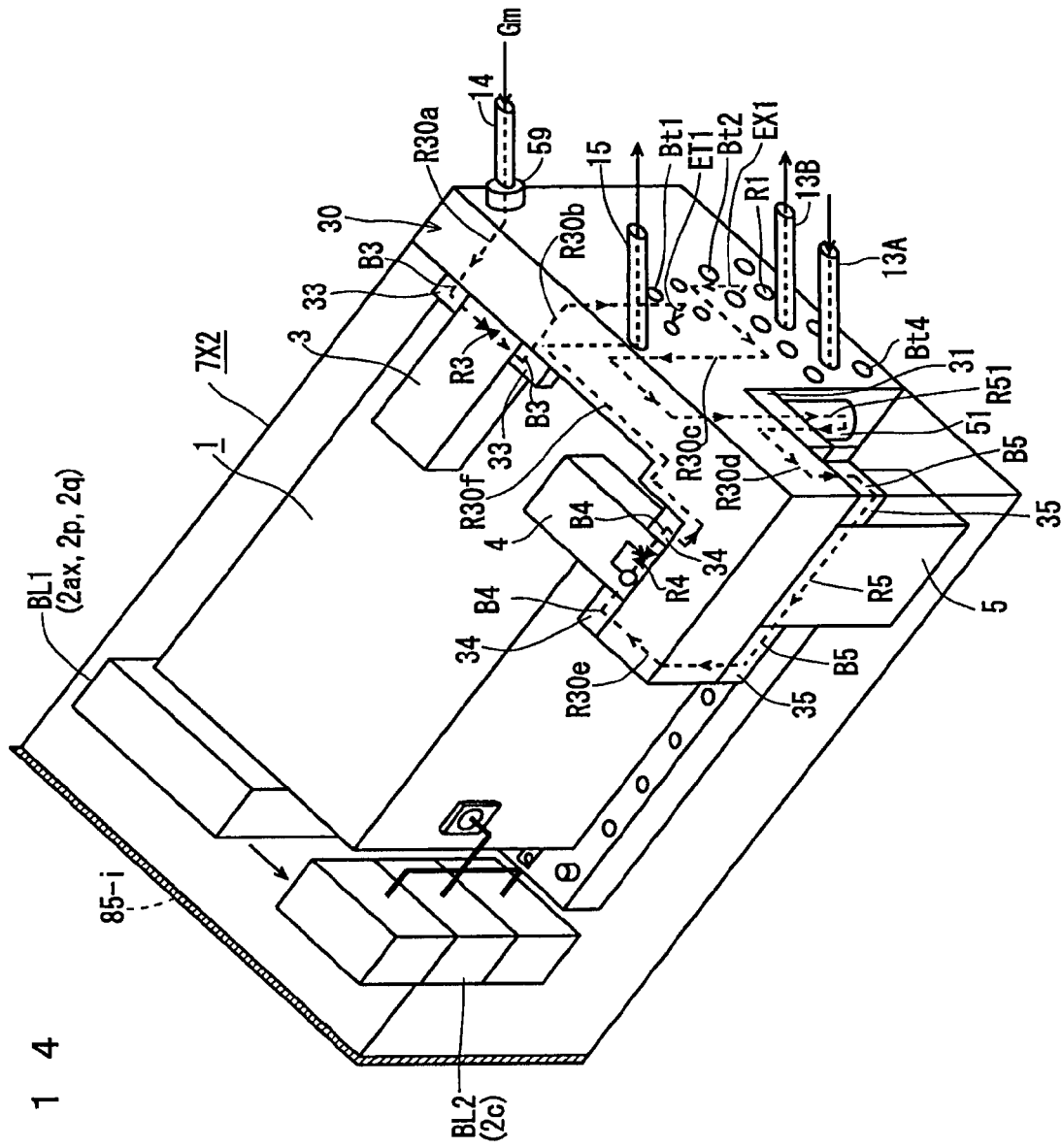
FIG. 14 A perspective view schematically showing a combined structure of an ozone generation unit according to the embodiment 5.

FIG. 14 is a perspective view schematically showing a combined structure of an ozone generation unit 7X2 as one unit according to the embodiment 5.

As shown in FIGS. 13 and 14, at the raw gas supply ports 14-1 to 14-n of the ozone generation units 7-1 to 7-n, the moisture removal filter 59 (59-1 to 59-n) is mounted at a position that allows easy replacement, and integrally formed. In the following, for convenience of the description, a case of n=3 will be described as an example, with reference to FIG. 13.

The moisture is contained in the air, too. Therefore, when a part of the pipes in the raw gas pipe path is opened to the air, a moisture immediately adsorbs to a pipe surface. If the raw gas flows in the raw gas pipe to which the moisture adsorbs, not only the moisture contained in the high-purity raw gas but also the moisture adhering to the pipe are separated by the gas flow, so that the dew point of the supplied raw gas rises as shown in FIG. 26. Sometimes, the moisture content in the raw gas may be increased to 10 PPM or more.

If a moisture or an impurity gas such as a nitrogen-based gas, a carbon-based gas, or a sulfide gas is contained in the raw gas, not only the ozone gas but also N radical and OH radical gases are generated by discharging. These radical gases are combined with the moisture, thus outputting the ozone gas that contains cluster molecule gases of nitric acid and OH radical.

Since these cluster molecule gases of nitric acid and OH radical are very active gases, a chemical reaction occurs on a metal surface of the ozone-gas output gas pipe, the valve, or the like, to cause corrosion of the pipe surface. This may cause a corroded-metal impurity (metal contamination) to be contained in the output ozone gas.

Increase in the amount of the metal impurity (metal contamination) contained in the output ozone gas deteriorates the performance of an oxide film that is formed on a semiconductor by an oxide film process using the ozone gas.

From the above, it has been confirmed from tests that the quality of an output ozone gas is deteriorated if a large amount of moisture is contained in the raw gas. Accordingly, the moisture removal filters 59-1 to 59-$n$ for the purpose of moisture removal are mounted to a raw gas supply portion. Particularly, in the embodiment 5, at the raw gas supply ports 14-1 to 14-$n$ of the ozone generation units 7-1 to 7-$n$, the moisture removal filter filters 59-1 to 59-$n$ are mounted at positions that allow easy replacement, so that the raw gas is supplied to the ozone generator 1 with removal of the moisture.

Moreover, even if trouble occurs in a part of the moisture removal filters 59-1 to 59-$n$ of the ozone generation units 7-1 to 7-$n$, the other ozone generation units 7 to which the other moisture removal filters 59 that are normally operating are mounted can supply the ozone gas to any of the ozone treatment apparatuses 12-1 to 12-$n$. Therefore, an ozone gas supply with a high reliability can be achieved, and additionally a high-quality ozone gas can be provided in which a small amount of the active gas is contained in the output ozone gas.

In this configuration, the moisture removal filters 59-1 to 59-$n$ are provided in one-to-one correspondence with the ozone generation units 7-1 to 7-$n$. However, depending on a type of the impurity gas, a plurality of gas filters may be provided in series and at multiple stages, or an impurity gas filter and a moisture trapping gas filter may be provided in series and at multiple stages.

The other parts, pipe paths, and the like, of the configuration are substantially identical to those of the ozone generation unit 7X of the embodiment 2 shown in FIG. 9. Therefore, a description thereof is omitted as appropriate, and a description will be given mainly to points different from the ozone generation unit 7X.

As shown in FIG. 14, a raw gas pipe system (the raw gas supply port 14+the moisture removal filter 59) and an output gas pipe system (ozone gas output port 15) are integrated into a gas pipe integrated block 30 as a gas pipe integrated block structure. Thereby, the ozone generator 1, the ozone power source 2, and the gas pipe systems are packaged, and thus the ozone generation unit 7X2 can be further downsized. The raw gas supply port 14 and the moisture removal filter 59 are coupled to each other.

A raw gas input pipe path for a raw gas Gm to be supplied from the raw gas supply port 14 through the MFC 3 to an ozone generator input part ET1 of the ozone generator 1 is a path formed by the raw gas supply port 14, the moisture removal filter 59, the pipe path R30$a$, the in-block passage B3, the MFC 3, the pipe path R30$b$, and the ozone generator input part ET1 arranged in the mentioned order. At this time, a region of the ozone generator 1 around the ozone generator input part ET1 is mounted to the gas pipe integrated block 30 by the ozone generator mounting bolt Bt1. In this manner, the input pipe path for the raw gas Gm is formed using the gas pipe integrated block 30.

Similarly to the embodiment 5, the moisture removal filter 59 (moisture removal filters 59-1 to 59-$n$) is mounted at a position that allows easy replacement and in connection with the raw gas supply port 14 provided at a rear surface of the ozone generation units 7-1 to 7-$n$. As a result, the ozone gas having a higher dew point is provided, and additionally, the mounted moisture removal filter 59 can remove the moisture content. This exerts an effect that a time for flowing a purge gas prior to the ozone gas generation can be considerably shortened so that a time for the start up of the apparatus can be considerably shortened.

Embodiment 6

FIG. 15 is a block diagram showing a configuration of an ozone gas supply system according to an embodiment 6 of the present invention.

The embodiment 6 is "focusing on the ozone generation unit 7 as one unit corresponding to each of the ozone generation units 7-1 to 7-$n$, and achieving downsizing of the ozone generation unit 7" of the embodiment 2. Particularly, the MFC 3 provided at the raw gas input part of the ozone generator 1 of the embodiment 5 is removed, and instead, an MFC 53 serving as flow-rate control means is arranged at the ozone gas output part for the output of the ozone gas generated by the ozone generator 1, thus achieving downsizing of the ozone generation unit 7.

(Ozone-Gas Flow-Rate Control)

Figure 16:
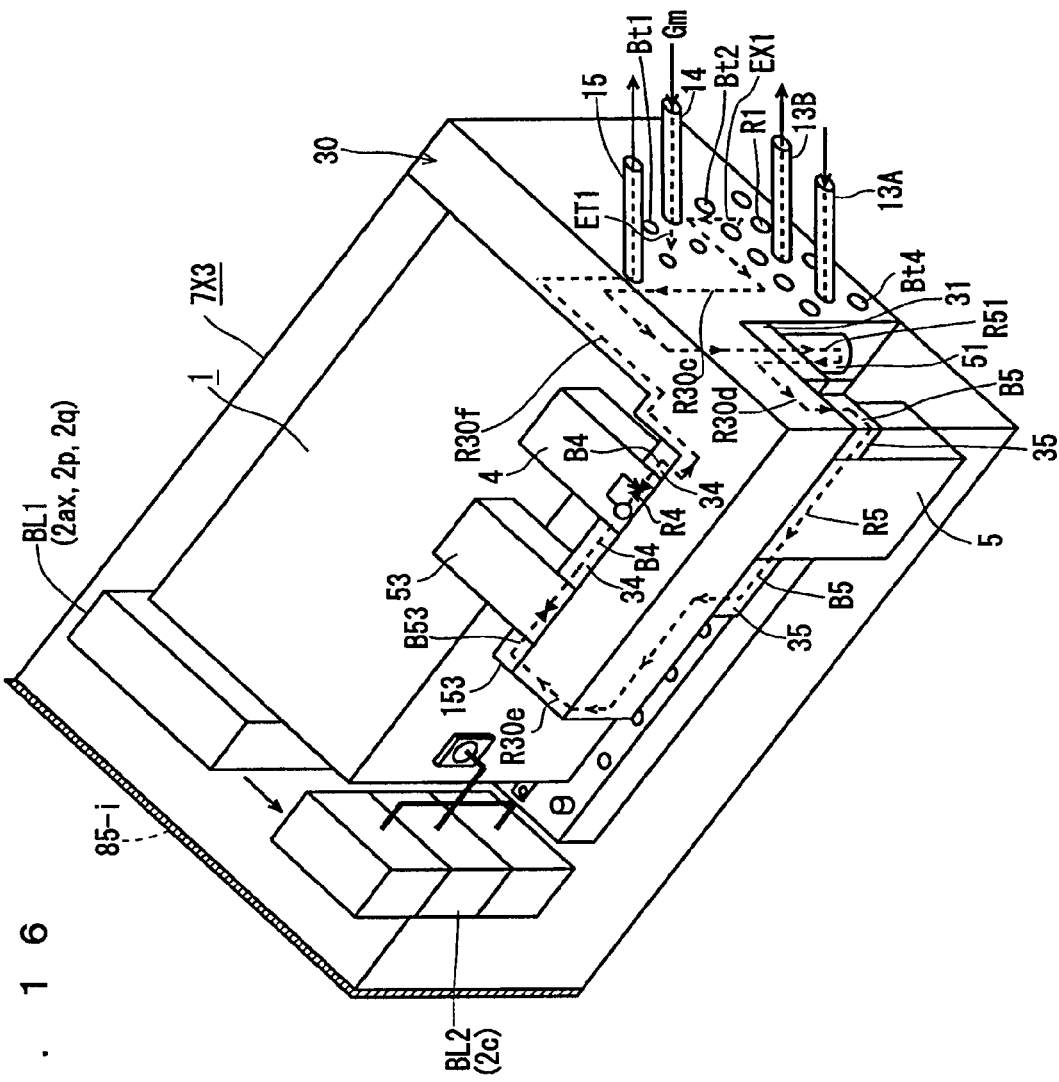
FIG. 16 A perspective view schematically showing a combined structure of the ozone generation unit according to the embodiment 6.

An ozone gas supply system 103 of the embodiment 6 shown in FIG. 15 corresponds to the ozone gas supply system 101 of the embodiment 4 shown in FIG. 12. FIG. 16 is a perspective view schematically showing a combined structure of an ozone generation unit as one unit according to the embodiment 6.

As shown in FIGS. 15 and 16, the embodiment 6 is an embodiment in which, in terms of the function, the MFC 3 serving as the gas-flow-rate control means provided in the raw gas supply part in the embodiment 1, the embodiment 4, and the embodiment 5 is moved, as the MFC 53, to the pipe system for the generated ozone gas. In other words, comparing the ozone gas supply system 103 of the embodiment 6 and the ozone gas supply system 101 of the embodiment 4 shown in FIG. 12, a different point is that the MFC 3 is eliminated while the MFC 53 is newly interposed between the ozone concentration meter 5 and the APC 4, and furthermore the moisture removal filter 59 is not provided. The operation, and the like, of the apparatus are substantially identical to those of the embodiment 1, the embodiment 4, and the embodiment 5. Therefore, a description thereof is omitted.

In this manner, in an ozone generation unit 7X3 of the embodiment 6, the ozone generator 1 and the like are mounted in close contact with the gas pipe integrated block 30. In the following, a description will be given to the pipe paths in the ozone generation unit 7X3 which utilizes the gas pipe integrated block 30 shown in FIG. 16. In the gas pipe integrated block 30, pipe paths R30$c$ to R30$f$ are provided. The cooling water inlet port 13A, the cooling water outlet port 13B, the raw gas supply port 14, and the ozone gas output port 15 are mounted to the side surfaces of the gas pipe integrated block 30. The ozone generator 1 is mounted to the gas pipe integrated block 30 using ozone generator mounting bolts Bt1 to Bt4.

The APC 4 is interposed between APC mounting blocks 34, 34 and thereby mounted to the gas pipe integrated block 30. The MFC 53 is interposed between an APC mounting block 34 and an MFC mounting block 153 and thereby mounted to the gas pipe integrated block 30. The ozone concentration meter 5 is interposed between ozone concentration meter mounting blocks 35, 35 and thereby mounted. In these mounting blocks 33, 34, 153, and 35, in-block passages B3, B4, B53, and B5 for ensuring the pipe paths are formed. The gas filter 51 is mounted to the gas pipe integrated block 30 by using a gas filter mounting block 31.

The raw gas supply port 14 to which the raw gas Gm is supplied is directly provided to an ozone generator input part ET1 of the ozone generator 1, and an input pipe path is a path formed by the raw gas supply port 14 and the ozone generator input part ET1 in the mentioned order. At this time, a region of the ozone generator 1 around the ozone generator input part ET1 is mounted to the gas pipe integrated block 30 by the ozone generator mounting bolt Bt1. In this manner, the input pipe path for the raw gas Gm is formed using the gas pipe integrated block 30.

An ozone gas output pipe for an ozone gas outputted from the ozone generator 1 and received by the ozone generator output part EX1 to be outputted from the ozone gas output port 15 through the gas filter 51, the ozone concentration meter 5, the MFC 53, and the APC 4 is a path formed by the ozone generator output part EX1, the pipe path R30c, the inside of the gas filter mounting block 31, the gas filter 51, the inside of the gas filter mounting block 31, the pipe path R30d, the in-block passage B5, the ozone concentration meter 5, the in-block passage B5, the pipe path R30e, the in-block passage B53, the MFC 53, the in-block passage B4, the APC 4, the in-block passage B4, the pipe path R30f, and the ozone gas output port 15 arranged in the mentioned order. At this time, a region of the ozone generator 1 around the ozone generator output part EX1 is mounted to the gas pipe integrated block 30 by the ozone generator mounting bolt Bt2. In this manner, the output pipe path for the ozone gas is formed using the gas pipe integrated block 30.

In the embodiment 6, the amount of the generated output ozone gas itself is controlled by the MFC 53. This exerts an effect that the ozone-gas flow rate can be controlled so as to achieve an accurate output so that the amount of output ozone is accurately controlled.

It suffices that the raw gas supply port 14 is directly piped to the raw gas (input) pipe system, without the need of any pipe peripheral component. In the ozone gas output pipe part, the gas filter 51, the MFC 53, the ozone concentration meter 5, and the APC 4 are collectively mounted to the gas pipe component. Therefore, an integrated pipe configuration is allowed only in the output gas pipe system. As a result, the pipe is more compactified, and the number of components of the integrated pipe configuration can be reduced, which makes it easier to replace components.

(Other Aspects)

Figure 17:
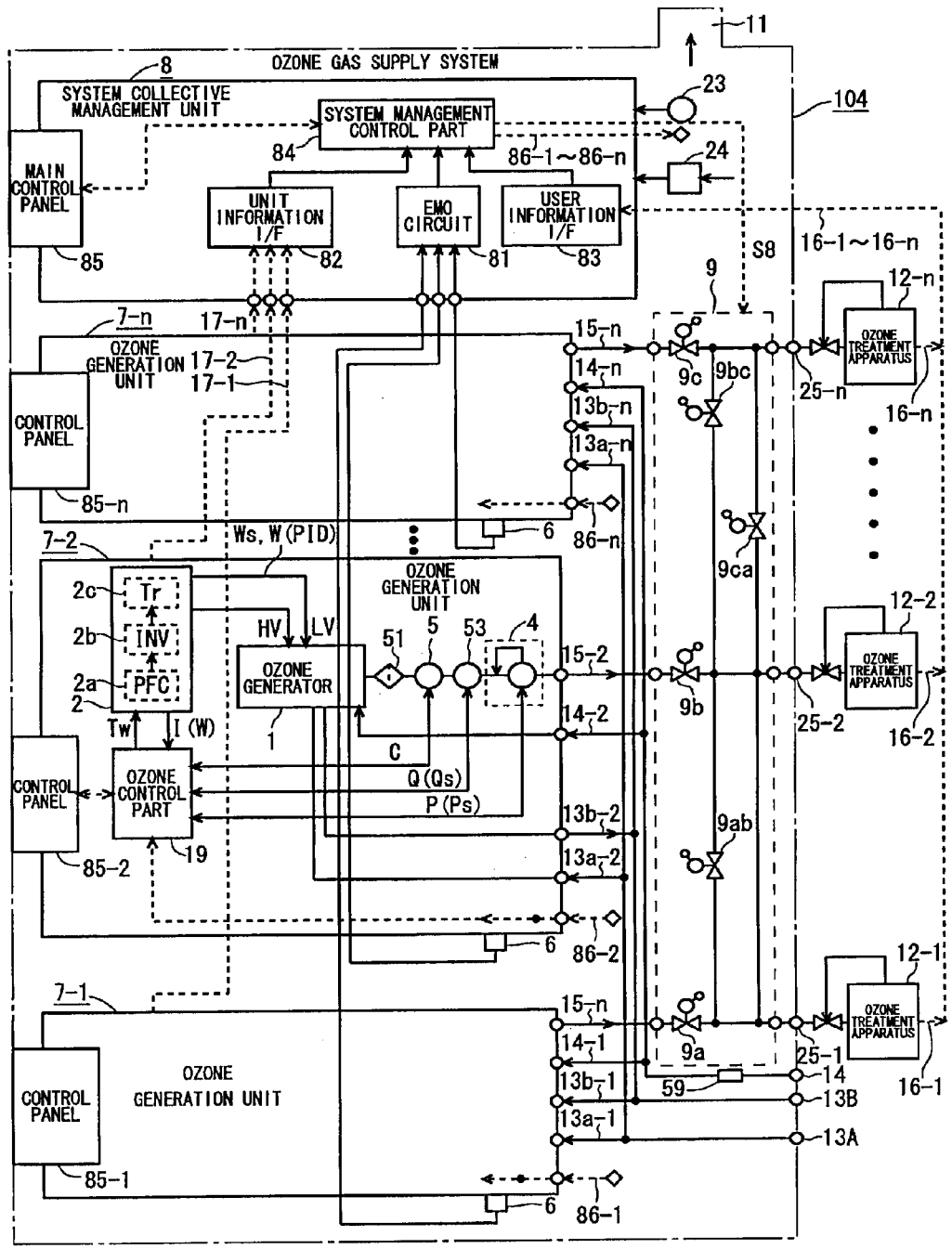
FIG. 17 A block diagram showing another configuration of the ozone gas supply system according to the embodiment 6 of the present invention.

In another aspect of the ozone gas supply system according to the embodiment 6, similarly to the embodiment 4, the moisture removal filter 59 having a function capable of trapping a small amount of moisture contained in the raw gas that is supplied from the raw gas supply port 14 may be added as shown in FIG. 17.

Additionally, similarly to the embodiment 5 shown in FIG. 13, a configuration (not shown) in which the moisture removal filters 59-1 to 59-n are provided near the raw gas supply ports 14-1 to 14-n of the ozone generation units 7-1 to 7-n may be adopted.

Figure 18:
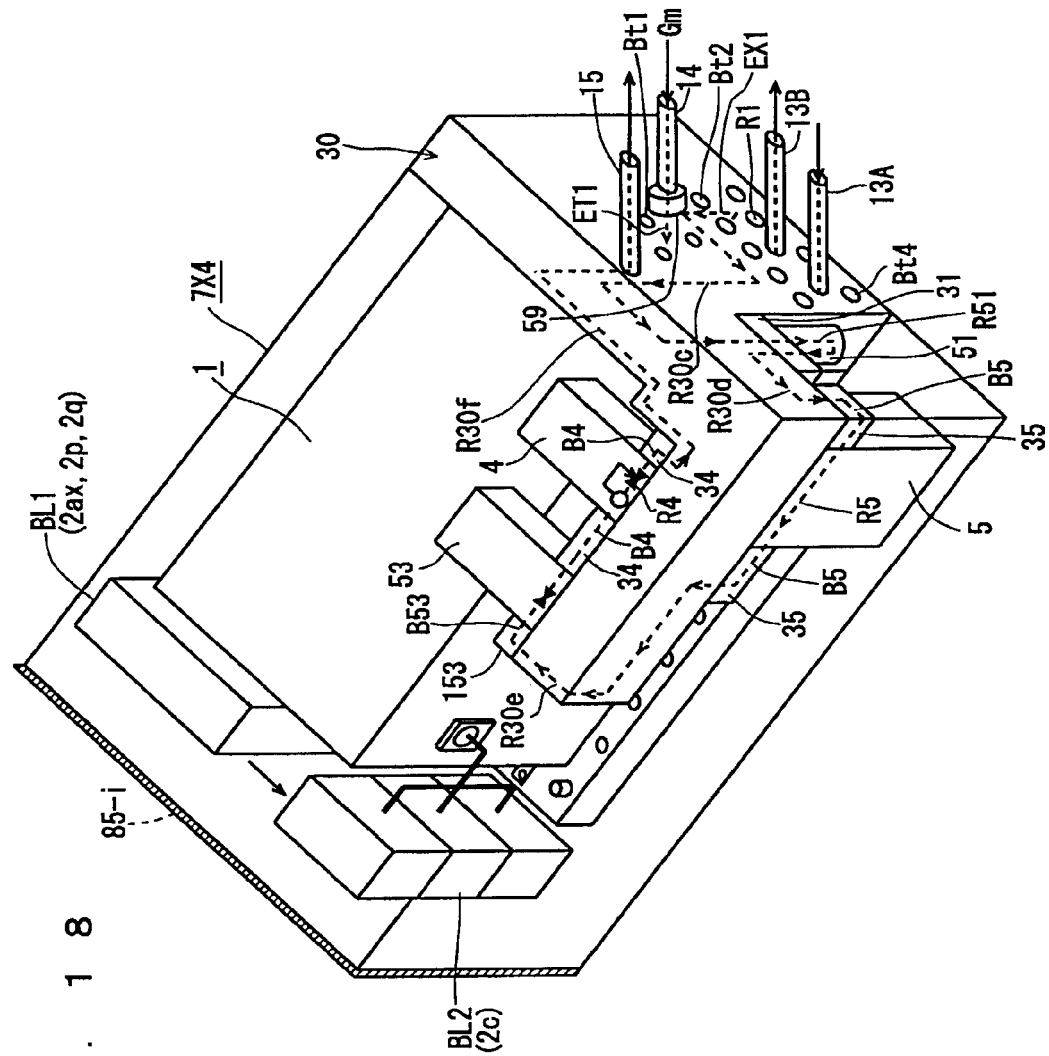
FIG. 18 A perspective view schematically showing another combined structure of the ozone generation unit according to the embodiment 6.

In this case, as shown in FIG. 18, the raw gas supply port 14 and the moisture removal filter 59 (any of the moisture removal filters 59-1 to 59-n) are provided in series in the ozone generator input part ET1. That is, as shown in FIG. 18, there is obtained an ozone generation unit 7X4 having a gas pipe integrated block structure in which the raw gas pipe (the raw gas supply port 14+the moisture removal filter 59) and the output gas pipe system (ozone gas output port 15) are integrated into the gas pipe integrated block 30.

Embodiment 7

Basic Configuration: First Aspect

Figure 19:
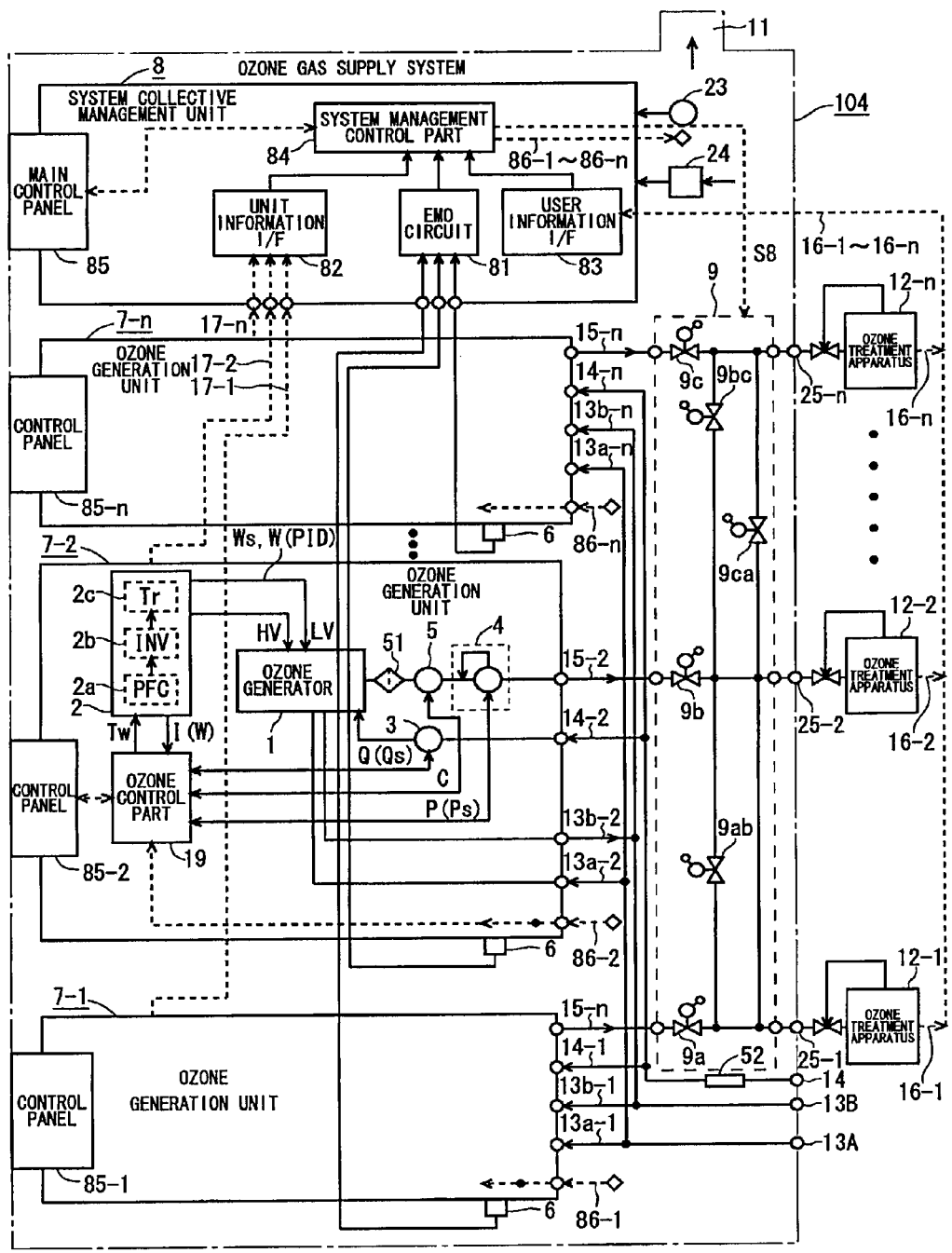
FIG. 19 A block diagram showing a configuration of an ozone gas supply system according to an embodiment 7 of the present invention.

FIG. 19 is a block diagram showing a configuration of an ozone gas supply system according to an embodiment 7 (first aspect) of the present invention.

(Overall Configuration)

As shown in FIG. 19, an ozone gas supply system 104 has n (≥2) ozone generation units 7-1 to 7-n included therein, and has one gas filter 52 shared by the ozone generation units 7-1 to 7-n. The gas filter 52 is controlled to remove a small amount of impurities or an impurity gas contained in the raw gas that is supplied from the raw gas supply port 14 so that the purity of the raw gas is stabilized by the gas filter 52. The configuration and the operation are identical to those of the ozone gas supply system 101 of the embodiment 4 shown in FIG. 12 except that the gas filter 52 replaces the moisture removal filter 59. Therefore, a description thereof is omitted as appropriate.

The ozone gas supply system 104 has the raw gas supply port 14. The raw gas is introduced from the outside into the ozone generation units 7-1 to 7-n through the raw gas supply port 14, the gas filter 52, and the raw gas supply ports 14-1 to 14-n. That is, the gas filter 52 for removing a small amount of impurities and an impurity gas contained in the raw gas is provided at the raw gas supply port 14 that is an inlet port for the external raw gas, and the gas filter 52 is controlled to stabilize the purity of the raw gas.

(Effects, etc.)

Accordingly, due to the gas filter 52 provided in the ozone gas supply system 104 of the embodiment 7, the impurities and the impurity gas contained in the raw gas supplied from the raw gas supply port 14 can be reduced. This can reduce the active gases generated together with the ozone generation due to the moisture, the impurities, and the silent discharge, such as the nitric acid cluster ($HNO_3$) gas, the OH radical gas, the OH radical ion gas, and the $HO_3^+$ ion gas. This can consequently suppress wear or breakdown of the APC 4, the MFC 3, and the ozone concentration meter 5 provided at the ozone gas output part of the ozone generator 1, the gas opening/closing valve, and the ozone treatment apparatuses 12-1 to 12-n, which may be otherwise caused by the active gases such as the nitric acid ion cluster ($HNO_3$) gas, the OH radical gas, and the $HO_3^+$ ion gas.

Moreover, a high-quality ozone gas containing a small amount of the nitric acid cluster ($HNO_3$), the OH radical gas, and the metal contamination can be provided as the outputted ozone gas.

In this manner, in the ozone gas supply system 104 of the embodiment 7, the gas filter 52 is provided having the function capable of trapping impurities and an impurity gas contained in the raw gas that is supplied to the raw gas supply port 14. This exerts an effect that the impurity gas and the like contained in the raw gas supplied to the ozone generator 1 is reduced by the gas filter 52 to thereby achieve a supply of a high-quality ozone gas.

Second Aspect of Embodiment 7

In a second aspect of the embodiment 7, similarly to the embodiment 2 shown in FIGS. 8 and 9, each of the ozone power source 2 and the ozone generator 1 is downsized. Not only the compactified ozone power source 2 having the means for supplying power and controlling the amount of power and the compactified ozone generator 1 having the means for generating the ozone gas, but also the MFC 3 having the means for controlling the flow rate of the raw gas, the ozone gas filter 51 having the means for removing impurities in the ozone gas, the ozone concentration meter 5 having the means for detecting the output ozone gas concentration, and the APC 4 having the means for controlling the gas pressure in the ozone generator to be a constant value, are assembled together and packaged, thereby achieving the ozone generation unit 7X serving as one unit in a structural sense, too.

(Compactification of Ozone Power Source 2)

In the embodiment 7, too, by adopting the circuit configuration of the embodiment 1 shown in FIG. 8, a circuit configuration compactified by integrating main components of the ozone generator 1 and the ozone power source 2 with each other, can be achieved.

(Combined Structure of Ozone Generation Unit)

In the embodiment 7, similarly to the embodiment 1 shown in FIG. 9, the ozone generation unit 7X as one unit can be achieved in which the ozone generator 1, the ozone power source 2, the MFC 3, the gas filter 51, the ozone concentration meter 5, the APC 4, and the gas pipe integrated block 30 are assembled together.

Third Aspect of Embodiment 7

In a third aspect of the embodiment 7, similarly to the embodiment 3 shown in FIGS. 10 and 11, the ozone generation unit 7 as one unit is focused on, and downsizing of the ozone generation unit 7 in combination with the ozone gas output flow rate management unit 9 can be achieved.

(Control of Ozone Gas Output Flow Rate Management Unit)

The third aspect of the embodiment 7 can be achieved by adopting the ozone gas supply system 20 of the embodiment 3 shown in FIG. 10 as a configuration corresponding to the ozone gas supply system 104 shown in FIG. 19.

(Combined Structure of Ozone Generation Unit)

The third aspect of the embodiment 7 can be achieved by configuring each of the ozone generation units 7-1 to 7-n of the ozone gas supply system 104 as the ozone generation unit 7Y of the embodiment 3 shown in FIG. 11.

Embodiment 8

Figure 20:
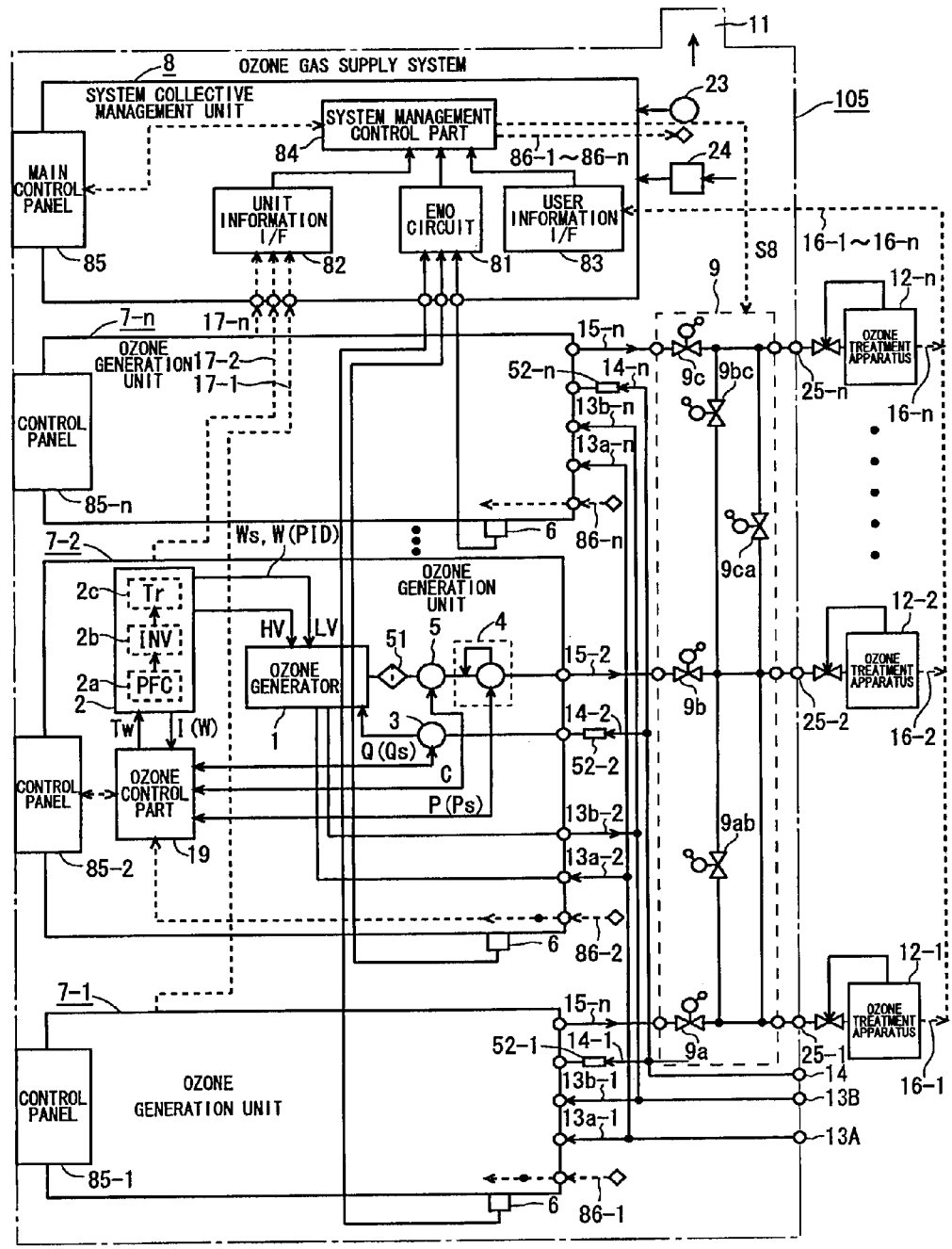
FIG. 20 A block diagram showing a configuration of an ozone gas supply system according to an embodiment 8 of the present invention.

FIG. 20 is a block diagram showing a configuration of an ozone gas supply system according to an embodiment 8 of the present invention.

In an ozone gas supply system 105 of the embodiment 8, similarly to the ozone gas supply system 104 of the embodiment 7, gas filters 52-1 to 52-n (for the raw-gas) are provided for the purpose of trapping impurities and an impurity gas contained in the raw gas that is supplied through the raw gas supply port 14 into the configuration of the ozone gas supply system 105. However, the gas filters 52-1 to 52-n are provided in one-to-one correspondence with the ozone generation units 7-1 to 7-n, and provided near the inlet portions of the raw gas supply parts of the ozone generation units 7-1 to 7-n, respectively. Each of the gas filters 52-1 to 52-n increases the purity of the raw gas supplied to each of the ozone generation units 7-1 to 7-n, so that the purity of the ozone gas generated in the ozone gas supply system 105 is increased.

Particularly, in the ozone generation units 7-1 to 7-n of the embodiment 8, similarly to the embodiment 2, the gas filter 52 for trapping impurities and an impurity gas contained in the gas is mounted to the raw gas inlet portion of one unit of the ozone generation unit 7, and downsizing of the ozone generation unit 7 is achieved by the combined structure.

(Raw Gas Purity Management)

Figure 21:
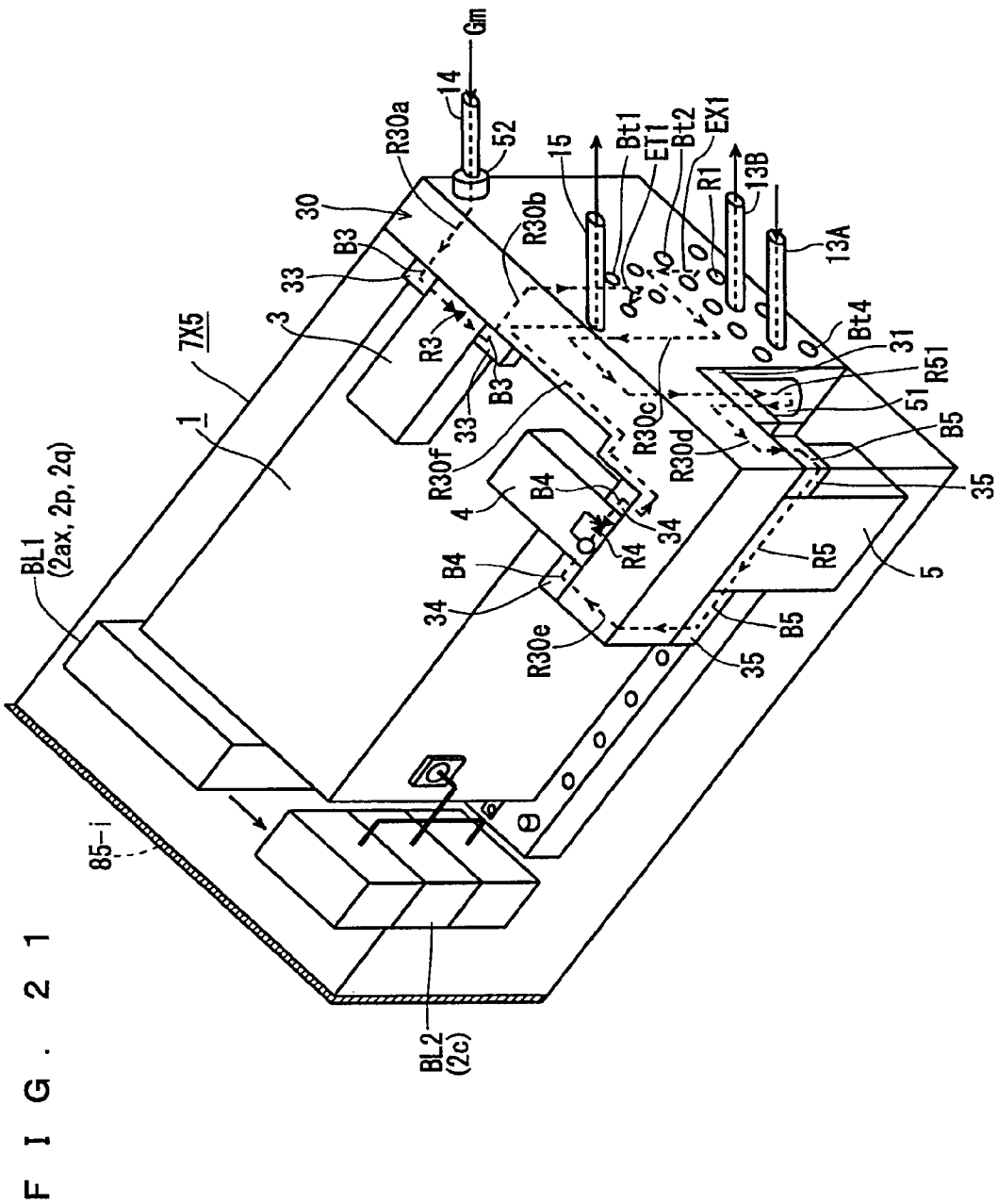
FIG. 21 A perspective view schematically showing a combined structure of an ozone generation unit according to the embodiment 8.

FIG. 21 is a perspective view schematically showing a combined structure of an ozone generation unit 7X5 as one unit according to the embodiment 8.

As shown in FIGS. 20 and 21, the gas filter 52 (52-1 to 52-n) is mounted at a position that allows easy replacement and in connection with the raw gas supply ports 14-1 to 14-n of the ozone generation units 7-1 to 7-n, and integrally formed. In the following, for convenience of the description, a case of n=3 will be described as an example, with reference to FIG. 20.

FIG. 26 is an explanatory diagram showing the relationship between the dew point of the raw gas and the moisture content in the raw gas. As the raw gas supplied to the ozone gas supply system 104, in general, a raw gas having a high purity of 99.99% or more is used. This high-purity raw gas contains an impurity gas of about 0.1 to a few PPM, other than the raw gas, such as a nitrogen-based gas, a carbon-based gas, and a sulfide gas. The high-purity raw gas also contains a moisture of one to a few PPM (see FIG. 26).

As the raw gas supplied to the ozone gas supply system 105, in general, a raw gas having a high purity of 99.99% or more is used. This high-purity raw gas contains an impurity gas of about 0.1 to a few PPM, other than the raw gas, such as a nitrogen-based gas, a carbon-based gas, and a sulfide gas. The high-purity raw gas also contains a moisture of one to a few PPM. Additionally, these impurity gas and moisture are contained in the air, too. Therefore, when a part of the pipes in the raw gas pipe path is opened to the air, a moisture and an impurity gas such as a nitrogen gas immediately adsorb to a pipe surface. If the raw gas flows in the raw gas pipe to which the impurity gas adsorbs, not only the impurity gas and the moisture contained in the high-purity raw gas but also the impurity gas adhering to the pipe are separated by the gas flow, which may lower the purity of the supplied raw gas.

If a moisture or an impurity gas such as a nitrogen-based gas, a carbon-based gas, or a sulfide gas is contained in the raw gas, not only the ozone gas but also N radical and OH radical gases are generated by discharging. These radical gases are combined with the moisture, thus outputting the ozone gas that contains cluster molecule gases of nitric acid and hydrogen peroxide water.

Since these cluster molecule gases of nitric acid and hydrogen peroxide water are very active gases, a chemical reaction occurs on a metal surface of the ozone-gas output gas pipe, the valve, or the like, to cause corrosion of the pipe surface. This may cause a corroded-metal impurity (metal contamination) to be contained in the output ozone gas.

Increase in the amount of the metal impurity (metal contamination) contained in the output ozone gas deteriorates the performance of an oxide film that is formed on a semiconductor by an oxide film process using the ozone gas.

From the above, it has been confirmed from tests that the quality of an output ozone gas is deteriorated if an impurity gas or a moisture is contained in the raw gas. Accordingly, the gas filter for the purpose of trapping the impurity gas is mounted to a raw gas supply portion. Particularly, in the embodiment 8, at the raw gas supply ports 14-1 to 14-n of the ozone generation units 7-1 to 7-n, the gas filters 52-1 to 52-n are mounted at positions that allow easy replacement, to remove the impurity gas.

In this configuration, one gas filter 52-1 to 52-n is provided. However, depending on a type of the impurity gas, a plurality of gas filters may be provided in series and at multiple stages, or an impurity gas filter and a moisture trapping gas filter may be provided in series and at multiple stages.

The other parts, pipe paths, and the like, of the configuration are identical to those of the ozone generation unit 7X2 shown in FIG. 14, except that the gas filter 52 replaces the moisture removal filter 59. Therefore, a description thereof is omitted.

As shown in FIG. 21, a raw gas pipe system (the raw gas supply port 14+the gas filter 52) and an output gas pipe system (ozone gas output port 15) are integrated into a gas pipe integrated block 30 as a gas pipe integrated block structure. Thereby, the ozone generator 1, the ozone power source 2, and the gas pipe systems are packaged, and thus the ozone generation unit 7X5 can be further downsized. The raw gas supply port 14 and the gas filter 52 are coupled to each other.

Similarly to the embodiment 8, at the raw gas supply port 14 provided at a rear surface of the ozone generation units 7-1 to 7-n, the gas filter 52 (gas filters 52-1 to 52-n) is mounted at a position that allows easy replacement. As a result, the ozone gas having a higher purity is provided, and additionally, the mounted gas filter 52 can remove the impurity gas. This exerts an effect that a time for flowing a purge gas prior to the ozone gas generation can be considerably shortened.

Other Aspects of Embodiment 6

Relating to Embodiments 7 and 8

Figure 22:
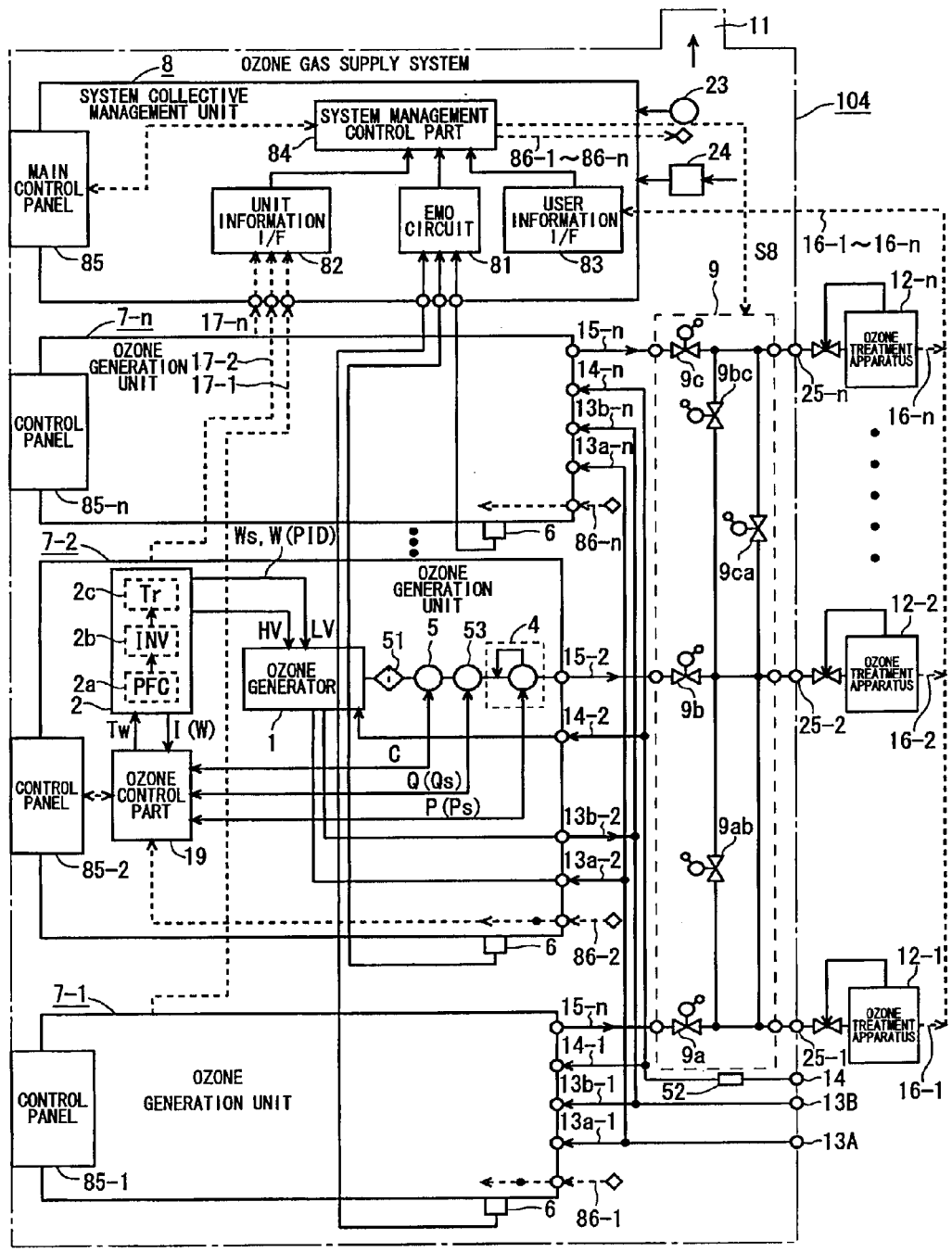
FIG. 22 A block diagram showing another configuration of the ozone gas supply system according to the embodiment 6 of the present invention.

In another aspect of the ozone gas supply system according to the embodiment 6, similarly to the embodiment 7, the gas filter 52 having a function capable of trapping impurities contained in the raw gas that is supplied from the raw gas supply port 14 may be added as shown in FIG. 22.

Additionally, similarly to the embodiment 8 shown in FIG. 20, a configuration (not shown) in which the gas filters 52-1 to 52-n are provided near the raw gas supply ports 14-1 to 14-n of the ozone generation units 7-1 to 7-n may be adopted.

Figure 23:
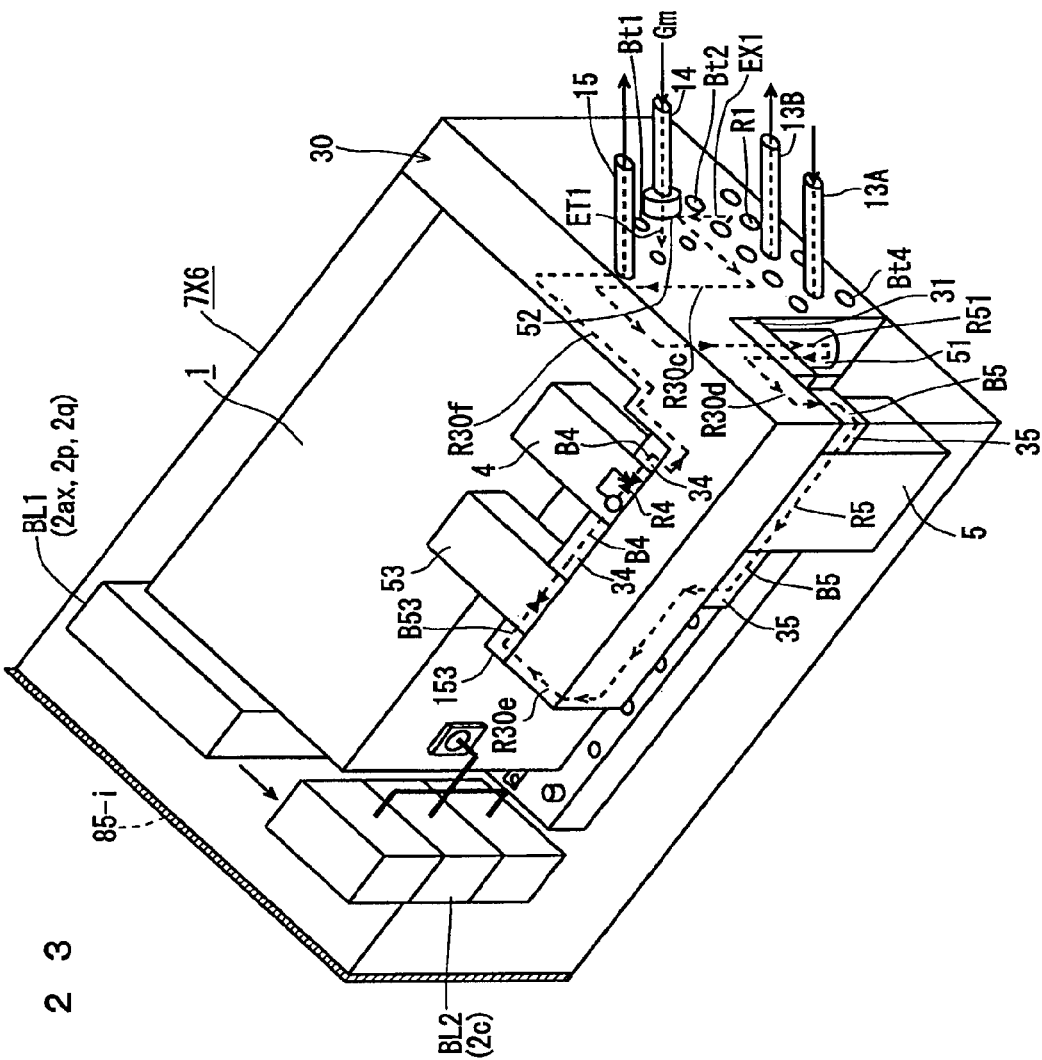
FIG. 23 A perspective view schematically showing another combined structure of the ozone generation unit according to the embodiment 6.

In this case, as shown in FIG. 23, the raw gas supply port 14 and the gas filter 52 (any of the gas filters 52-1 to 52-n) are provided in series in the ozone generator input part ET1. That is, as shown in FIG. 23, there is obtained an ozone generation unit 7X6 having a gas pipe integrated block structure in which the raw gas pipe (the raw gas supply port 14+the gas filter 52) and the output gas pipe system (ozone gas output port 15) are integrated into the gas pipe integrated block 30.

<Others>

In the embodiments 1 to 8 above, the description has been give to the system for supplying the ozone gas with a predetermined ozone flow rate and a predetermined ozone concentration in an ozone-gas multi-processing apparatus for use in a semiconductor manufacturing apparatus that requires an ozone treatment apparatus capable of generating about several tens to 500 g/h ozone.

Instead of the ozone treatment apparatus 12 described above, an ozone-bleaching apparatus for pulp, an ozone treatment apparatus for pool water, an ozone treatment apparatus for clean and sewage water, and an ozone treatment apparatus for a chemical plant, which require a larger amount of ozone gas, may be adopted. For example, in a case of a processing apparatus that requires one to several kg/h ozone gas, a plurality of ozone generation units 7-1 to 7-n are installed in the ozone gas supply system 10 (20, 101 to 105) described above, and output ozone gases of the ozone generation units 7-1 to 7-n are collectively supplied to one ozone treatment apparatus. This exerts an effect that it is relatively low-cost and easy and provides excellent maintainability, and therefore the field of application of the ozone gas supply system is expanded.

While the invention has been described in detail, the foregoing description is in all aspects illustrative and not restrictive. It will be appreciated that numerous modifications unillustrated herein can be made without departing from the scope of the present invention.

INDUSTRIAL APPLICABILITY

The present invention relates to an ozone generation unit with a function having a plurality of means for supplying an ozone gas, and an ozone gas supply system for supplying the ozone gas to a plurality of ozone treatment apparatuses. An object of the present invention is to achieve downsizing of the ozone generation unit with a function having a plurality of means for outputting an ozone gas.

However, also in a gas generation unit for a gas other than the ozone gas and a gas supply system for supplying the generated gas other than the ozone gas to a plurality of gas processing apparatuses, the quality of the gas generated by a generator can be improved at a time of outputting the gas, by mounting the moisture removal filter 59 for removing a moisture contained in a raw gas or the gas filter 52 for removing an impurity gas contained in the raw gas.

Further, it is preferable to integrate and downsize a gas generator unit with a function having a plurality of means for outputting a gas, and build a gas generation system having a plurality of gas generation units installed therein.

The invention claimed is:

1. An ozone generation unit, comprising:
an ozone generator for generating an ozone gas;
an ozone power source for controlling power to be supplied to the ozone generator;
a controller associated with the ozone generator;
a raw gas supply port for supplying a raw gas from the outside to the ozone generator;
an ozone gas output port for outputting, to the outside, the ozone gas obtained from the ozone generator through at least part of the controller;
cooling water inlet/outlet ports for supplying and discharging a cooling water obtained from the outside to the ozone generator; and
a gas pipe integrated block,
wherein
the ozone generation unit is formed as an integrated structure in which the ozone generator, the ozone power source, the controller, the raw gas supply port, the ozone gas output port, and the cooling water inlet/outlet ports are assembled together,
the controller comprises:
a flow-rate-detector/flow-rate-adjustor comprising a mass flow controller (MFC) for controlling a flow rate of the raw gas inputted to the ozone generator;
a gas filter for processing the ozone gas outputted from the ozone generator to remove an impurity and a foreign substance;
a pressure-detector/pressure-adjustor comprising an automatic pressure controller (APC) for automatically controlling internal pressure of the ozone generator; and ozone concentration detector comprising an ozone concentration meter for detecting an ozone concentration value of the ozone gas outputted from the ozone generator, each of the ozone generator, the flow-rate-detector/flow-rate-adjustor, the gas filter, the pressure-detector/pressure-adjustor, the ozone concentration detector, the raw gas supply port, the ozone gas output port, and the cooling water inlet/outlet ports is mounted to the gas pipe integrated block in close contact, the gas pipe integrated block has a three-dimensional structure, the flow-rate-detector/flow-rate-adjustor, the gas filter, the pressure-detector/pressure-adjustor, and the ozone concentration detector are arranged on one or more surfaces of the gas pipe integrated block, the gas pipe integrated block has a plurality of internal pipe paths, the plurality of internal pipe paths are connected to the ozone generator, the flow-rate-detector/flow-rate-adjustor, the gas filter, the pressure-detector/pressure-adjustor, the ozone concentration detector, the raw gas supply port, and the ozone gas output port, to form a raw gas input pipe path and an ozone gas output pipe path, the raw gas input pipe path extends from the raw gas supply port through the flow-rate-detector/flow-rate-adjustor to the ozone generator, and the ozone gas output pipe path extends from the ozone generator through the gas filter, the ozone concentration detector, and the pressure-detector/pressure-adjustor, to the ozone gas output port.

2. The ozone generation unit of claim 1, further comprising an ozone control part for performing an initial operation of the ozone power source in which the ozone power source is driven with a predetermined set power amount, and after the elapse of a predetermined time period, performing a PID control on the power supplied by the ozone power source based on comparison between an ozone concentration detected by the ozone concentration meter and a desired ozone concentration.

3. An ozone gas supply system, comprising:
a plurality of ozone generation units, each of the plurality of ozone generation units comprises the ozone generation unit of claim 1;
an ozone gas output flow rate management unit configured to receive a plurality of ozone gas outputs from a plurality of the ozone generators in the plurality of ozone generation units, and be capable of performing an ozone gas output flow rate control for selectively outputting one or a combination of two or more of the plurality of ozone gas outputs to any of a plurality of ozone treatment apparatuses by opening/closing operation of a plurality of ozone gas control valves provided in the ozone gas output flow rate management unit; and
a system collective management unit for, based on a process ozone gas event signal supplied from the plurality of ozone treatment apparatuses, controlling the ozone gas output of each of the plurality of ozone generation units and causing the ozone gas output flow rate management unit to control the ozone gas output flow rate.

4. The ozone gas supply system of claim 3, wherein
the plurality of ozone gas control valves comprise an electrically-operated valve or a pneumatic valve that is openable and closable by electricity or air pressure, and
the system collective management unit outputs the control signal such that an ozone flow rate and an ozone concentration of the ozone gas supplied to each of the plurality of ozone treatment apparatuses have desired values.

5. The ozone gas supply system of claim 3, wherein
the ozone gas output flow rate management unit further comprises a plurality of ozone gas control valve accommodation parts corresponding to the plurality of ozone gas control valves,
each of the plurality of ozone gas control valves is provided in each corresponding one of the ozone gas control valve accommodation parts, and
each of the plurality of ozone gas control valve accommodation parts is mounted in tight contact with the gas pipe integrated block of each corresponding one of the ozone generation units, and is interposed on the ozone gas output pipe path.

6. The ozone generation unit of claim 1, wherein the ozone generation unit is suitable for supplying an ozone gas to an ozone treatment apparatus with a predetermined supply flow rate and a predetermined concentration.

7. The ozone gas supply system of claim 3, wherein the ozone gas supply system is suitable for supplying an ozone gas to the plurality of ozone treatment apparatuses with a predetermined supply flow rate and a predetermined concentration.

8. An ozone generation unit, comprising:
an ozone generator for generating an ozone gas;
an ozone power source for controlling power to be supplied to the ozone generator;
a controller associated with the ozone generator;
a raw gas supply port for supplying a raw gas from the outside to the ozone generator;
an ozone gas output port for outputting, to the outside, the ozone gas obtained from the ozone generator through at least part of the controller;
cooling water inlet/outlet ports for supplying and discharging a cooling water obtained from the outside to the ozone generator; and
a gas pipe integrated block,
wherein
the ozone generation unit is formed as an integrated structure in which the ozone generator, the ozone power source, the controller, the raw gas supply port, the ozone gas output port, and the cooling water inlet/outlet ports are assembled together,
the controller comprises:
a flow-rate-detector/flow-rate-adjustor comprising a mass flow controller (MFC) for controlling a flow rate of the ozone gas that is outputted from the ozone generator;
a gas filter for processing the ozone gas outputted from the ozone generator to remove an impurity and a foreign substance;
a pressure-detector/pressure-adjustor comprising an automatic pressure controller (APC) for automatically controlling internal pressure of the ozone generator; and
ozone concentration detector comprising an ozone concentration meter for detecting an ozone concentration value of the ozone gas outputted from the ozone generator, each of the ozone generator, the flow-rate-detector/flow-rate-adjustor, the gas filter, the pressure-detector/pressure-adjustor, the ozone concentration detector, the raw gas supply port, the ozone gas output port, and the cooling water inlet/outlet ports is mounted to the gas pipe integrated block in close contact, the gas pipe integrated block has a three-dimensional structure, the flow-rate-detector/flow-rate-adjustor, the gas filter, the pressure-detector/pressure-adjustor, and the ozone concentration detector are arranged on one or more surfaces of the gas pipe integrated block, the gas pipe integrated block has a plurality of internal pipe paths, the plurality of internal pipe paths are connected to the ozone generator, the flow-rate-detector/flow-rate-adjustor, the gas filter means, the pressure-detector/pressure-adjustor, the ozone concentration detector, the raw gas supply port, and the ozone gas output port, to form a raw gas input pipe path and an ozone gas output pipe path, the raw gas input pipe path extends from the raw gas supply port to the ozone generator, the ozone gas output pipe path extends from the ozone generator through the gas filter, the ozone concentration detector, the flow-rate-detector/flow-rate-adjustor, and the pressure-detector/pressure-adjustor, to the ozone gas output port.

9. The ozone generation unit of claim 8, wherein the ozone generation unit is suitable for supplying an ozone gas to an ozone treatment apparatus with a predetermined supply flow rate and a predetermined concentration.

10. The ozone generation unit of claim 8, further comprising an ozone control part for performing an initial operation of the ozone power source in which the ozone power source is driven with a predetermined set power amount, and after the elapse of a predetermined time period, performing a PID control on the power supplied by the ozone power source based on comparison between an ozone concentration detected by the ozone concentration meter and a desired ozone concentration.

11. An ozone gas supply system, comprising:

a plurality of ozone generation units, each of the plurality of ozone generation units comprises the ozone generation unit of claim 8;

an ozone gas output flow rate management unit configured to receive a plurality of ozone gas outputs from a plurality of the ozone generators in the plurality of ozone generation units, and be capable of performing an ozone gas output flow rate control for selectively outputting one or a combination of two or more of the plurality of ozone gas outputs to any of a plurality of ozone treatment apparatuses by opening/closing operation of a plurality of ozone gas control valves provided in the ozone gas output flow rate management unit; and a system collective management unit for, based on a process ozone gas event signal supplied from the plurality of ozone treatment apparatuses, controlling the ozone gas output of each of the plurality of ozone generation units and causing the ozone gas output flow rate management unit to control the ozone gas output flow rate.

12. The ozone gas supply system of claim 11, wherein the plurality of ozone gas control valves comprise an electrically-operated valve or a pneumatic valve that is openable and closable by electricity or air pressure, and the system collective management unit outputs the control signal such that an ozone flow rate and an ozone concentration of the ozone gas supplied to each of the plurality of ozone treatment apparatuses have desired values.

13. The ozone gas supply system of claim 11, wherein the ozone gas output flow rate management unit further comprises a plurality of ozone gas control valve accommodation parts corresponding to the plurality of ozone gas control valves, each of the plurality of ozone gas control valves is provided in each corresponding one of the ozone gas control valve accommodation parts, and each of the plurality of ozone gas control valve accommodation parts is mounted in tight contact with the gas pipe integrated block of each corresponding one of the ozone generation units, and is interposed on the ozone gas output pipe path.

14. The ozone gas supply system of claim 11, wherein the ozone gas supply system is suitable for supplying an ozone gas to the plurality of ozone treatment apparatuses with a predetermined supply flow rate and a predetermined concentration.

* * * * *